US010198674B2

(12) United States Patent
Koziarz et al.

(10) Patent No.: US 10,198,674 B2
(45) Date of Patent: Feb. 5, 2019

(54) METHOD, APPARATUS AND SYSTEM FOR RENDERING A GRAPHICAL REPRESENTATION WITHIN LIMITED MEMORY

(71) Applicant: CANON KABUSHIKI KAISHA, Tokyo (JP)

(72) Inventors: Krzysztof Adam Koziarz, Denistone (AU); Christopher Keith Dowell Wade, West Pymble (AU); Tatiana Dudina, Manly Vale (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/844,160

(22) Filed: Dec. 15, 2017

(65) Prior Publication Data
US 2018/0181846 A1  Jun. 28, 2018

(30) Foreign Application Priority Data

Dec. 22, 2016 (AU) ................... 2016277671
Oct. 16, 2017 (AU) ................... 2017248406

(51) Int. Cl.
*G06K 15/00* (2006.01)
*G06K 15/02* (2006.01)
*G06F 3/12* (2006.01)

(52) U.S. Cl.
CPC ......... *G06K 15/1886* (2013.01); *G06F 3/122* (2013.01); *G06F 3/1206* (2013.01); *G06F 3/1224* (2013.01); *G06F 3/1248* (2013.01); *G06K 15/1813* (2013.01); *G06K 15/1817* (2013.01); *G06K 15/1849* (2013.01); *G06K 15/401* (2013.01)

(58) Field of Classification Search
None
See application file for complete search history.

(56) References Cited

U.S. PATENT DOCUMENTS 5,500,928 A   3/1996  Cook et al.
5,524,186 A   6/1996  Campbell
(Continued)

FOREIGN PATENT DOCUMENTS

AU   2005246939 A1   7/2007

*Primary Examiner* — Dung D Tran
(74) *Attorney, Agent, or Firm* — Canon U.S.A., Inc. I.P. Division

(57) ABSTRACT

A method of controlling memory usage in a graphics rendering system. The method comprises converting a plurality of layers of graphical objects to an intermediate format representation, the layers being formed by grouping the graphical objects into a plurality of layers based on a first complexity threshold; and in response to detecting a memory shortage condition in execution of the graphics rendering system, determining a second complexity threshold based on the detected memory shortage condition, the second complexity threshold being lower than the first complexity threshold. The method also comprises identifying a layer of the plurality of layers based on the second complexity threshold, the identified layer being different to a layer which triggered the memory shortage condition, and converting the identified layer of graphical objects to the intermediate format representation to release memory occupied by graphical objects of the identified layer.

18 Claims, 34 Drawing Sheets

(56) References Cited

U.S. PATENT DOCUMENTS

| | | | |
|---|---|---|---|
| 5,850,504 A | 12/1998 | Cooper et al. | |
| 5,959,867 A | 9/1999 | Speciner et al. | |
| 5,988,899 A | 11/1999 | Benson et al. | |
| 6,049,339 A | 4/2000 | Schiller et al. | |
| 6,466,229 B1 | 10/2002 | Nagao | |
| 6,538,764 B2 * | 3/2003 | Ueda | G06F 3/12 |
| | | | 358/1.15 |
| 6,552,819 B2 * | 4/2003 | Osawa | G06K 15/00 |
| | | | 358/1.17 |
| 6,657,635 B1 | 12/2003 | Hutchins et al. | |
| 7,516,292 B2 * | 4/2009 | Kimura | G06F 12/0253 |
| | | | 707/999.202 |
| 7,978,196 B2 | 7/2011 | Combes et al. | |
| 8,068,109 B2 | 11/2011 | Stenson et al. | |
| 8,130,400 B2 | 3/2012 | Caruso et al. | |
| 8,497,876 B2 | 7/2013 | Yuen et al. | |
| 8,669,987 B2 | 3/2014 | Redshaw et al. | |
| 9,070,200 B2 | 6/2015 | Engh-Halstvedt | |
| 9,098,933 B2 | 8/2015 | Morphet | |
| 9,195,919 B2 * | 11/2015 | Belbin | G06K 15/1828 |
| 9,230,200 B2 * | 1/2016 | Deng | G06K 15/1849 |
| 9,250,848 B2 * | 2/2016 | Morrison | G06F 3/1296 |
| 2009/0237697 A1 | 9/2009 | Caruso et al. | |
| 2017/0177984 A1 * | 6/2017 | Koziarz | G06K 15/1863 |
| 2017/0300789 A1 * | 10/2017 | Kikuyama | G06K 15/1813 |
| 2018/0004673 A1 * | 1/2018 | Anderson | G06F 12/0871 |

* cited by examiner

Prior-art

| Z-order | Object | Measure of complexity | Cumulative complexity |
|---|---|---|---|
| 0 | T | 4 | 4 |
| 1 |  | 4 | 8 |
| 2 |  | 2 | 10 |
| 3 |  | 2 | 12 |
| 4 |  | 2 | 14 |
| 5 | clip | 4 | 18 |

Fig. 28

METHOD, APPARATUS AND SYSTEM FOR RENDERING A GRAPHICAL REPRESENTATION WITHIN LIMITED MEMORY

REFERENCE TO RELATED APPLICATIONS

This application claims the benefit under 35 U.S.C. § 119 of the filing date of Australian Patent Application Nos. 2016277671 and 2017248406, filed on 22 Dec. 2016 and 16 Oct. 2017 respectively, hereby incorporated by reference in their entirety as if fully set forth herein.

TECHNICAL FIELD

The present invention relates to processing graphics, such as print data, in a system with limited memory. In particular, the present invention relates to a system, method and computer readable medium for controlling memory usage in a graphics rendering system.

BACKGROUND

A computer application being executed by a computing device typically provides a page to a device for printing and/or display in the form of a description of the page. The description is provided to device driver software of the device in a page description language (PDL), such as Adobe® PDF or Hewlett-Packard® PCL. The PDL document provides descriptions of objects to be rendered onto the page, as opposed to a raster image of the page to be reproduced, for example by printing onto a hard copy medium such as paper, or display upon a video display device. Equivalently, a set of descriptions of graphic objects may be provided in function calls to a graphics interface, such as the Graphical Device Interface (GDI) in the Microsoft Windows™ operating system, or X-11 in the Unix™ operating system, as used in many computing devices. The page is typically rendered for printing and/or display by an object-based graphics system, also known as a Raster Image Processor (RIP).

A PDL-based printer must be able to reliably handle PDL input of high complexity. Objects stored in PDL graphics formats are typically presented to the RIP in z-order, where objects of higher z-order are 'painted' on top of objects which have a lower z-order. Marking engines in printing devices however must operate in y-order, where output pixels are transferred to the output medium in raster order down the page. Thus, a universal problem in all PDL printing applications is the need to convert the input z-ordered object graphics to output y-ordered rendered graphics. Printing of the input PDL graphics cannot commence until all input PDL objects have been received by the RIP.

It is not always possible to interpret highly complex PDL input in entirety prior to pixel generation in view of the typically limited memory and processor resources available in a printing system. Consequently, several methods have been utilized in the prior art to enable PDL printers to process highly complex input PDL jobs prior to final pixel generation.

One approach to render a complex graphical input is to process pixels in a pixel sequential manner. The pixel sequential class of rendering algorithms performs pixel generation operations once for all page pixels, rather than once per each object covering a given pixel. Such an approach is beneficial, especially in the case of many overlapping objects on the page. Also, large frame stores are not required in pixel sequential rendering. However, pixel sequential rendering often requires a larger amount of working memory, because a state of rasterization process must be kept for all active objects.

The amount of memory that the rasterization process can use is limited. In some systems, the limiting factor is how much memory is available. If the amount of memory available is less than the amount of memory required for rasterization, the rasterization process cannot succeed, i.e. the print job fails. In other systems, the available amount of fast memory cache is the limiting factor. If a sufficient amount of fast memory cache is not available, the rasterization process may have to use slow memory for storing working data resulting in a significant performance degradation.

One known method involves dividing a complex PDL input into batches of foreground objects which are scan-converted and composited onto a background bitmap. The batches of objects are often referred to as z-layers since the objects are grouped in z-order. Often, the size of the z-layers is chosen to optimise the processing efficiency of the RIP. The resultant bitmap may be compressed and be used as the background bitmap for subsequent foreground object batches. The increased processing of compressed bitmaps impacts on the overall performance as each bitmap has to be decompressed before compositing. Furthermore, compression artefacts are also likely to be introduced to the compositing operation, and will consequently degrade the quality of the final output. Even if a lossless compression technique is used, the method requires a large amount of memory to store the background bitmap. Other similar known methods divide the page into strips and batch objects according to the strips. Methods dividing the page into strips suffer similar disadvantages to dividing PDL input batches into foreground objects. In an embedded printing application, resource constraints magnify the performance and quality disadvantages.

Other known methods convert a batch of consecutive PDL input objects to an intermediate format representation representing a format between a page description language (PDL) and a bitmap, such as a fillmap or planar map. The arrangements described use a fillmap example. FIG. 1 is a schematic flow diagram that demonstrates the top-level processing of the fillmap method. The batch fillmaps are merged into a merged fillmap to reduce memory usage. Due to the lossless and compact nature of fillmaps, the merged fillmap will often lead to a saving of system resources while preserving the original quality of the PDL data. The final merged fillmap presents the final graphic layout for the page, and hence is often referred to as the page fillmap or the background fillmap. Once the merged fillmap contains all input graphics for the page, the fillmap can be rasterised to pixels, and sent to the marking engine for printing. The method overcomes the quality and performance degradation that is seen in other bitmap based approaches.

Although the method using fillmaps typically works well for the majority of test cases, resources may still be exhausted during the generation of these batch fillmaps. In low-end printing devices, severe resource constraints may result in inadequate memory being available for working memory or for storing the generated batch fillmaps. Ultimately, there may not be sufficient resources for storing the merged fillmap for the page.

A typical response to resource shortage is to rasterise the incomplete merged fillmap to a background bitmap, and lossily compress the background bitmap. The response requires that sufficient memory has been 'reserved' to perform this rasterization as well as storing the pixel bitmap produced. However, the merged fillmap data can typically be deleted as the output pixels are generated, and this pixel data can also be compressed upon generation, freeing memory.

Another known technique in many printing systems for addressing resource constraints is to temporarily store intermediate data to an external hard disk. The technique is common in printer drivers, and in office embedded printers where a hard disk is present. However, low-end printers such has those common in the consumer market typically do not include a hard disk drive.

Alternative approaches calculate complexity of input data to estimate the amount of memory required to render a display list. The input is layered when the memory estimate reaches a given threshold. The generated layers are then rendered to the background image. Because it is difficult to make an accurate estimation, or making such an estimate would have been prohibitively expensive, the fixed memory is allocated with a large tolerance for estimation inaccuracy to ensure that rendering to pixels succeeds. As such, the working memory is almost always underutilised, especially for small to medium complexity jobs. The generated layers are typically smaller than they otherwise may be thereby creating significant overhead of merging of many layers into the final raster representation, which badly affects performance of pixel sequential methods. Furthermore, no recovery is provided from failure to rasterize a display list due to lack of available memory, which can happen even with a conservative approach to memory estimate.

There are methods of calculating page complexity by decomposing all drawing commands to linear vectors, and spatially splitting the input data if the number of vectors that cross the scanlines exceeds a given predetermined threshold. Such methods may reduce working memory (at the expense of making expensive decomposition to the linear vectors upfront). However, the number of scanline crossings still cannot guarantee that the rasterization job succeeds in the fixed amount of memory.

Several spatial only division methods subdivide a tile into a plurality of sub-tiles until a sub-tile fits a pre-allocated memory buffer. However, when the input job has very fine detail and many objects cover a small area, spatial division of the page (even recursively) may not help reduce the amount of data required by a pixel-sequential renderer. For example, after subdivision, each subregion may bear the same, or substantially the same, amount of contributing objects. Thus, the working memory may not be significantly reduced, especially when the input objects are processed by a pixel sequential renderer.

Other methods utilise spatial subdivision in addition to layering to reduce total system working memory usage. For example, a display list can be stored as a "macro-tile" list for objects falling entirely within a macro-tile and "global" list for large objects covering two or more macro-tiles. Rendering starts when a memory threshold (e.g. 70%) is reached. However, the threshold is only a reserve, therefore, in some cases subsequent rasterization of a display may fail. While for display rendering occasional failure to render single frames may be tolerable, in print rendering all jobs must be successfully rasterized otherwise a user would receive incorrect print output.

Another approach improves the performance of the pixel sequential rendering system by finding a balance between making use of computing resources (including memory resources) and minimising the processing time. Such an approach may find an optimal memory use in some cases but is computationally expensive and does not guarantee that layers would be successfully converted to an intermediate format representation.

In an attempt to overcome the problems described above, PDL rendering systems intended for low-end embedded printers are typically designed to operate using as little memory as possible. However, most pages to be printed are of moderate or low complexity and size. As a result, the performance of such a low-end printing device may be unnecessarily reduced for such pages. Also, known rendering systems typically only react to resource conditions once they occur, and do not anticipate impending resource shortages.

Thus there is a need to provide a system and a method for processing a print job that can utilise system memory efficiently and facilitate successful conversion of a majority of print jobs to an intermediate format representation within a fixed amount of memory.

SUMMARY

It is an object of the present invention to substantially overcome, or at least ameliorate, at least one of the disadvantages described above.

One aspect of the present disclosure provides a method of controlling memory usage in a graphics rendering system, the method comprising: converting a plurality of layers of graphical objects to an intermediate format representation, the layers being formed by grouping the graphical objects into a plurality of layers based on a first complexity threshold; in response to detecting a memory shortage condition in execution of the graphics rendering system, determining a second complexity threshold based on the detected memory shortage condition, the second complexity threshold being lower than the first complexity threshold; identifying a layer of the plurality of layers based on the second complexity threshold, the identified layer being different to a layer which triggered the memory shortage condition; and converting the identified layer of graphical objects to the intermediate format representation to release memory occupied by graphical objects of the identified layer.

Another aspect of the present disclosure provides a method of controlling memory usage in a graphics rendering system processing graphical objects in independent spatial portions, the method comprising: converting a plurality of layers of graphical objects to an intermediate format representation, the layers being formed by grouping the graphical objects for each of a plurality of spatial portions into layers based on a first complexity threshold chosen to facilitate throughput of the graphics rendering system; in response to detecting a memory shortage condition in execution of the graphics rendering system processing graphical objects of a first of the plurality of spatial portions, determining a second layer complexity threshold to address the memory shortage condition, the second layer complexity threshold being lower than the first complexity threshold; identifying a layer of the graphical objects associated with a second of the plurality of spatial portions using the plurality of layers based on the second layer complexity threshold, the second spatial portion being different to the first spatial portion which triggered the memory shortage condition; and converting the identified layer of graphical objects to the intermediate format representation to release memory occupied by graphical objects of the identified layer.

In some aspects, the detected memory shortage condition relates to memory for interpreting a page display language of the graphical objects.

In some aspects, the memory shortage condition relates to memory for converting the plurality of layers of graphical objects to the intermediate format representation.

In some aspects, identifying the layer comprises selecting a y-band of a page containing the graphical objects based on the second complexity threshold.

In some aspects, identifying the layer comprises splitting a z-layer associated with the plurality of layers based on the second complexity threshold.

In some aspects, the method further comprises selecting another layer of the plurality of layers based on the second complexity threshold and converting the selected layer to the intermediate format representation.

In some aspects, the method further comprises in response to successful conversion of the identified layer, determining if the released memory satisfies a memory allocation request, and converting a layer associated with the first spatial portion to the intermediate format if the released memory satisfies the memory allocation request.

In some aspects, the memory shortage condition is detected by comparing currently reserved memory with a predetermined threshold.

In some aspects, the memory shortage condition is detected when a memory allocation request fails.

In some aspects, the method further comprises determining a state of execution of the graphics rendering system by selecting a state from: a first state corresponding to the memory shortage; and a second state corresponding to a state when the system recovered from the memory shortage condition.

In some aspects, the method further comprises: if converting the identified layer fails to complete within a fixed memory, reclaiming memory from at least one of a print description language interpreter module and a display list generator module.

In some aspects, control of the memory is completed in stages according to a severity level of the graphics rendering system.

In some aspects, the method further comprises rendering and compressing pixel data associated with the identified layer if conversion of the identified layer to the intermediate format representation fails and a predetermined severity level is detected.

In some aspects, the method further comprises reducing quality of a bitmap of the graphical objects if a predetermined severity level is detected.

Another aspect of the present disclosure provides a non-transitory computer readable medium having a program stored thereon for controlling memory usage in a graphics rendering system, the program comprising: code for converting a plurality of layers of graphical objects to an intermediate format representation, the layers being formed by grouping the graphical objects into a plurality of layers based on a first complexity threshold; code for, in response to detecting a memory shortage condition in execution of the graphics rendering system, determining a second complexity threshold based on the detected memory shortage condition, the second complexity threshold being lower than the first complexity threshold; code for identifying a layer of the plurality of layers based on the second complexity threshold, the identified layer being different to a layer which triggered the memory shortage condition; and code for converting the identified layer of graphical objects to the intermediate format representation to release memory occupied by graphical objects of the identified layer.

Another aspect of the present disclosure provides apparatus for controlling memory usage in a graphics rendering system, the apparatus configured to: convert a plurality of layers of graphical objects to an intermediate format representation, the layers being formed by grouping the graphical objects into a plurality of layers based on a first complexity threshold; in response to detecting a memory shortage condition in execution of the graphics rendering system, determine a second complexity threshold based on the detected memory shortage condition, the second complexity threshold being lower than the first complexity threshold; identify a layer of the plurality of layers based on the second complexity threshold, the identified layer being different to a layer which triggered the memory shortage condition; and convert the identified layer of graphical objects to the intermediate format representation to release memory occupied by graphical objects of the identified layer.

Another aspect of the present disclosure provides a graphic rendering system comprising: a memory for storing data and a computer readable medium; and a processor coupled to the memory for executing a computer program, the program having instructions for: converting a plurality of layers of graphical objects to an intermediate format representation, the layers being formed by grouping the graphical objects into a plurality of layers based on a first complexity threshold; in response to detecting a memory shortage condition in execution of the graphics rendering system, determining a second complexity threshold based on the detected memory shortage condition, the second complexity threshold being lower than the first complexity threshold; identifying a layer of the plurality of layers based on the second complexity threshold, the identified layer being different to a layer which triggered the memory shortage condition; and converting the identified layer of graphical objects to the intermediate format representation to release memory occupied by graphical objects of the identified layer.

Some aspects of the present disclosure are configured to render a graphical representation within limited memory.

According to another aspect, a method of rendering a graphical representation comprises receiving a plurality of objects of the graphical representation grouped into layers in accordance with z-order, wherein partial rasterization of each layer is estimated to succeed within an allocated memory; determining, while generating an intermediate format representation for a selected layer by partially rasterizing objects of the selected layer, that more than the allocated memory is required to complete the generating; in response to determining that more than the allocated memory is required, splitting, in z-order, the selected layer into at least two sub-layers; and rendering the graphical representation by generating an intermediate format representation for each of the sub-layers to facilitate rasterization of the selected layer within the allocated memory.

In some aspects, the intermediate format representations for the sub-layers may be generated serially to facilitate the generating of the intermediate format representations within the allocated memory. Alternatively, an intermediate format representation for a second sub-layer may be generated in response to completing generation of an intermediate format representation for a first sub-layer.

In some aspects, the method may also determine a complexity measure for the selected layer, which can be used to split the selected layer by determining a pivot point based on the accumulated complexity measure. In some implementations, the pivot point can be determined based on z-order of objects in a transparency group falling within the selected layer.

In some aspects, generating the intermediate format representation for each of the sub-layers starts from a K+1 strip, wherein at least K strips of the intermediate format representation are generated before determining that more than the allocated memory is required, wherein K is not less than 1.

In some aspects, the selected layer may be associated with a reference count indicating a number of corresponding sub-layers to be rasterized. The reference count is increased in response to splitting, in z-order, the selected layer, and the reference count is decreased in response to rasterizing a sub-layer associated with the selected layer.

According to another aspect of the present disclosure, a method of rendering a graphical representation comprises receiving a display list for the graphical representation, wherein a fixed amount of memory is available to convert the display list to an intermediate format representation; rasterizing the display list, wherein if a memory allocation request fails during conversion of the display list to the intermediate format representation, the display list is split, in z-order, into at least two sub-display lists to reduce a number of objects on a scanline to be processed at a time and thereby to facilitate completion of the rasterization of the graphical representation within the available memory; and generating an intermediate format representation for each of the sub-display lists to render the graphical representation.

Additionally, in some aspects of the present disclosure, an apparatus, graphics processing system and non-transitory computer readable storage medium are provided. The apparatus, graphics processing system and non-transitory computer readable storage medium are configured to implement the method in accordance with the exemplary embodiment of the present invention.

According to another aspect of the present disclosure, the graphics processing system comprises a hardware processor, a memory coupled to the hardware processor, and computer program instructions stored in the memory that, when executed on the processor to render a graphical representation, cause the graphics processing system to receive a plurality of objects of the graphical representation grouped into layers in accordance with z-order, wherein partial rasterization of each layer is estimated to succeed within an allocated memory, determine, while generating an intermediate format representation for a selected layer by partially rasterizing objects of the selected layer, that more than the allocated memory is required to complete the generating, split, in z-order, the selected layer into at least two sub-layers in response to determining that more than the allocated memory is required, and render the graphical representation by generating an intermediate format representation for each of the sub-layers to facilitate rasterization of the selected layer within the allocated memory.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

At least one embodiment of the present invention will now be described with reference to the following drawings, in which:

FIG. 28 shows a table of objects from FIG. 26A with an associated complexity measure.

DETAILED DESCRIPTION INCLUDING BEST MODE

Figure 1:
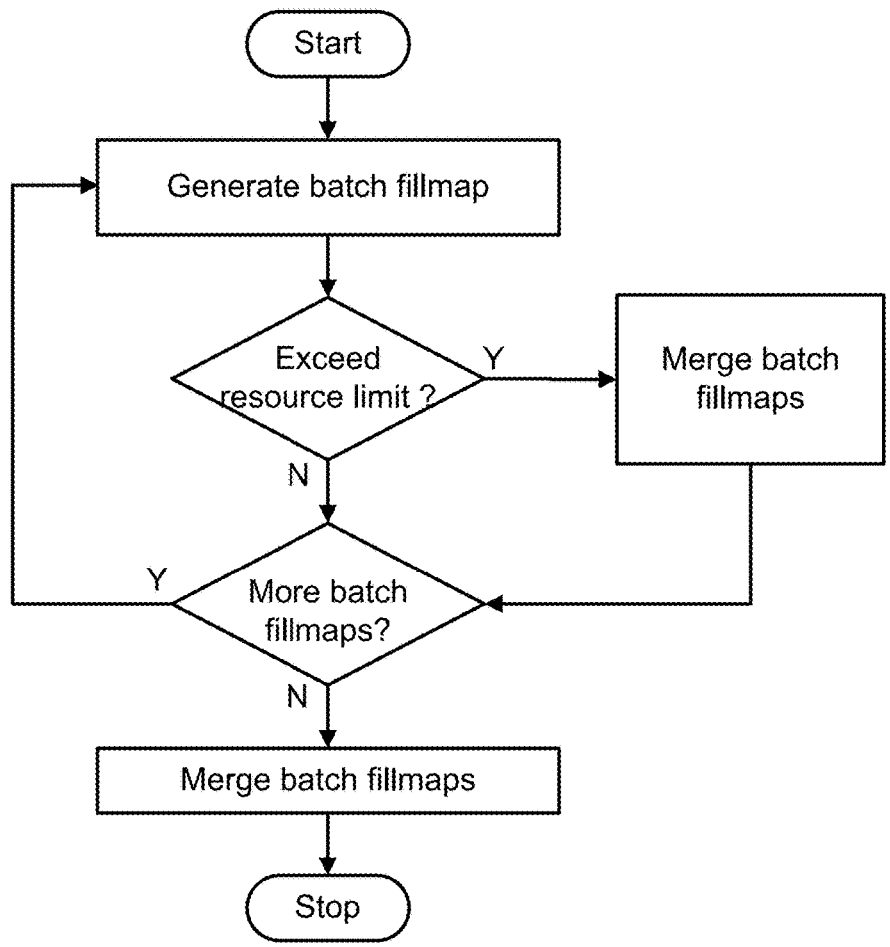
FIG. 1 is a schematic flow diagram of a prior art method of top-level processing of graphics using fillmaps.

Embedded printing systems must make a difficult trade-off, successfully printing a page whilst optimising the output quality and performance of a Raster Image Processor (RIP). The task is made more difficult in a low, fixed memory embedded RIP where memory is constrained. As described above, embedded raster image processors typically address the problem by constraining working memory from the start of processing, when operating in a low-memory embedded environment, sometimes at the cost of reduced performance and perhaps output quality.

A need exists for a system to predict memory requirements for processing each page to be printed, enabling an embedded printing system to be dynamically configured to optimally process each page, whilst still being capable of constraining resource usage so as to guarantee successful output of all pages within a fixed resource limit.

A need exists to allow an embedded printing system to operate in an efficient mode of operation for a majority of pages to be printed, reverting only to a low-resource mode of operation where the system anticipates a resource shortage for that page. As a result, each output page is produced as efficiently as resources allow, and the output is of the highest quality possible within those resource constraints.

In some of the methods described, an initial priority of the RIP is to optimise performance and output quality without regard to memory usage, even if operating in a low, fixed memory embedded environment. The arrangements described relate to a mode of operation referred to as the optimised mode of operation. In the context of the present disclosure the optimised mode of operation relates to a mode which allows maximised throughput and does not revert to a low-resource mode of operation until memory shortage is detected. Memory usage is only constrained when and if a memory shortage occurs during processing of a page. Constraining memory usage in this manner is achieved by estimating working and output memory requirements during processing on incoming graphic objects. If the estimates indicate that a memory shortage is possible in subsequent processing of the graphic objects, the RIP switches to a memory-efficient mode of operation for the remainder of the page. Switching to a memory-efficient mode is achieved by attempting to reserve or allocate the required memory. If the reservation or allocation request(s) fail, the RIP invokes a memory recovery strategy call, referred to as staged memory recovery, to satisfy the memory reservation and allocation requests. For the remainder of the page, the RIP operates in a reduced memory footprint in a memory-efficient mode of operation.

Most pages processed by the RIP are usually relatively simple and readily processed with optimal performance and quality in limited memory. When the RIP encounters a more difficult page, performance is reduced first by reducing the parcels of work (and hence memory) processed at each stage of the RIP pipeline. Reducing the parcels of work is achieved by dividing the page into y-bands, where each y-band is processed separately, and then processing each y-band in multiple z-layers. Graphical objects in a page are effectively grouped into layers, being the z-layers corresponding to each y-band, based upon a complexity limit or threshold. The size of the z-layers can be progressively reduced as required by memory constraints, until a z-layer is a single object intersecting the corresponding y-band.

Each y-band is converted to a compact pixel-aligned edge-based format called a fillmap. The page to be printed is represented by a set of fillmaps—one fillmap for each y-band on the page. The set or collection of fillmaps is referred to as the Page Fillmap.

Where a page is very complex, and the Page Fillmap grows to a certain size, quality of the page representation is decreased to reduce memory usage by rendering the Page Fillmap to pixels, and compressing the pixel bitmap (the Page Bitmap) produced as necessary to achieve a required memory usage. Since the compressed Page Bitmap typically occupies more memory than the Page Fillmap initially, a considerable reduction in quality is usually required. However, rendering the Page Fillmap to a Page Bitmap and compressing the Page Bitmap is only required for a relatively small number of pages.

One advantage of the arrangements described lies in optimising performance and quality by delaying the rendering/compression step for long enough that most pages do not need the rendering/compression step.

Figure 2:
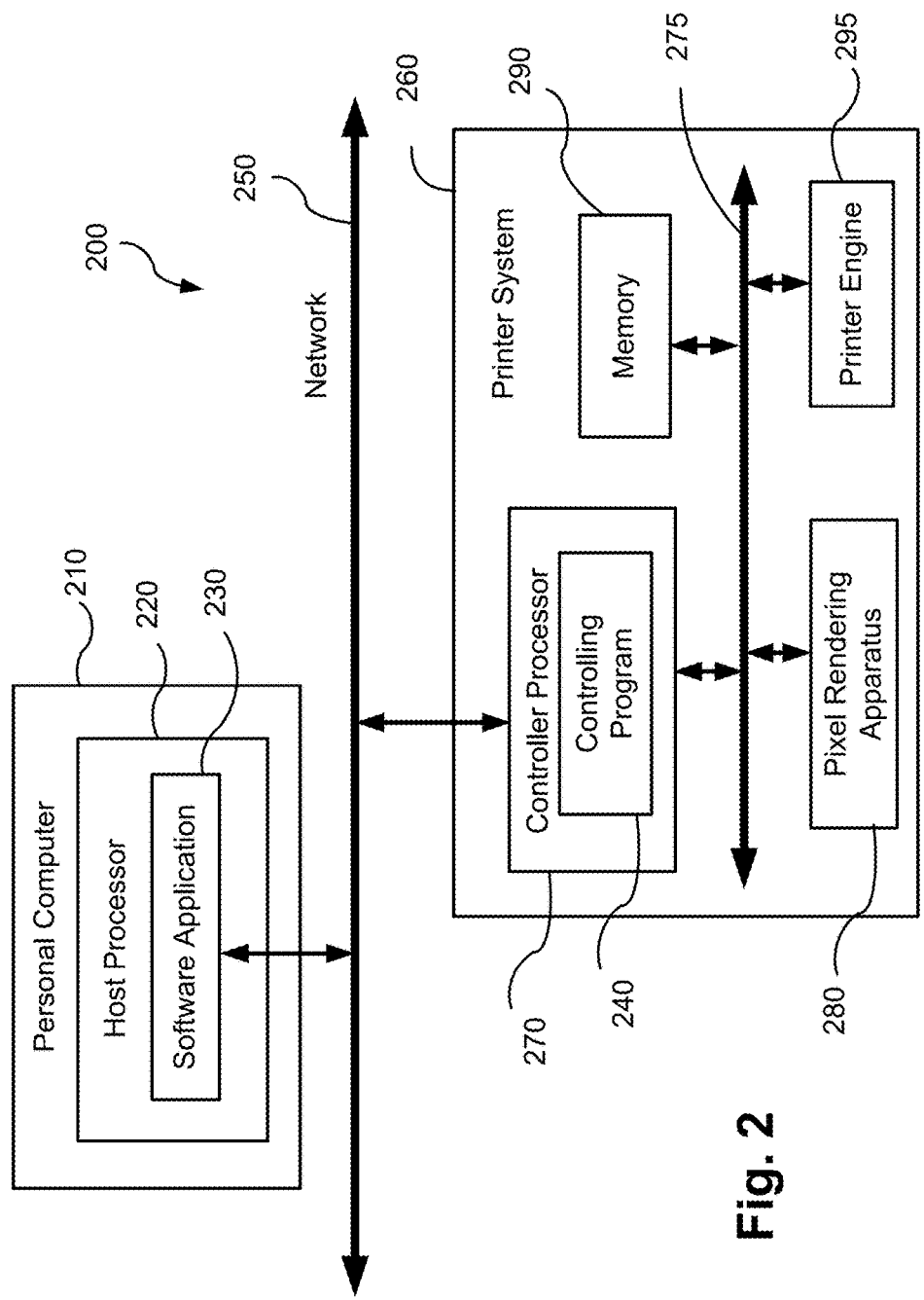
FIG. 2 is a schematic block diagram of a data processing architecture within which the arrangements described may be practised.

FIG. 2 shows a schematic block diagram of a pixel rendering system 200 for rendering computer graphic object images which may be processed by the described methods for fillmap processing. The pixel rendering system 200, also referred to as a graphics rendering system, comprises a personal computer 210, representing an exemplary computing device, connected to a printer system 260 through a network 250. The network 250 may be a typical network involving multiple computing devices, including tablet devices, PDAs and the like, or may be a simple connection between a single computing device and the printer system 260. The network 250 may be wired or wireless, and may include routers or other interconnections between wired or wireless sub-networks.

The personal computer 210 comprises a host processor 220 for executing a software application 230, such as a word processor or graphical software application.

The printer system 260 comprises a controller processor 270 for executing a controlling program 240, a pixel rendering apparatus 280, a memory 290, and a printer engine 295, each coupled via a bus 275. The pixel rendering apparatus 280 operates to rasterise image data to form pixel data, and preferably includes an application specific integrated circuit (ASIC) coupled via the bus 275 to the controller processor 270, and the printer engine 295. However, the pixel rendering apparatus 280 may also be implemented in software, for example stored in the memory 290 and executed in the controller processor 270 or another embedded processor (not shown). The controller processor 270 has usually formed therein a limited cache memory (not illustrated), or simply "cache", which is used to mirror the storage of select data created during print processing and which is ordinarily stored in "main" memory, formed within the memory 290.

The printer system 260 generally relates to a printer system suitable for consumer or home office use, in which a hard drive is not present or in which memory resources are typically limited. The printer system 260 can relate to a bubblejet printer or electrophotographic printer, for example.

The controlling program 240 is typically stored in the memory 290, which is also used for temporary storage of print data during the processing performed within the printer system 260. Typically the memory 290 is formed by a combination of memory types including read-only memory (ROM), non-volatile random-access memory (RAM) and volatile RAM. Typically, the controlling program 240 is stored in ROM and cannot be altered after manufacture, without replacement of the ROM. Where the controlling program 240 is stored in non-volatile RAM, such affords the possibility of upgrades or changes to the controlling program 240 from time to time, provided sufficient memory capacity is available. In some instances the non-volatile RAM may be formed by magnetic disk drive or similar storage device. As such the memory 290 includes or is formed by non-transitory tangible computer readable storage media within which the controlling program 240, at least, may be stored. The controlling program 240 may be supplied to the printer system 260 for such storage via portable non-transitory tangible computer readable storage media connectable to the printer system 260, or via transitory non-tangible computer readable transmission media, including for example the network 250.

In the pixel rendering system 200, the software application 230 creates page-based documents where each page contains objects such as text, lines, fill regions, and image data. The software application 230 sends a high-level description of the page (for example a PDL file) via the network 250 to the controlling program 240 that executes in the controller processor 270 of the printer system 260.

Figure 3:
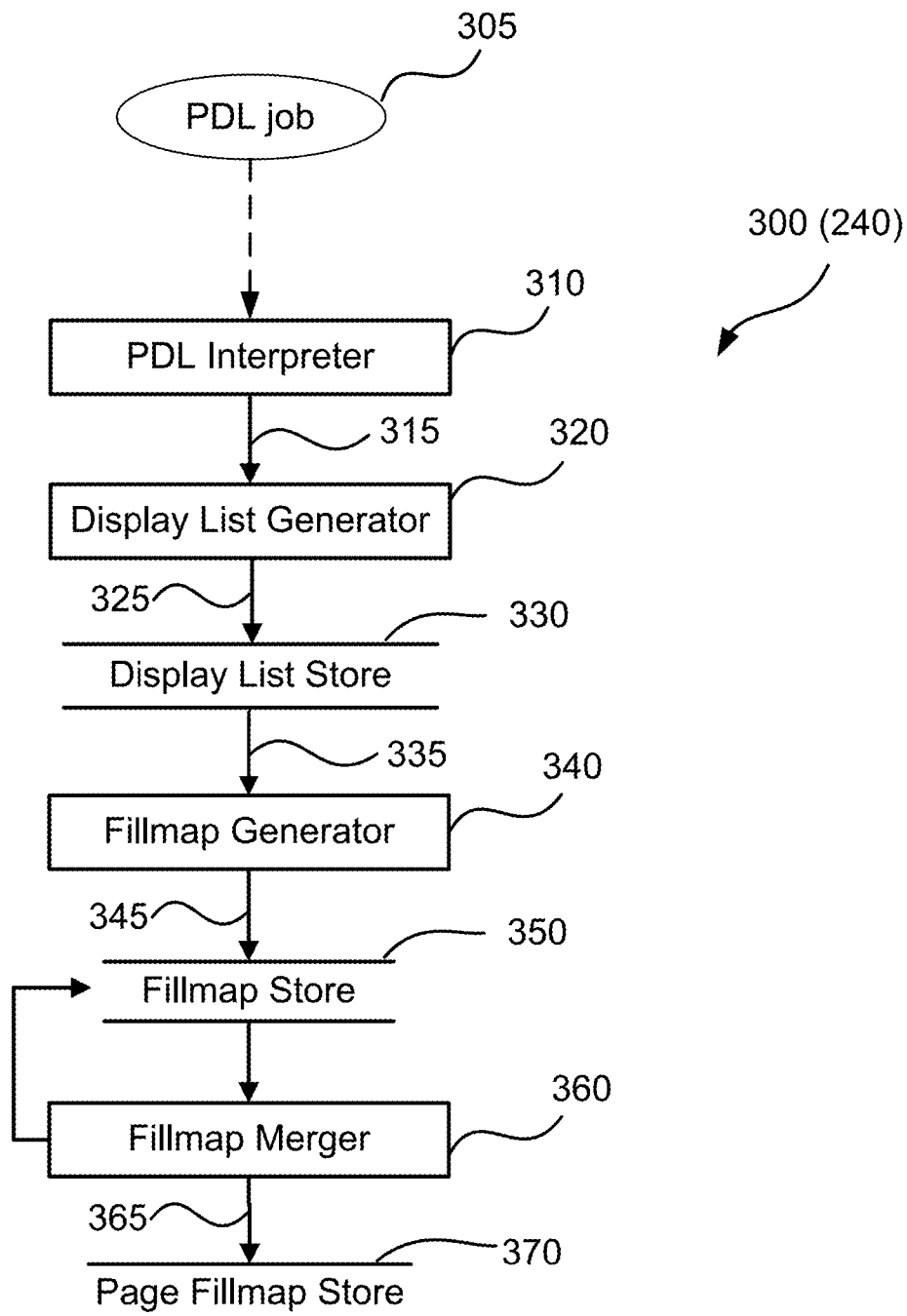
FIG. 3 shows an architecture of a page description language rendering system.

An architecture 300 of the controlling program 240 (also referred to as the RIP System) is now described using FIG. 3.

The controlling program 240 receives the description of the page from the software application 230. The description of the page is represented by a PDL job 305. Execution of the controlling program 240 interprets the document using a PDL document interpreter module 310. The PDL document interpreter 310 generates drawing commands. The drawings commands are transmitted, as depicted by an arrow 315, to a display list generator module 320.

The display list generator module 320 executes to translate the drawing commands into display lists. The display lists are stored in a display list store 330, as depicted by an arrow 325. The display list store 330 is typically part of the memory 290. The display list generator module sorts PDL objects in a scanline order. A display list comprises a collection of PDL objects which are typically ordered in increasing y starting position on the page. A display list is typically organised as a linked list, but may also be stored as an array.

Figure 14:
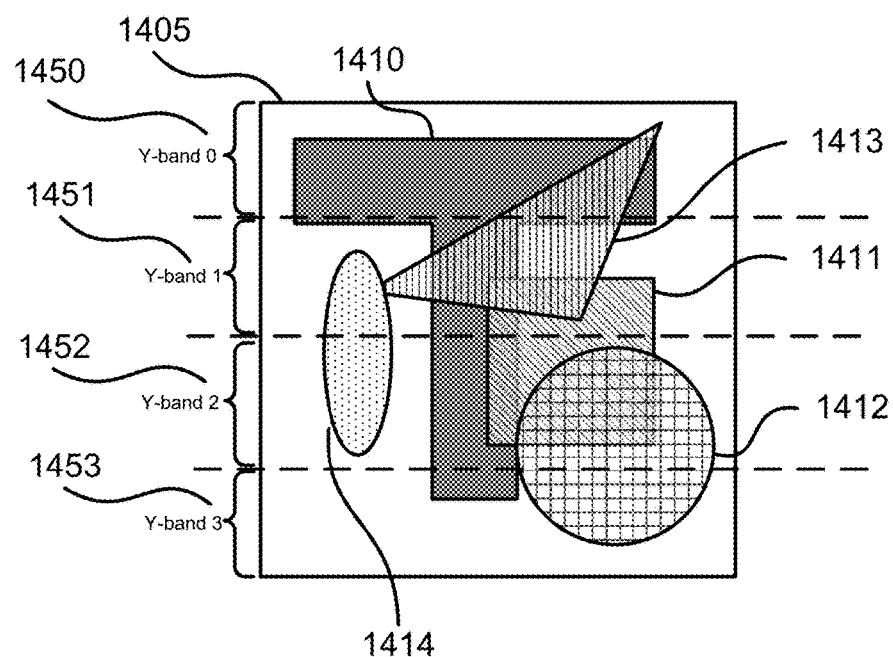
FIG. 14 shows an example of a y-banded fillmap.

In order to minimise working memory required by downstream pipeline modules 340 and 350 shown in FIG. 3, the display lists generated from the PDL graphics received from the PDL interpreter 310 are divided into y-bands by the display list generator module 320. Each y-band display lists contains the PDL graphics for a horizontal band of the page being rendered. FIG. 14 shows an example page 1405. The page 1405 has been divided up into 4 y-bands. Implementation of the methods described for the example page 1405 are described in detail hereafter.

Referring to FIG. 3, when all y-banded display lists for a single page are complete, the y-banded display lists are transmitted one at a time to the Fillmap Generator Module 340, as depicted by an arrow 335. Y-banded display lists are described hereafter. The Fillmap Generator Module 340 converts the y-banded display lists one at a time to intermediate format representation, for example y-band fillmaps. The intermediate Y-band fillmaps are stored in a Fillmap Store 350, as depicted by an arrow 345. The Fillmap Store 350 is typically part of the memory 290. Conversion of graphical objects in the display lists to the intermediate format representations relates to planarising of the display list via rasterisation.

If a y-band display list is sufficiently complex, the y-band display list is divided into two or more z-layers. The Display List Store 330 will typically contain one z-layer for each y-band at any one time. If a y-band is sufficiently complex to require more than one z-layer, the current z-layer display list for the y-band is sent to the Fillmap Generator Module 340 for conversion to fillmap format. A new z-layer display list is then started for the y-band. The previous z-layer display list can then be deleted from Display List Store 330, reducing memory. Hence, in the context of the arrangements described, the term 'z-layer display list' refers to the current display list for the y-band. The term 'z-layer fillmap' refers to the fillmap that has been created from that z-layer display list. Y-bands, y-band display lists, z-layer display lists and fillmaps are described in more detail hereafter.

When all z-layer display lists for all y-bands have been converted to z-layer fillmaps by the Fillmap Generator 340 and stored in the Fillmap Store 350, a Fillmap Merger module 360 executes to merge all accumulated z-layer fillmaps for each y-band. The merged z-layer fillmaps are stored in a Page Fillmap Store 370. The Page Fillmap Store 370 is typically part of the memory 290. The process of merging z-layer fillmaps is described in detail hereafter.

In an alternative implementation, the controlling program 240 executes the Fillmap Merger module 360 when there is a plurality of intermediate z-layer fillmaps in the Fillmap Store 350. When the Fillmap Merger 360 is executed before all z-layer fillmaps associated with a page are generated, the merged z-layer fillmap are stored back into the fillmap store 350 as an intermediate fillmap for the y-band, replacing the previously unmerged z-layer fillmaps. The alternative implementation uses less memory 290 to store fillmaps for the page, at an expense of potentially merging graphic objects that will be obscured by subsequent z-layer fillmaps with higher Z-order.

A fillmap is an example of a known intermediate representation of a page of graphical objects. The fillmap is a pixel-aligned region-based representation of a page. The fillmap maps a portion or region of pixels within the page to a fill sequence. The mapped portion or region of pixels is composited to generate colour data for each pixel within the fillmap region. All pixels within a fillmap region share the same compositing sequence. Multiple fillmap regions within a fillmap can map to the same fill sequence. Fillmap regions within a fillmap do not overlap (i.e. there are no overlapping fillmap regions). Hence, each pixel in the rendered page can only belong to a single fillmap region. Each fillmap region within a fillmap is defined by a set of pixel-aligned fillmap edges which activate the fill sequence associated with that fillmap region. Pixel-aligned fillmap edges:

(i) are monotonically increasing in the y-direction of the page;
(ii) do not intersect;
(iii) are aligned with pixel boundaries, meaning that each pixel-aligned fillmap edge consists of a sequence of segments, each of which follows a boundary between two adjacent pixels;
(iv) contain a reference field referring to the index of the fill sequence, within the table of fill sequences, required to be composited to render the fillmap region, to which the pixel-aligned fillmap edge belongs, to pixels; and
(v) activate pixels within a single fillmap region.

On any given scanline (i.e. y being constant), starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated.

Within a fillmap, the fill sequence active within each fillmap region of pixels is stored in a table of fill sequences. A fill sequence is a sequence of z-ordered levels. Each z-ordered level contains attributes such as a fill, an opacity of the level, a compositing operator for determining how to mix the colour data of the level with a colour data result of compositing all levels underneath, and priority, or z-order, of the level. A fill sequence contains references to all levels which can contribute colour to pixels within a fillmap region. The table of fill sequences contains all of the fill sequences required to render portions of the page to pixels. The table of fill sequences does not contain duplicate instances of identical fill sequences. Hence, multiple fillmap regions within a fillmap which map to the same fill sequence, map to the same instance of the fill sequence within the table of fill sequences.

An example of a fillmap is described with reference to FIGS. 5A and 5B.

Figure 5A:
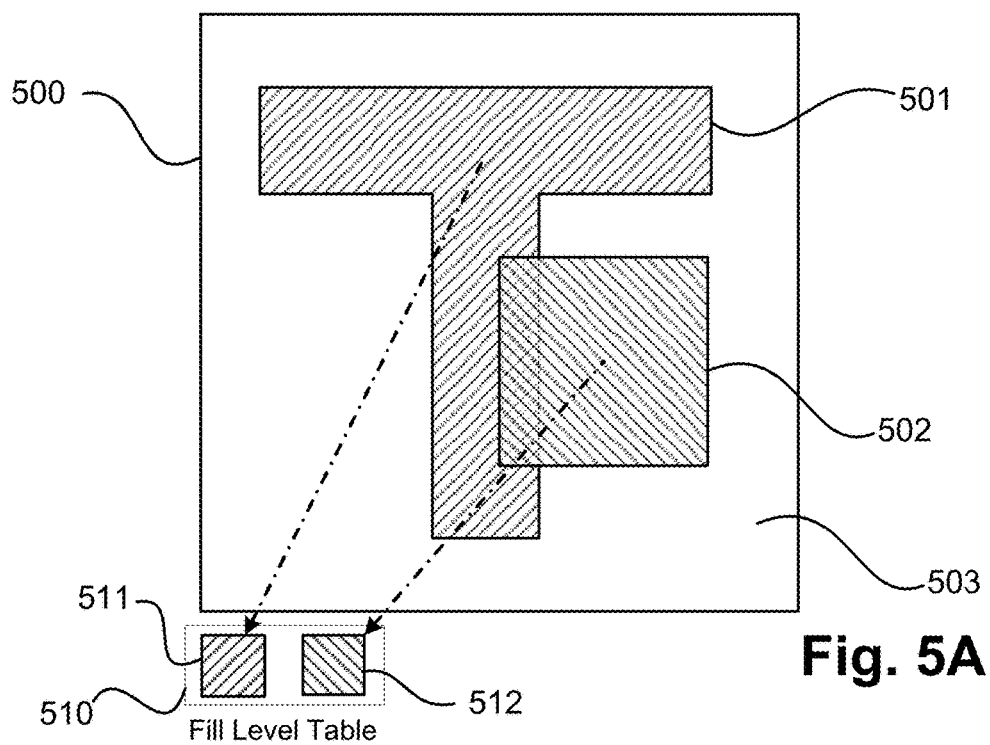
FIGS. 5A and 5B show an example of a page with layers of graphical objects and a corresponding fillmap representation.

FIG. 5A shows a page 500 with a layer of graphic objects, first and second objects 501 and 502 respectively. The first object 501 is an opaque "T" shaped object with a right hatched fill. The object 501 has a smallest z-order of the objects 501 and 502. The second object 502 is a semi-transparent square with a left hatched fill. The object 502 has a highest z-order of the objects 501 and 502. Examples of other fills include blends representing a linearly varying colour, bitmap images and tiled (i.e. repeated) images. As shown in FIG. 5A, the second object 502 overlaps the first object 501. By virtue of semi-transparency of the object 502, the object 501 can be seen through the overlapping portion. The page 500 also includes a background 503 over which all page objects in all layers are to be rendered.

A fill level table 510 describes the fills of the objects 501 and 502. The fill level table 510 also describes other parameters such as rules of how to pixelate object contours, how to composite the object fill with the background, etc., to be used to render each object in the page 500. Each of the objects 501 and 502 references an entry in the fill level table 510 with the fill of the referenced entry corresponding to the fill of the object. The position of an entry in the fill level table reflects the z-order of the referencing objects in the layer. Therefore, a first entry 511, referenced by the object 501, is at a first position in Fill Level Table 510. An entry 512, referenced by the object 502, follows at the second position in Fill Level Table 510, because the object 502 has higher z-order than object 501.

Figure 5B:
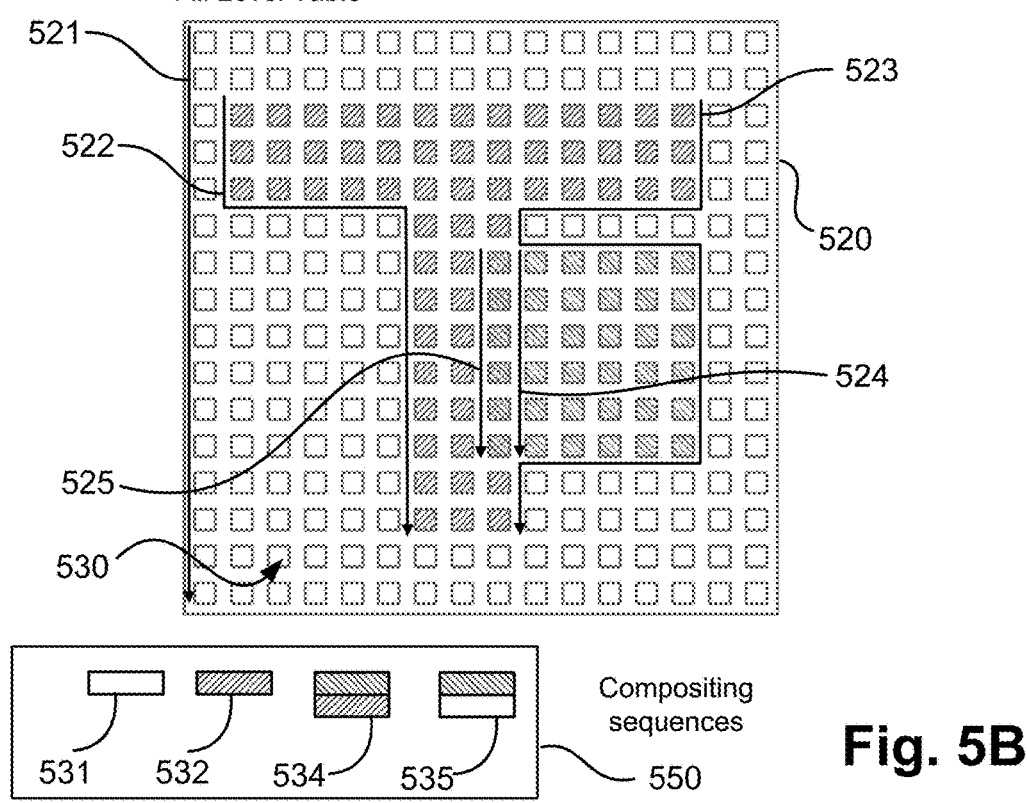

FIG. 5B shows a fillmap representation 520 of layers of graphic objects represented in the page 500 in FIG. 5A. The fillmap representation 520 defines how each pixel of the page (such as a pixel 530 of the representation 520) is to be rendered. The fillmap representation 520 is composed of five pixel-aligned fillmap edges. Each pixel-aligned fillmap edge references a fill sequence used to determine the colour of each of the pixels activated by that pixel-aligned fillmap edge. On any given scan line on which a pixel-aligned fillmap edge is active, the pixel-aligned fillmap edge activates those pixels that are immediately to the right of the pixel-aligned fillmap edge, until the next pixel-aligned fillmap edge or a page boundary is encountered. A first pixel-aligned fillmap edge 521 traces the left hand boundary of the representation 520, and references a fill sequence 531. The fill sequence 531 contains a single opaque level filled using the fill for the background 503 of the page 500. A second pixel-aligned fillmap edge 522 traces the left hand boundary of the first object 501, and references a fill sequence 532. The fill sequence 532 contains a single level which is opaque and is filled using a right hatched fill. A third pixel-aligned fillmap edge 523 references the same fill sequence 531 as the first pixel-aligned fillmap edge 521. A fourth pixel-aligned fillmap edge 524 traces the left hand boundary of the region where the second object 502 overlaps the white background and references a fill sequence 535. The fill sequence 535 contains two levels. A top most one of the two levels is transparent and is filled using a left hatched fill. The bottom most one of the two levels is opaque and is filled using the background fill. A fifth pixel-aligned fillmap edge 525 traces the left hand boundary of a region where the second object 502 overlaps the first object 501 and references a fill sequence 534. The fill sequence 534 contains two levels. The top most one of the two levels is transparent and is filled using a left hatched fill. The bottom most one of the two levels is opaque and is filled using a right hatched fill. Accompanying the fillmap representation 520 of the page 500 is a table of fill compositing sequences 550. The table of fill compositing sequences 550 contains the fill sequences 531, 532, 534 and 535 referenced by the pixel-aligned fillmap edges contained in the fillmap representation 520 of the page 500.

Two methods of generating the final (page) y-banded Page Fillmap from a sequence of PDL graphic objects 305 are now described. The order of a sequence of graphic objects on a page is known in the art as z-order. Both of the methods described are required to preserve z-order in the way the rendered output 370 is generated.

In one method, referred to as a ZY-banding method, objects in the input page representation are divided into batches in z-order. For example, a first batch contains K objects resting on the page background. A second batch contains the remaining objects in the page representation. The z-order of each object in the second batch is higher than the z-order of all objects in the first batch. Objects from the first batch are converted into an equivalent first intermediate y-banded representation consisting of B y-bands. Subsequently, objects from the second batch are converted into an equivalent second intermediate y-banded representation also consisting of B y-bands. Multiple overlapping y-band representations are assigned a z-order relationship consistent with the z-order relationship of the objects from which the overlapping y-band representations were derived. Thus, each y-band in the second intermediate y-banded representation has higher z-order than each y-band in the first intermediate y-banded representation.

In execution of the fillmap merger module 360, corresponding individual y-band representations from the first intermediate y-banded representation and the second intermediate y-banded representation are respectively merged to form the final y-banded print job 370. In general, the input page representation objects may be divided into more than two batches. If so, more than two intermediate y-banded representations can be merged during the merge pass 360. Further, if there are more batches than can be efficiently merged in one pass, more than one merging pass may be required. Merging preserves z-ordering, i.e., only the intermediate y-banded representations consecutive in z-order can be merged together.

For an input divided into N batches, the ZY-banding method performs NB y-band conversion operations from the input page representation to the intermediate y-banded representation. The amount of data in each y-band conversion operation may vary as objects typically are not spread evenly on a page. Therefore, the duration and memory requirements of y-band conversion tasks can be non-uniform.

In an alternative method, referred to as a YZ-banding method, objects in the input page representation are individually added to the y-band display list for each of the y-bands intersected by the outline of the object. A y-banded display list that reaches a certain size (say, K objects) is converted into an intermediate y-banded representation for the corresponding y-band. Thus, input object data from each y-band is converted into an intermediate y-banded representation, independently of other y-bands. If more than K objects' outlines intersect a given y-band, more than one batch of y-band data is converted for the given y-band. Therefore, the first intermediate y-banded representation for that y-band will have the lowest z-order. The second and subsequent intermediate y-banded representation for that y-band will have a higher z-order than first intermediate y-banded representation for the given y-band. The intermediate y-banded representations for different y-bands have no order relationship. The intermediate y-banded representations for a given y-band are also called z-layers of that y-band.

If there is more than one intermediate y-banded representation for a given y-band, at least one merging pass, implemented by the fillmap merge module 360, will be required for the given y-band. As with ZY-banding, merging preserves intermediate y-banded representation z-order. However, merging within each y-band is done independently of the other y-bands. YZ-banding has an advantage over ZY-banding in that the amount of data in each y-band conversion operation can be a fixed size (such as a predetermined number of objects or a fixed amount of memory) and the duration and memory requirements of y-band conversion tasks thus tend to be more uniform than with ZY banding. Furthermore, YZ-banding usually results in fewer y-banding conversion operations than ZY-banding for the same input.

Figure 11:
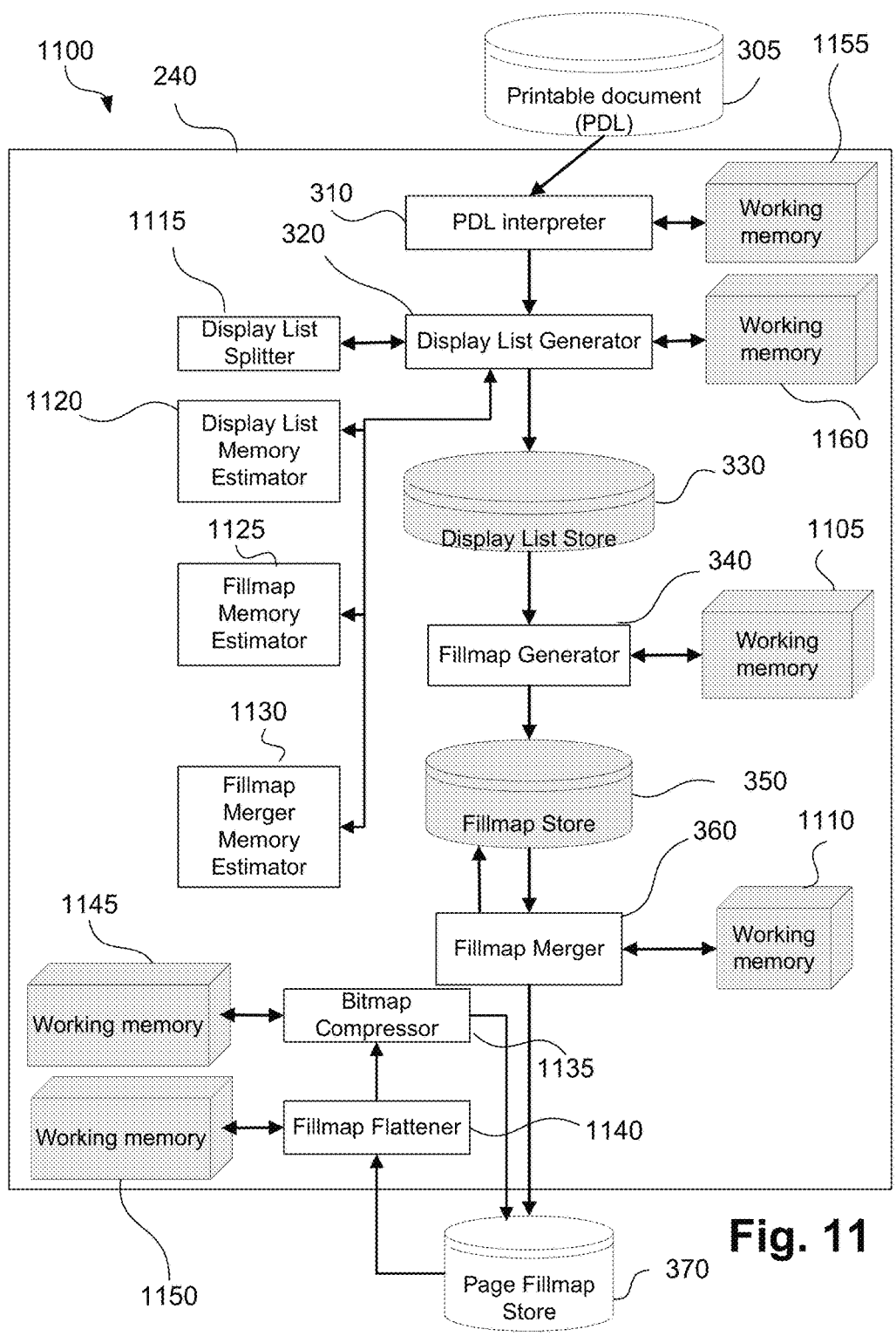
FIG. 11 shows a software architecture used in the arrangements described.

A dataflow 1100 of PDL interpretation is now explained in relation to FIG. 11. The PDL Interpreter 310 takes a sequence of drawing instructions from the PDL document 305. The PDL Interpreter 310 turns the drawings instructions into a list of drawing instructions that can be easily manipulated by the display list generator 320. The available types of drawing instructions are independent of the PDL. The drawing instructions map to a drawing interface represented by the arrow 315 in FIG. 3. Mapping the drawings instructions allows different PDL Interpreter implementations to provide data to the system 200. Examples of generic drawing instructions include:

(i) Providing global information about the page content, for example the page size, page affine transformation, colour space information and device resolution;

(ii) Drawing an object on a page, by specifying the shape, stroking and/or filling content, optional clip data of the object, and a compositing operation that defines how the object composites with any objects underneath in the z-order of the page; and (iii) Delimiting a group of objects. A group has a set of properties that apply to all member objects of the group In order to map the drawing instructions, the PDL Interpreter 310 executes to parse the incoming PDL data stream to decode a document structure and extract object data from which to generate the drawing instructions. Parsing the incoming PDL data requires the PDL Interpreter 310 to allocate working memory as described below.

Figure 4:
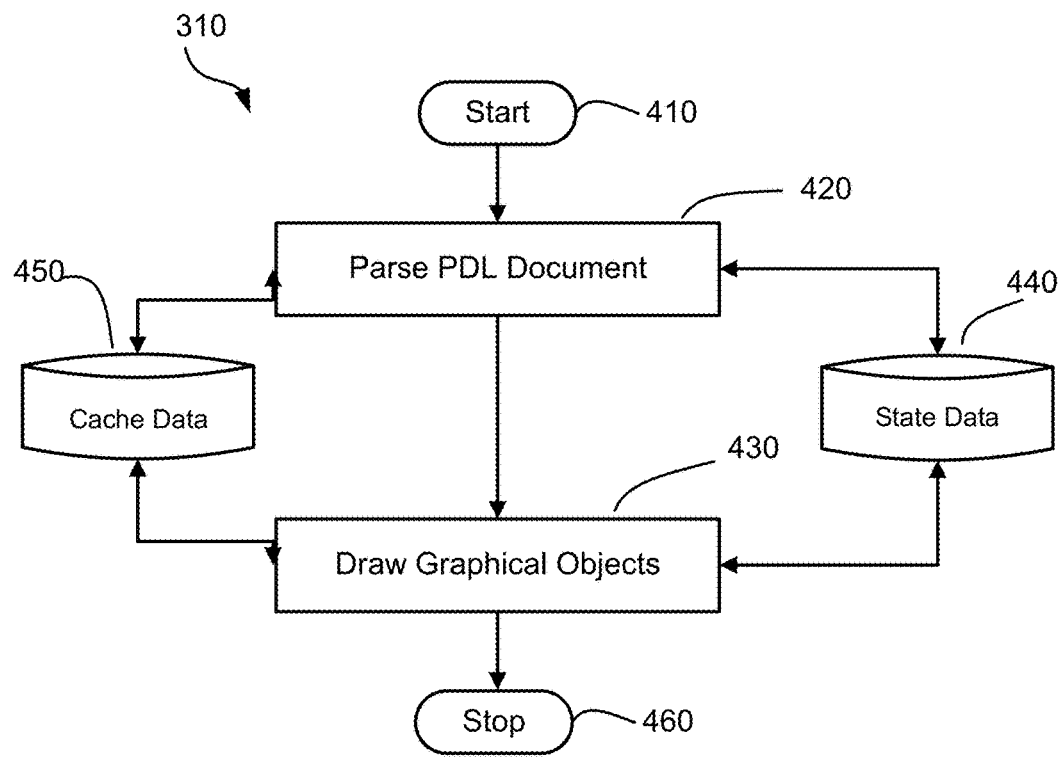
FIG. 4 shows an example memory arrangement for the PDL Interpreter in the present disclosure.

Referring to FIG. 4, two types of working data are shown. One type of working data, Cache Data 450 is used to improve the efficiency of the PDL Interpreter 310 and can be re-recreated if the portion of the memory 290 occupied by the data 450 needs to be recovered for use elsewhere in the system in case of a memory resource shortage. For example, the PDL Interpreter 310 can 'cache' frequently accessed data to facilitate processing and improve efficiency. The second type of working data, State Data 440, cannot be re-created, and must be preserved while still needed. Hence, memory occupied by the State Data 440 is not available to be reclaimed for use elsewhere in the system 200. There may be more than one PDL interpreter 310 present in the system 200 where more than PDL data format is supported. In the methods described, working memory used by each PDL Interpreter is preferably categorised into one of these two types of data 440 and 450. However, categorising data is not essential to operation of the methods described. Preferably, working data is classified as 'Cache Data' where possible, although opportunities for classifying data as 'Cache Data' will vary between PDL Interpreters.

The PDL Interpreter 310 needs to allocate memory from the Memory 290 for both the Cache Memory 450 and the State Memory 440. Any of the memory allocations can potentially fail if the requested memory is not available in Memory 290. If any of the memory allocations requested by the PDL Interpreter 310 fail, a staged memory recovery method is executed. Staged Memory Recovery is described hereafter.

Operation of the Display List Generator 320 is now described using an architecture 1100 shown in FIG. 11. The Display List Generator 320 receives drawing instructions from the PDL Interpreter 310 via common drawing interface indicated by the arrow 315. All PDL interpreters which form part of Controlling Program 240 utilise the common drawing interface. Each drawing command received by Display List Generator 320 specifies a path outline of the object being drawn, any stroking parameters associated with the path, and the fills or colours associated with the object. Fills may be a flat colour (all pixels within the object have the same uniform colour), a blend or gradient or gradation, which may be a 2 point, 3 point or radial gradient, or may be a bitmap fill.

The Display List Generator 320 performs processing on the incoming PDL object data as part of adding that object to the Display List Store 330. The processing performed by Display List Generator 320 is now described with reference to a method 600 shown in FIG. 6. The method 600 is typically implemented as one or more modules of the controlling program 240, controlled by execution of the processor 270 and stored in the memory 290.

The method 600 starts at a step 603 and proceeds under execution of the processor 270 to an adding step 605. At step 605, the Display List Generator 320 allocates memory from the Memory 290 to store path and fill data for the new object. The fill data is stored in the Display List Store 330. The method 600 then moves to a decision step 610. At step 610, the result of the allocation is checked. If the allocation failed, the method 600 moves to step 615, where staged memory recovery is executed. Staged memory recovery is described hereafter. After staged memory recovery is executed at step 615, the method 600 moves back to the step 605, and the memory allocation request is repeated. Staged memory recovery is designed to operate iteratively, so the memory allocation should eventually succeed at step 610. If the allocation request is found to be successful at step 610, the method 600 continues to a determining step 620.

At step 620, the Display List Generator 320 analyses the edge data present in the new object and determines edge complexity metrics of the object for each y-band that the object intersects. The edge complexity metrics determined at the step 620 are used for estimating memory requirements, as described in relation to step 655 below. The edge complexity metrics are also used to determine whether a complexity threshold is reached to allow efficient operation of the printing system 260.

The method 600 then moves to an identifying step 625. At step 625, the first y-band down the page intersected by the new object is identified. The method 600 then moves to a locking step 630. At step 630, the identified y-band display list is locked for updating. The method 600 then moves to an allocating step 635.

At step 635, memory is allocated from the Memory 290 for storing the object in the identified y-band display list (stored in Display List Store 330). The entry in the y-band display list is initialised to reference the object edge and fill data. The object edge and fill data, as described earlier, is stored separately in the Display List Store 330. The method 600 then moves to a decision step 640. The result of this allocation is checked at execution of step 640. If the allocation failed ("Y" at step 640), the method 600 moves to step 645 where Staged Memory Recovery is performed. The method 600 then loops from step 645 back to step 635 to retry the allocation. Staged memory recovery is designed to repeat iteratively to succeed eventually, so the memory allocation will eventually succeed at step 640. If the allocation has not failed ("N" at step 640), the method 600 progresses to an updating step 650.

At step 650, a complexity histogram of the z-layer for the current y-band is updated with complexity data for the new object as the object intersects the current y-band. The method 600 then moves to a determining step 655. At step 655, the additional working memory that will be required to generate the fillmap intermediate data for the new object, and the memory that will be required to store the additional fillmap intermediate data generated is determined or estimated. The additional working memory that will be required is determined based on the complexity histogram.

Referring to FIG. 11, a Fillmap Memory Estimator module 1125 estimates the additional fillmap generation working memory required. Further, a Fillmap Merger Memory Estimator module 1130 determines:

Additional working memory needed by a Fillmap Flattener 1140 if the Page Fillmap with the new object needs to be rendered to pixel data Additional working memory needed by a Bitmap Compressor 1135 to compress the rendered pixels Additional memory that may be required by the Page Fillmap Store 370 once the new object is merged into the Page Fillmap.

The method 600 moves under execution of the processor 270 from step 655 to a reserving step 660. At step 660, the additional memory determined in step 655 is reserved in the memory 290 using a reservation request. This memory reservation may fail if there is insufficient memory in the memory 290 to satisfy the request.

Figure 6:
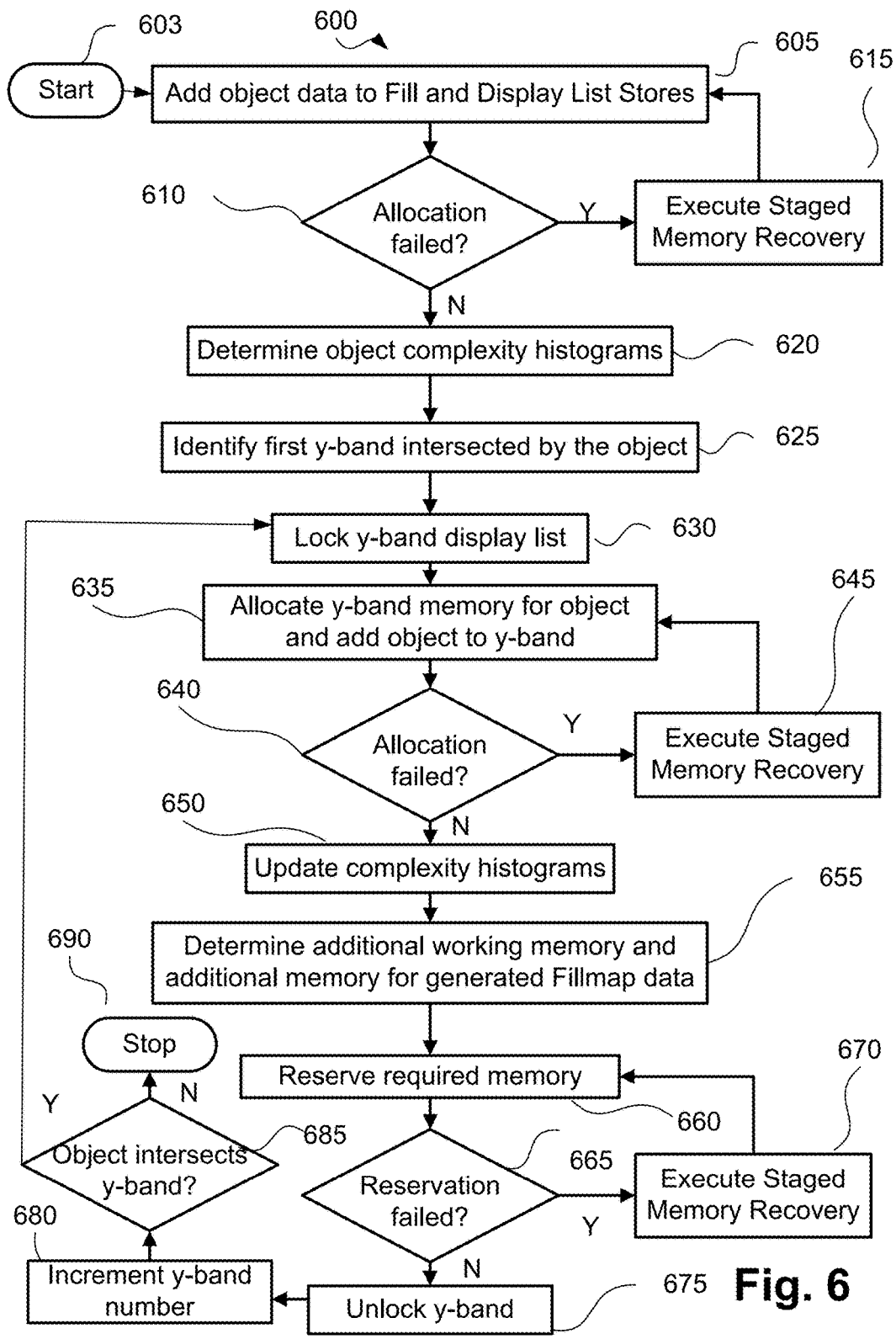
FIG. 6 shows a schematic flow diagram showing memory estimation and memory reservation in a display list generator.

The method 600 continues to a check step 665. The result of this memory reservation request is checked at step 665. Step 665 relates to detecting a memory shortage condition, as do steps 610 and 640. As shown in FIG. 6, a memory shortage condition can occur at different stages in execution of the printing system 260 in the graphics rendering system 200. For example, the memory shortage condition can relate interpretation of the page by the PDL Interpreter module 310, display list generation by the Display List Generator 320 and generation of a fillmap by the Fillmap Generator 240. In some arrangements step 665 compares memory available to a predetermined threshold of memory identified at step 655.

If the reservation failed ("Y" at step 665), the method 600 moves to a step 670 where staged memory recovery is executed in response to detecting the memory shortage condition. After staged memory recovery is executed, the method 600 moves back to step 660 and the memory reservation request is repeated. Staged memory recovery is designed to succeed eventually, so the memory allocation should eventually succeed at step 665. If the memory allocation is found to succeed at step 665 ("N" at step 665), the method 600 continues to an unlocking step 675.

At step 675, the current y-band display list is unlocked, and the method 600 proceeds to an incrementing step 680. The current y-band number is incremented at step 680. The method 600 then moves to a check step 685. A check is made at step 685 to determine whether the object intersects the new y-band. If the object intersects the y-band ("Y" at step 685), the method 600 loops back to step 630 and the new y-band display is locked for updating.

The method 600 continues as described above until the check at step 685 returns "N", i.e., the object does not intersect the y-band. In this event, all y-band display lists that are intersected by the object have been updated. The method 600 proceeds to conclude at step 690.

When PDL objects are parsed by the PDL Interpreter 310 by calling Display List Generator 320 via the graphics interface (indicated by the arrow 315), the Display List Generator 320 analyses path data in the drawn object to assess the path complexity. Assessment of the path complexity is now described with reference to FIG. 14. In FIG. 14, various graphic objects are printed on a page 1405. A large capital 'T' 1410 is drawn first, followed by a square 1411, a triangle 1413, a circle 1412, and finally an ellipse 1414. In the example of FIG. 14, the page 1405 is divided into 4 y-bands—y-band 0 1450, y-band 1 1451, y-band 2 1452 and y-band 3 1453. In practice, depending upon an environment in which the controlling program 240 is executing, particularly the available memory, cache architecture and processor, a page may be divided into many more y-bands than shown in FIG. 14. As shown in FIG. 14, the page 1405 is divided into a plurality of spatial portions, each spatial portion represented by a y-band.

The Display List Generator 320 determines the maximum number of edge crossings in each y-band. For basic shapes as shown in FIG. 14, determining the maximum number of edge crossings in each y-band is relatively straight-forward. However, if a drawn object contains complicated splines, the number of edge crossing can be more complex to determine. The edges for each object are determined separately as that object is drawn by PDL Interpreter 310. The edge crossings for the newly drawn object within a y-band are added to the edge complexity metric for that y-band, as described above. For the purposes of determining the edge complexity metric, all objects are assumed overlap in the y direction within a y-band, so the edge crossings are a conservative estimate.

In practice, y-bands are typically divided up further into smaller strips within a y-band, since y-bands may be relatively large and do not provide sufficiently small granularity, resulting in the edge complexity estimate being overly conservative. Complexity metrics are maintained separately for each strip within the y-band. Preferably, the edge complexity metrics would be maintained for individual scanlines, but the computation and memory overhead would be impractical for normal use. Maintaining the edge complexity metric on a strip basis, where strip sizes are chosen according to system processing capabilities, represents a reasonable compromise.

In the example of FIG. 14, y-band 0 1450 contains a maximum of 4 edge crossings, y-band 1 1451 a maximum of 8 edge crossings, y-band 2 1452 a maximum of 8 edge crossings, and y-band 3 1453 a maximum of 4 edge crossings. In practical pages, many objects are much smaller than the y-band size chosen (for example text), and the number of objects intersecting a y-band are typically much greater, so sub-y-band strips provide a more accurate edge complexity metric.

Referring to FIG. 11, the maximum number of edge crossings for a y-band is used by the Fillmap Memory Estimator 1125 to determine the working memory required to convert the object into fillmap format, and by the Fillmap Merger Memory Estimator 1130 to estimate working memory for merging pending z-layer fillmaps and the memory for storing the final Page fillmap. The memory estimation determined by the Fillmap Memory Estimator 1125 and the Fillmap Merger Memory Estimator 1130 takes into account object properties other than edges, for example, clips, fills and compositing information.

Each of the modules shown in FIG. 11 require working memory in order to process incoming PDL graphics. The required working memory is allocated by a memory manager from Memory 290. Each of the data stores in FIG. 11 also requires memory to store output data from the processing modules derived from the incoming PDL graphics. This memory is allocated using a memory allocator from the memory 290. The size of working memory and output data memory required by each module in FIG. 11 depends partly on the structure and complexity of the input data to each processing module shown in FIG. 11, and is indirectly related to the structure and complexity of the incoming PDL data for the page being processed. However, each processing module in FIG. 11 also has an ideal volume of input data that the module desires in order to generate output data in the optimised mode of operation. The optimised mode of operation is dependent on a number of factors, including the size and structure of the cache memory architecture of the Controlling Processor 270. In a normal mode of operation, all the modules described in FIG. 11 are configured to operate in the optimised mode of operation. The memory usage by the modules in FIG. 11 is not arbitrarily restrained in the optimised mode of operation, even though the memory 290 of Printer System 260 is typically be of a fixed size. The memory allocators used in the methods described are described below.

Each module shown in FIG. 11 has an assigned memory allocator which the module will call when necessary to reserve or allocate additional working memory, or to allocate memory to store new input or output data. Any call to the allocator to reserve or allocate additional memory may fail if the requested memory is not available from the Memory 290. The architecture 1110 shown in FIG. 11 can re-prioritise memory usage throughout the pipeline shown in FIG. 11 in order to satisfy the memory request. The reprioritising of memory usage can result in memory being reclaimed from one or more of the modules shown in FIG. 11, for example from print description language interpreter module 310 or the display list generator module 320. The memory reclamation is described below. If a memory allocation does initially fail, the architecture 1100 shown in FIG. 11 enters a memory efficient mode of operation in which each module described in FIG. 11 is reconfigured to operate with a constrained memory usage, being lower than with the optimised mode of operation.

Figure 8:
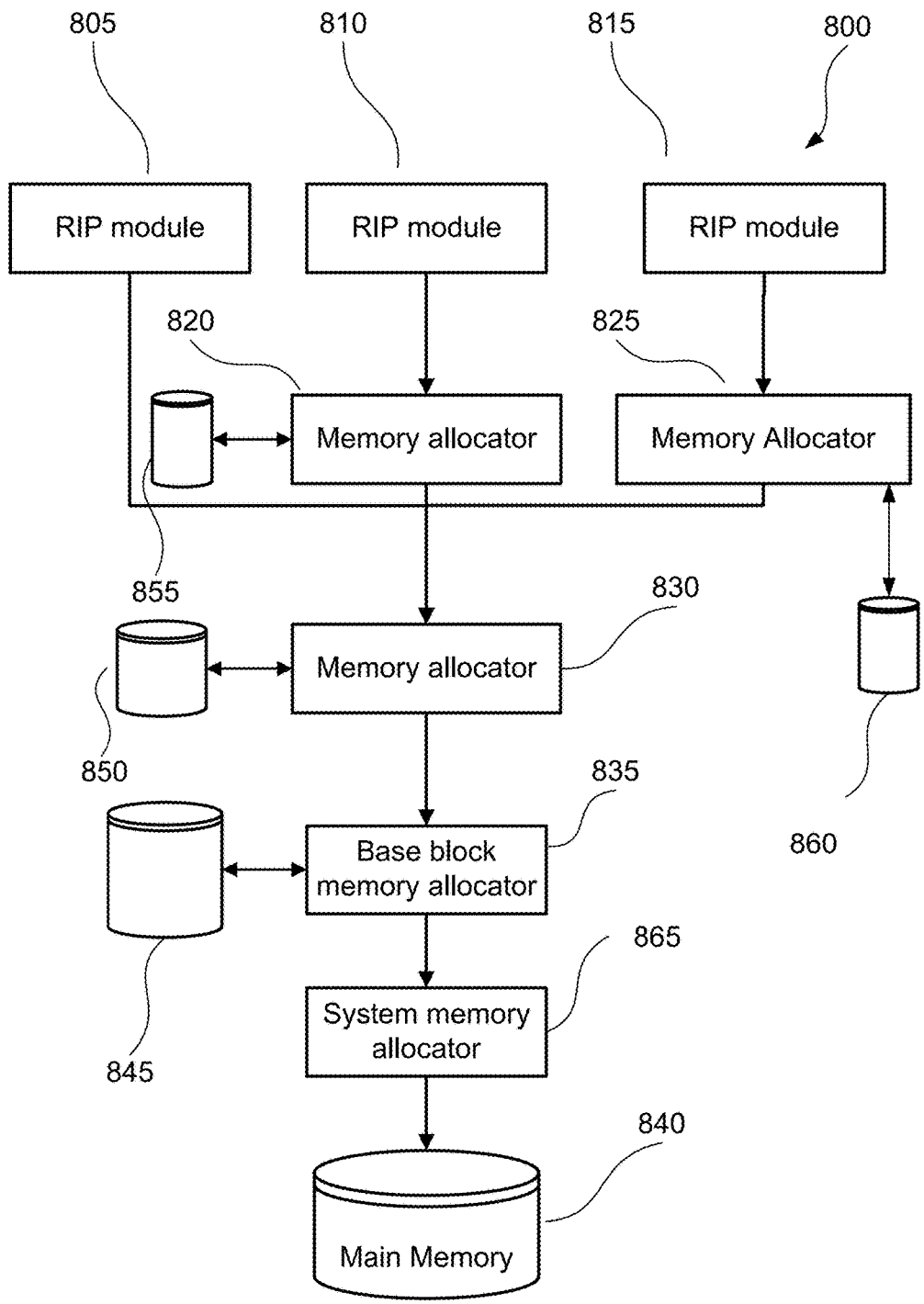
FIG. 8 shows an example of a memory allocator architecture as used in the methods described.

The arrangements described utilise a multi-level memory allocator architecture (such as shown in FIG. 8) to facilitate memory management and memory recovery by the controlling program 240. Memory recovery is simplified by assigning separate memory arenas for different purposes, where each memory arena is managed by a separate memory allocator. The data stored in each memory arena shares a common purpose and typically common lifetime over which the data is required to persist. Upon successful completion of a processing step, memory recovery can often be achieved by simply deleting the relevant memory arena. The arrangements described include memory recovery in the event of a memory allocation failure, where a processing step must be aborted as part of error recovery processing. Deleting a memory arena greatly facilitates returning the system to a state that existed at the start of the processing step. Freeing memory which is discontiguous due to memory fragmentation may not result in sufficient contiguous memory being available to satisfy a failed memory request. In previously-known systems, freeing discontiguous memory often results in much more than the required memory being freed in order to achieve the required contiguous memory. Since memory allocations in the methods described are grouped by common purpose, with a memory arena used for each purpose, memory fragmentation is greatly reduced Probability of recovering the required contiguous memory is accordingly improved. As a result, memory efficiency is greatly improved by only freeing memory needed to satisfy the allocation request. In turn, performance impact on the system 200 can be minimised.

A memory allocator architecture 800 is now described in relation to FIG. 8 and FIG. 9. FIG. 8 and FIG. 9 describe a simplified version of the memory allocator architecture used in the methods described. In the example of FIG. 8 and FIG. 9, an architecture 800 having four levels of memory allocators are used. Typically, the memory 290 in the printing system 260 will be managed by a system memory allocator 865. The system memory allocator 865 is outside the scope of the controlling program 240 in the methods described. The controlling program 240 typically defines a base block memory allocator 835, to better facilitate memory management in controlling program 240.

Referring to FIG. 8, during operation of the controlling program 240, a RIP module 805 requests memory from an assigned memory allocator 830. A RIP module 810 requests memory from an assigned memory allocator 820, and a RIP module 815 requests memory from an assigned memory allocator 825. When necessary, the memory allocators 820 and 825 request memory from common parent memory allocator 830. The memory allocator 830, when necessary, requests memory from the Base Block Memory Allocator 835. The Base Block Memory Allocator 835 requests memory from a system memory allocator 865 when required. The system memory allocator relates to a main memory 840, typically outside the printer system 260.

Each of the RIP System memory allocators 820, 825,830 and 835 uses a local store (855, 860, 850 and 845 respectively) to track allocated and free memory blocks, as shown in FIG. 8, whenever a memory block is requested from that allocator. Each of the memory allocators 820, 825, 830 and 835 has a native memory block size, where the allocator requests memory blocks of multiples of that size from a corresponding parent allocator. Memory requested from a memory allocator will be allocated from the native memory blocks held by each allocator.

Figure 9A:
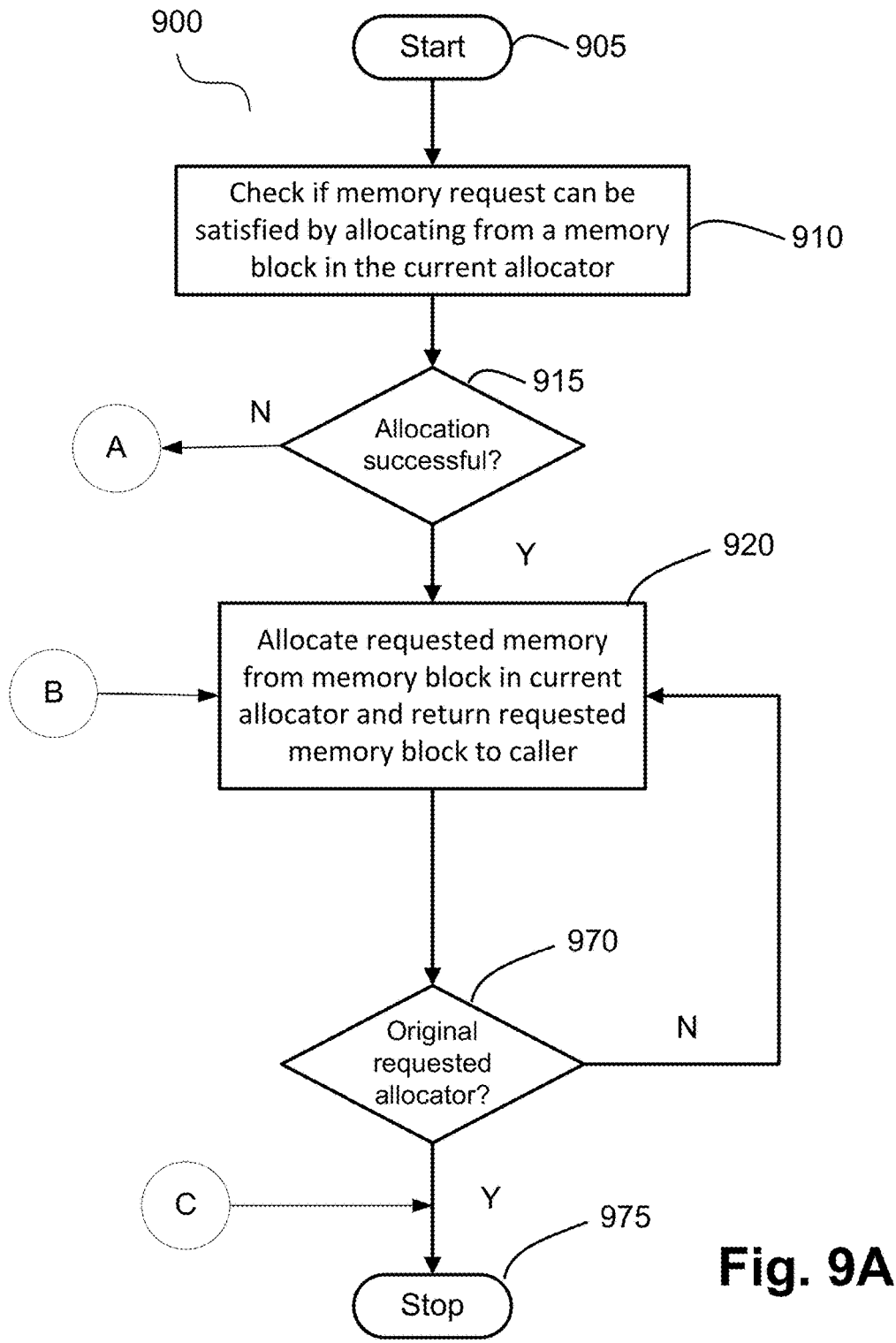
FIGS. 9A and 9B show a schematic flow diagram of a memory allocation strategy.
Figure 9B:
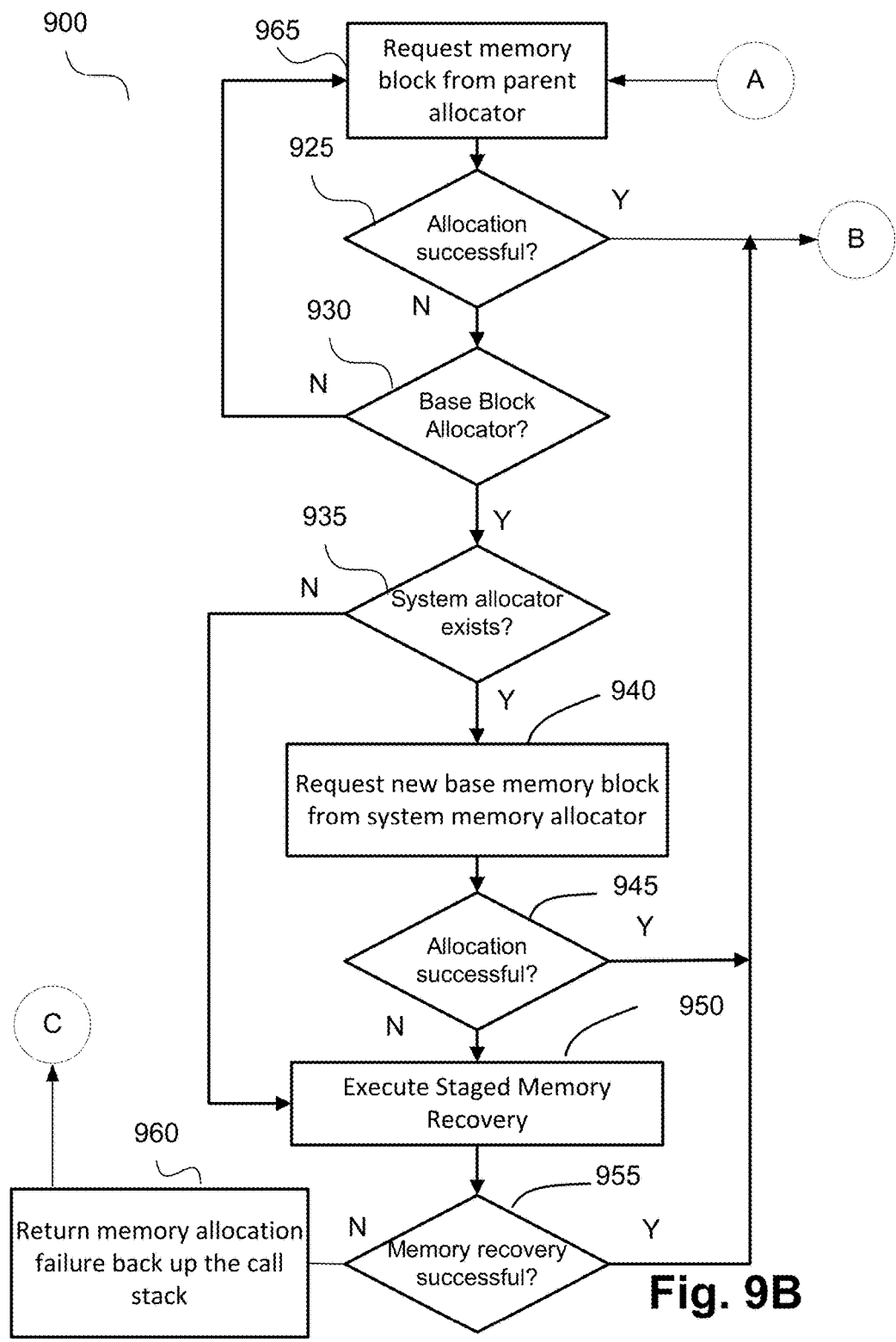

Turning to FIGS. 9A and 9B, a method 900 of memory allocation is shown. The method 900 is implemented as one or more modules of the controlling program 240 (for example module shown in FIG. 11), controlled by execution of the processor 270 and stored in the memory 290. The method 900 relates to a memory allocator such as any of the allocators 820, 825, 830 and 835.

The method 900 starts at step 905, and moves straight to a check step 910 At step 910, a called memory allocator (for example the memory allocator 830) checks if the requested memory buffer can be allocated from any of the free memory blocks held by the memory allocator. The method 900 continues to a check step 915. At the check step 915, the method 900 determines if the memory allocation was successful. If the memory allocation was successful ("Y" at step 915), the method 900 moves to step 920. At step 920 the memory allocator divides the allocated free memory block into two parts—the requested memory buffer, and the remaining free memory block. The remaining free memory block is added to a list of free memory blocks maintained by that allocator.

The method 900 then moves to a check step 970. At the check step 970, the method 900 checks if the currently active memory allocator is the allocator that was originally called by the application module to allocate the memory buffer. If the check is affirmative ("Y" at step 970), the method 900 concludes at step 975. At step 975 the requested memory buffer is returned to the caller.

If the check at step 970 is negative ("N" at step 970), the method 900 moves back to step 920, where the allocated memory block is returned to the calling child memory allocator (for example, the memory allocator 820). The child memory allocator divides the returned memory block into two parts—the memory block requested by the caller, and the remaining free memory block. The remaining free memory block is added to the list of free memory blocks maintained by the allocator.

The method 900 moves to step 970. The method 900 will loop around steps 970 and 920 until the controlling program 240 returns back to the allocator originally called by the application module with the original memory request. The loop of steps 920 to 970 described above relates to implementation as a recursive memory allocator.

If step 915 determines that the memory allocation was unsuccessful ("N" at step 915), the method 900 moves to a request step 965 (FIG. 9B). At step 965 the memory allocator requests the allocation of a new memory block from the parent memory allocator. For example, memory allocator 820 will request a new memory block from memory allocator 830. As described above, each memory allocator has a native memory block size, from which the memory allocator will allocate requested memory blocks. In the arrangements described, the native memory block size is typically larger than any memory request made to the allocator. Accordingly, the native block size of a parent memory allocator is optimally larger than the native block size of the child memory allocator calling the parent memory allocator. Using powers of two is typical practice—for example, if a child native block size is 64 KB, the patent native memory block size might be 128 KB or 256 KB. Using such relative sizes helps to minimise memory fragmentation.

The method 900 then moves to a check step 925. At step 925 a check is made as to whether the memory request to the parent memory allocator was successful. If step 925 finds the allocation to be successful ("Y" at step 925), the method 900 returns to step 920, and the memory block returned from the parent memory allocator is divided up into a number of native memory blocks in the current allocator. The memory block requested of that allocator is then returned to the caller as described above.

If step 925 determines that the allocation was unsuccessful ("N" at step 925), the method 900 moves to a check step 930. At step 930, a check is made as to whether the current allocator is the base block memory allocator 835. The base block memory allocator 835 is the memory allocator whose parent memory allocator is the system memory allocator 865. The system memory allocator 865 is outside the controlling program 240. In some applications, the system memory allocator 865 is provided by the underlying operating system. In some embedded applications however, there may be no system memory allocator—the controlling program 240 is given a fixed block of memory (possibly most memory in the embedded system) at start-up, with no opportunity to request more memory at execution time.

If step 930 determines that the current allocator is the base block memory allocator ("Y" at step 930), the method 900 moves to a check step 935. The method 900 checks if a system allocator exists at step 935. If so, ("Y" at step 935), the method 900 continues to a step requesting step 940. At step 940, where an allocation request is made to the underlying system memory allocator. The method 900 then moves to a check step 945. At step 945, a check is made as to whether the request to the system memory allocator was successful. If the request was successful ("Y" at step 945), the method 900 moves to step 920, and continues as described above.

If the result of step 945 is negative ("N" at step 945), the request to the system memory allocator has failed, and the method 900 moves to step 950. At step 950, Staged Memory Recovery is executed. Operation of Staged Memory Recovery is described hereinafter.

Once Staged Memory Recovery is complete at step 950, the method 900 moves to a check step 955. At step 955, a check is made on the result of staged memory recovery. If the check is affirmative and staged memory recovery was successful ("Y" at step 955), the method moves to step 920, and continues as described above.

If the result of step 955 determines that staged memory recovery was unsuccessful ("N" at step 955), the method 900 moves to a return step 960. Step 960 returns the memory allocation failure and the method 900 proceeds to step 975. At step 975 an error code is returned. The error code is passed back up the hierarchy of memory allocators until the error code is returned to the calling application module (for example 810).

If the result of step 935 is negative, there is no system memory allocator present, so the method moves directly to step 950 and staged memory recovery is executed.

If step 930 determines that the current allocator is not the base block memory allocator ("N" at step 930), the method 900 moves to step 965 and the parent memory allocator of the current memory allocator is called. The loop consisting of steps 965, 925 and 930 is typically implemented as a recursive function construct. Eventually, the step at 925 or step at 930 will return affirmative and the method 900 will exit the loop, and eventually complete processing at step 975.

Operation of staged memory recovery is now described with reference to FIG. 10. Modules within the controlling program 240 which allocate memory for various purposes will typically also define methods for freeing memory when requested. Some of the modules can have intermediate or working data that can be recreated if deleted, in some instances at the expense of reduced performance. Other modules can reduce memory usage by transforming working data into a different form which is smaller by using a lossless or lossy transformation. Such transformations can in some instances result in reductions in performance, output quality or both. Not all modules have the capability of releasing memory when requested—some modules may have intermediate or working data that cannot be recreated if deleted, and cannot be transformed. For example, modules 805 and 810 may be able to reduce memory usage, but module 815 may not be able to reduce memory usage.

The memory management architecture in the methods described permits modules of the controlling program 240 to register a callback function with one of the memory allocators described in relation to FIG. 8. When called by a memory allocator, a callback function executes a defined memory reduction strategy for the associated module. This strategy can depend upon the state of the system when the call is made. For example, the callback function may involve determining if the printing system 260 is in a first state corresponding to the memory shortage or a second state corresponding to a state when the system recovered from the memory shortage condition. The strategy of the callback function may also depend upon the severity of the memory reduction request.

In FIG. 8, the module 805 registers a memory reduction callback function with the memory allocator 830. The module 810 registers a memory reduction callback function with the memory allocator 820. The module 815 does not register a memory reduction callback function, as noted above.

In the methods described, memory reclamation is coordinated from the memory management subsystem described in FIG. 8, and specifically from one designated memory allocator. Any memory allocator in the memory management subsystem can be the designated memory allocator, as long as the memory allocator is a parent of all memory allocators participating in memory reclamation in the controlling program 240. In the example of FIG. 8, the designated memory allocator is the base block memory allocator 835. However, memory allocator 830 could also fulfil this purpose.

When the module 805 registers a callback function with the memory allocator 830, the memory allocator 830 in turn registers the callback function with the base block memory allocator 835. When the module 810 registers a callback function with the memory allocator 820, the memory allocator 820 registers the callback with the memory allocator 830. The memory allocator 830 in turn registers the callback with base block memory allocator 835. In a practical implementation, many modules will typically exist which also register memory reclamation callback functions. All callback functions will ultimately be registered with the designated memory allocator, in the example discussed herein being the base block memory allocator 835.

Staged memory recovery consists of the designated memory allocator (in this case the base block memory allocator 835) calling the registered memory reduction callback functions in a predefined order, taking in to account the system state and the current severity of the memory reduction.

As described in FIG. 9, staged memory recovery is executed in step 950, when no more memory can be allocated from existing free memory in the memory 290.

Associated with each memory reduction callback function is a priority order. The priority order determines the order in which the callback function is called relative to other registered functions. All registered callback functions can be called at all severity levels in a sequence determined by the priority order of the registered callback functions.

In the arrangements described, application modules in the controlling program 240 can independently register a staged memory reduction callback function and associate the callback function with a priority order. The memory allocator assigned the role of executing the staged memory recovery strategy in the present example is the base memory allocator 835. The base memory allocator 835 maintains a table which lists the memory callback reduction functions that may be called at each severity level.

Figure 10:
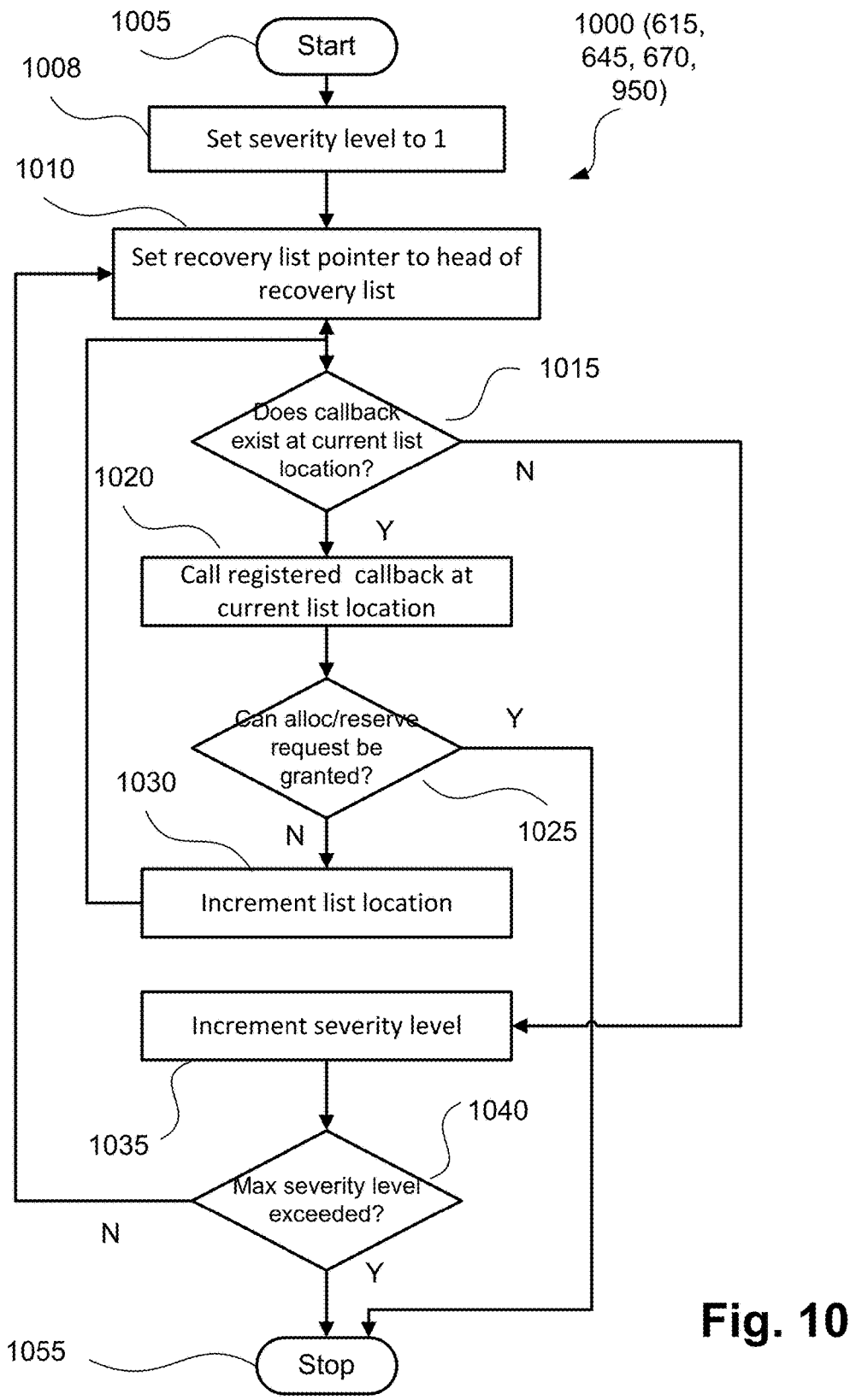
FIG. 10 shows operation of a staged memory recovery strategy used in the methods described.

Detail of operation of staged memory recovery is now described in relation to FIG. 10. FIG. 10 shows a method 1000 of implementing staged memory recovery. The method 1000 is typically implemented as one or more modules of the controlling program 240, and controlled by execution of the processor 270.

The method 1000 starts at step 1005 in FIG. 10, and moves to a setting step 1008. At step 1008, the current staged memory recovery severity level is set to 1. The method 1000 then moves to step 1010. At step 1010, a current staged memory recovery callback pointer is set to the head of the list of memory reduction callback functions. The method 1000 then proceeds to a check step 1015. At step 1015, a check is made as to whether there is any memory reduction callback function that can be called. If the check is affirmative ("Y" at step 1015), the method 1000 moves to a calling step 1020. At the step 1020 the memory reduction callback function is called. Typical processing carried out by a memory reduction callback function is described hereafter in relation to FIG. 15.

When the memory reduction callback function completes, the method 1000 moves to a check step 1025. At step 1025, a check is made on the result returned by the callback function to determine if the memory allocation or reservation request can now be granted. If the check is affirmative ("Y" at step 1025), the method 1000 completes at step 1055.

If the check at step 1025 generates a negative answer ("N" at step 1025), the method 1000 moves to an incrementing step 1030. At the step 1030 the base memory allocator 835 moves to the next memory callback function in the list of memory callback functions. The method 1000 then loops around to step 1015. The method 1000 breaks out of the loop starting at step 1015 in one of two ways. Step 1025 can determine that the memory allocation or reservation request can be granted ("Y" at step 1020), or step 1015 may determine that there are no more memory callback functions that can be called ("N" at step 1015). If step 1015 determines that there are no more memory callback functions that can be called, the method 1000 moves to an incrementing step 1035. At step 1035, where the staged memory recovery severity level is incremented.

The method 1000 then moves to a check step 1040. At step 1040, a check is made to determine the severity level exceeds a maximum supported level. If so ("Y" at step 1040), staged memory recovery has failed, and the method 1000 completes at step 1055.

If the check at step 1040 returns negative ("N") at step 1040, the method 1000 loops back to step 1010 and the current callback pointer is set to the head of the list of memory reduction callback functions. Eventually, the method 1000 will return to step 1055.

Figure 15:
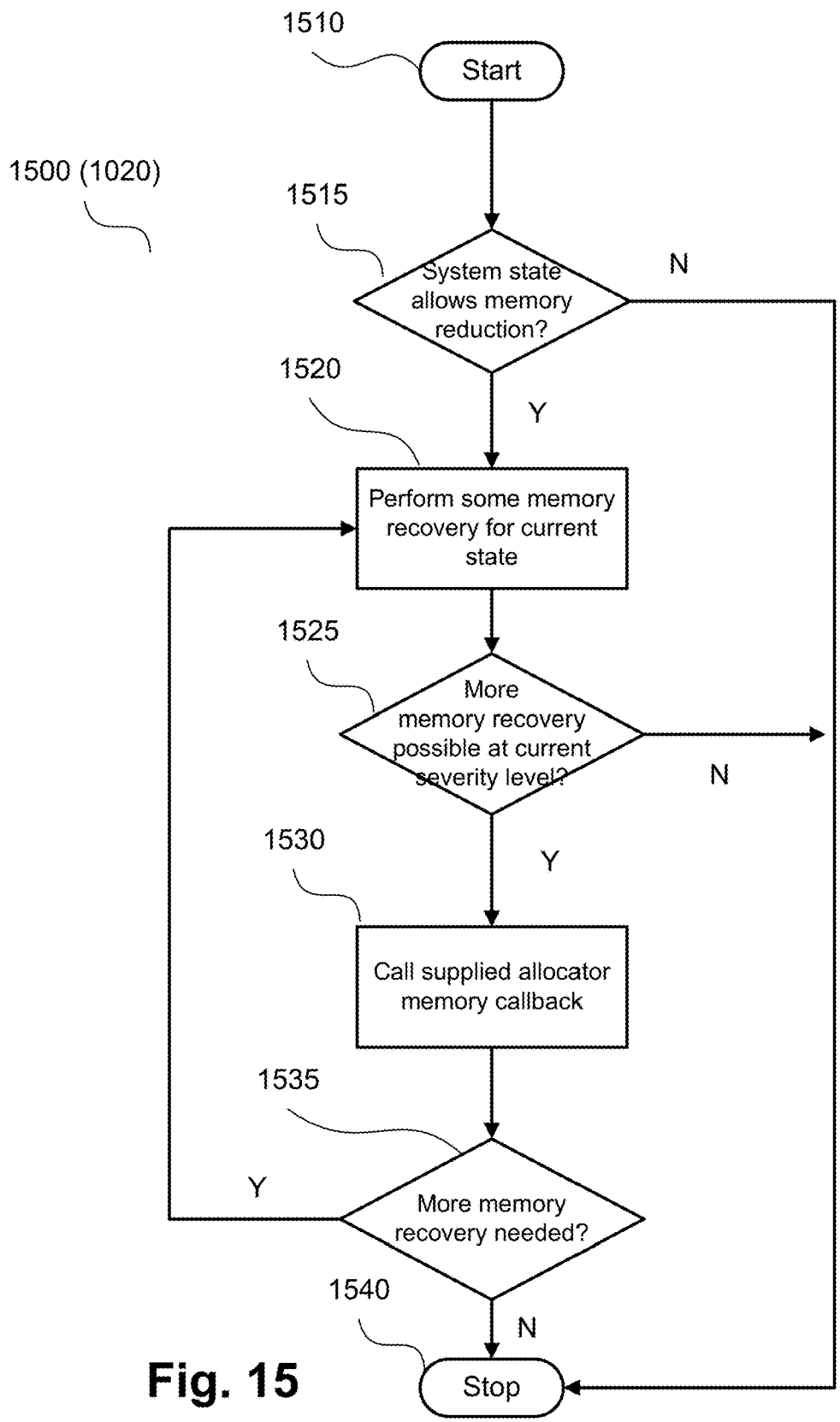
FIG. 15 shows a schematic flow diagram of a method for memory callback function for reducing memory usage.

A method 1500 of implementing a memory reduction callback function, as implemented at step 1020, is now be described in relation to FIG. 15. All memory reduction callback functions registered with the Base Block Memory Allocator 835 will follow the general method 1500. The method 1000 is typically implemented as one or more modules of the controlling program 240, and controlled by execution of the processor 270.

The method 1500 starts at step 1510 and moves directly to a check step 1515. In step 1515, the called memory reduction function determines if the current system state allows memory reduction in the application module that the memory callback function belongs to. The memory reduction activities permitted in each application module for each system state are defined in Table 1 below. If the result of step 1515 is negative ("N" at step 1515), the method 1500 completes at step 1540.

If the result of step 1515 is affirmative ("Y" at step 1515), the method 1500 moves to a performing step 1520. At step 1520, the callback function performs a given level of memory reduction. At any given staged memory recovery severity level, a typical memory callback function may not initially release all the memory that could be released at that staged memory recovery severity level. All the memory may not be initially released as only sufficient memory to satisfy the failed memory request may be necessary. It would be undesirable to release more than enough memory, as this is likely to impact performance or possibly output quality more than necessary. The method 1500 then moves to a check step 1525.

At step 1525, a check is made to determine if more memory can be recovered at the current staged memory recovery severity level. If the answer is affirmative ("Y" at step 1525), the method 1500 moves to a calling step 1530. The memory reduction callback function checks if sufficient memory has just been released at the step 1530. Step 1530 is achieved by calling a function in the memory allocator via a pointer that was supplied when the allocator called the memory reduction callback function. In other words, the application memory callback function calls a memory allocator callback function. The method 1500 then moves to a check step 1535 where the result of the callback to the allocator is checked to determine if more memory needs to be recovered. Effectively, step 1530 checks if memory released satisfies a memory allocation request. If the check is affirmative ("Y" at 1535), the method 1500 loops back to step 1520 and the memory callback function releases additional memory. The method 1500 continues around the loop started at step 1520 until sufficient memory has been released at the current staged memory recovery severity level, or there is no more memory that can be released at the current staged memory recovery severity level. If the result of step 1535 is that no more memory recovery is required ("N" at step 1535), the method 1500 ends at step 1540.

Tables 1 and 2 below describe the memory recovery actions performed by the PDL Interpreter memory reduction callback function, and actions performed by the Fillmap Generator memory reduction callback function at various severity levels, and in the two states (object processing and fillmap generation/merging) used in the controlling 240. As shown in Table 2, no memory recovery actions can be performed by the Fillmap Generator 340 whilst Fillmap Generator 340 is already in the process of converting a y-band display list into the equivalent y-band fillmap. In other words, Fillmap Generator 340 is not re-entrant. Description is provided hereafter of how memory allocation or reservation errors are handled during fillmap generation.

Tables 1 and 2 provide example memory reduction severity levels that can be used in the methods described. The memory reduction callback architecture is flexible however, so that more elaborate memory reduction severity levels can be readily defined. In addition, other memory reduction callback functions can be defined if necessary.

TABLE 1

Staged Memory Recovery Actions - PDL Interpreter 310

| Severity level | Staged Memory Recovery State | Staged Memory Recovery Action |
|---|---|---|
| 1 | PDL interpreter, Display List object processing | PDL interpreter releases cache data that can be quickly recreated |
| | fillmap generation, merging | PDL Interpreter releases cache data that can be quickly recreated |
| 2 | PDL interpreter, Display List object processing | PDL interpreter releases cache data that takes longer to recreate |
| | fillmap generation, merging | PDL interpreter releases cache data that takes longer to recreate |
| 3 | PDL interpreter, Display List object processing | Nothing |
| | fillmap generation, merging | Nothing |

TABLE 2

Staged Memory Recovery Actions - Fillmap Generator 340

| Severity level | Staged Memory Recovery State | Staged Memory Recovery Action |
|---|---|---|
| 1 | PDL interpreter, Display List object processing | Convert large y-band display lists to Fillmap format |
| | fillmap generation, merging | Nothing |
| 2 | PDL interpreter, Display List object processing | Convert small y-band display lists to Fillmap format |
| | fillmap generation, merging | Nothing |
| 3 | PDL interpreter, Display List object processing | Perform sub-z-layering |
| | fillmap generation, merging | Nothing |
| 4 | PDL interpreter, Display List object processing | Merge pending y-band fillmaps into page fillmap, render background fillmap to pixels & compress |
| | fillmap generation, merging | Nothing |
| 5 | PDL interpreter, Display List object processing | Reduce quality of background pixel image |
| | fillmap generation, merging | Nothing |

As can be seen in the Tables 1 and 2 above, actions taken in staged memory recovery can depend upon where the memory reservation or memory allocation error occurs. Referring to FIG. 11, if a memory error shortage is in the PDL Interpreter 310 or in Display List Generator 320, then a full range of memory recovery strategies may be invoked, as described above.

However, if the memory shortage occurs in the Fillmap Generator 340 or the Fillmap Merger 360, then only a restricted memory recovery strategy can be immediately utilitized. Staged memory recovery actions typically performed by the PDL interpreter 310 and Fillmap Generator 340 are described in more detail below.

Figure 7:
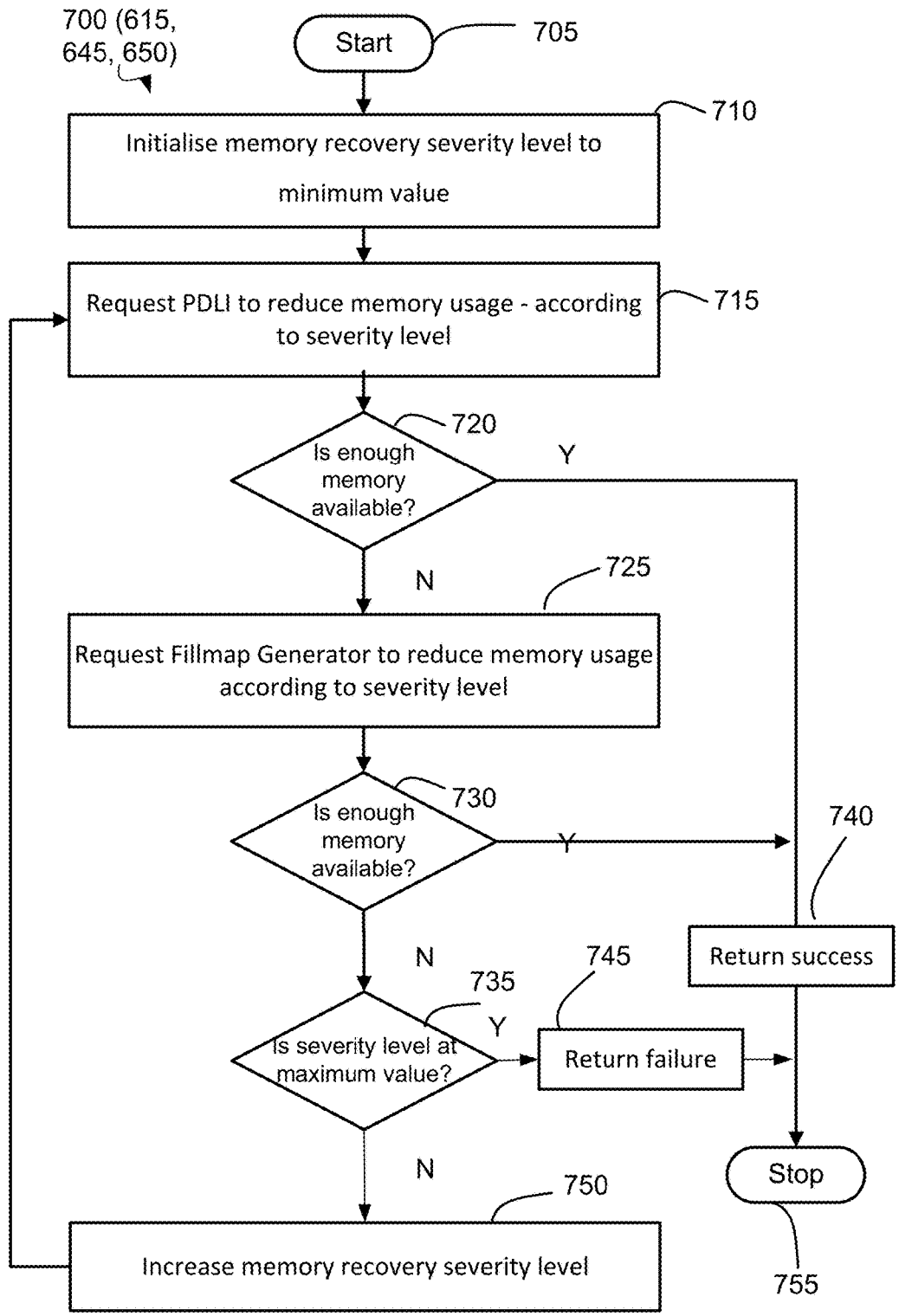
FIG. 7 shows a schematic flow diagram of a high-level memory recovery strategy used in the methods described.

An overview of staged memory recovery is now described using FIG. 7 to highlight other aspects thereof. A detailed staged memory recovery mechanism is described above in relation to FIG. 10. In the arrangements described, the severity of memory reclamation can be progressively increased until the requested memory is made available, for example until an amount of memory required by a memory allocation request has been released. The methods described feature a number of levels of memory reclamation severity. Initially, low severity memory reclamation is used which avoids any loss in output quality, and minimises any performance reduction. If insufficient memory is recovered using low severity memory recovery, the memory reclamation severity level is increased which means that a larger impact on performance is deemed acceptable. Again, if insufficient memory is recovered, and the memory reclamation severity is increased further, allowing some loss of output quality. As the severity level is further increased in stages, the level of quality loss is progressively increased in stages until sufficient memory is reclaimed to satisfy the original memory request.

Referring to FIG. 7, a method 700 of managing a severity level is shown. The method 700 starts at step 705 and moves to an initialising step 710. The memory reclamation severity is set to a minimum level at step 710, similarly to setting the severity level to 1 at step 1008. The method 700 then proceeds to a requesting step 715. The PDL Interpreter 310 is requested to reduce memory usage according to the current severity level at step 715, as described above. The PDL interpreter 310 can classify the working memory into a number of types, depending upon whether the data in the memory may be regenerated or not, and if so, at what cost in terms of performance reduction. The system shown in FIG. 4 defines two types of memory—State Memory 440 and Cache Memory 450. In the arrangements described, the PDL Interpreter 310 partly frees the Cache Memory 450 when requested at staged memory recovery severity level 1. The remainder of the Cache Memory 450 is freed at staged memory recovery severity level 2. The State Memory 440 is not freed at any severity level. However, the PDL Interpreter 310 may have other types of data in Cache Memory 450, and may free the other types of data in order of increasing performance impact.

After step 715, the method 700 continues to a check step 720. At check step 720 the controlling program 240 checks if sufficient free memory exists to satisfy the failed memory request. If the check is affirmative ("Y" at step 720), the method 700 continues to a returning step 740. The result of the memory request is set to success at step 740, and the method 700 proceeds to complete at step 755.

If the answer at step 720 is negative ("N" at step 720), the method 700 continues to a requesting step 725. At step 725, where the Fillmap Generator 340 is requested to reduce memory usage by performing specific memory recovery actions for the current severity level as described in Table 2. Operation of step 725 is described hereafter. The method 700 then continues to a check step 730. At step 730, the controlling program 240 checks if sufficient free memory now exists to satisfy the failed memory request. If the check is affirmative ("Y" at step 730), the method 700 continues to step 740 and the result of the memory request is set to success. The method 700 then completes at step 755.

If the answer at step 730 is negative ("N") at step 730), the method 700 continues to step 735. The controlling program 240 checks if the memory reclamation severity level is already at the maximum value. If the check is affirmative ("Y" at step 735), the method 700 continues to a return step 745. The result of the memory request is set to failure at step 745, before the method 700 completes at step 755.

If the check at step 735 is negative ("N" at step 735), the method 700 continues to an increasing step 750. At step 750, the memory reclamation severity level is increased. The method 700 then loops back to step 715.

The method 700 continues around the loop described in FIG. 7 until either sufficient memory is released so that the memory allocation request is satisfied at step 720 or 730 and success is returned, or insufficient memory is available at the maximum memory reclamation severity level at step 735, in which case failure is returned.

The processes described in the method 700 of FIG. 7 can be extended to many more than two system modules which can be requested to reduce memory usage. The memory reclamation architecture described can support a number of such modules.

The first memory reduction callback function typically called is the PDL Interpreter callback. As described in relation to FIG. 4, the PDL Interpreter callback function typically discards Cache Data 450, but may discard any data that can be regenerated at relatively minimal cost. In Table 1, two levels of memory recovery are defined. However different PDL Interpreters may define less or more levels of memory recovery actions that can be taken. Also, as described above, even within a staged memory recovery severity level, the PDL Interpreter 310 can progressively release memory in stages. Alternatively, the PDL Interpreter 310 can register more than one memory callback function which can reduce memory.

Typically, during processing of a page, the Display List Store 330 contains a number of y-band display lists, and potentially a display list for each and every y-band down the page. For some pages however, there may be no objects in certain y-bands, so the display lists for those y-bands will be empty. The display list for a y-band defines the current z-layer for that y-band. Hence only one z-layer display list may exist for a y-band at any given time. For moderate to high complexity pages, in the optimised mode of operation of the controlling program 240, a y-band display list may reach a sufficiently high level of complexity, that the z-layer for that y-band will be converted to fillmap format, and stored in the Fillmap Store 350. At that time or later, the current y-band display list can be deleted to recover memory. A new z-layer display list will then be started for that y-band.

In the optimised mode of operation, the Display List Generator 320 sets a graphic complexity limit for a z-layer display list at a level selected so that the method performed by Fillmap Generator 340 is optimal (in terms of throughput) for the processor 270 and cache/memory architecture that controlling program 240 is executing on. The graphic complexity limit represents a first complexity threshold chosen to facilitate through put of the system 200. The first complexity threshold is typically determined through experimentation with different types of documents. An example of a first complexity threshold is 1000 objects. In some arrangements, the first complexity threshold can relate to the complexity histograms determined at step 650—for example 2000 edges for the y-band z-layer. In another arrangement, the first complexity threshold can relate to the lowest of a complexity characterised by the number of objects or a complexity characterised by the number of edges.

If staged memory recovery is triggered in controlling program 240, the Display List Generator 320 reduces the permitted level of graphics complexity, for example to a second complexity threshold, for a z-layer fillmap, and enters the memory efficient mode of operation. In the memory efficient mode of operation the second complexity threshold is reduced. The second complexity threshold is lower than the first complexity threshold to address the memory shortage condition. For example, the second complexity threshold can relate to 500 objects or 1000 edges per y-band z-layer. The reduced complexity threshold reduces the working memory needed by the Fillmap generator 340, and decreases the probability of a recurrence of a memory shortage.

When the staged memory recovery is first triggered, one or more z-layer display lists may exist for different y-bands that exceed the lower (second) complexity threshold. The controlling program 240 defines a number of techniques that may be employed to convert pending y-band display lists into the more compact fillmap format.

Table 2 lists various actions that can be undertaken by the Fillmap Generator 340 to recover memory as part of step 725. As described above, the memory callback function that performs the memory recovery actions cannot be called from within fillmap generation. Instead, the memory callback function is called manually from the Display List Generator module 320 when a memory allocation or reservation error is returned from the Fillmap Generator 340. The progression of staged memory recovery through memory recovery actions is now described in relation to FIG. 17.

Figure 16:
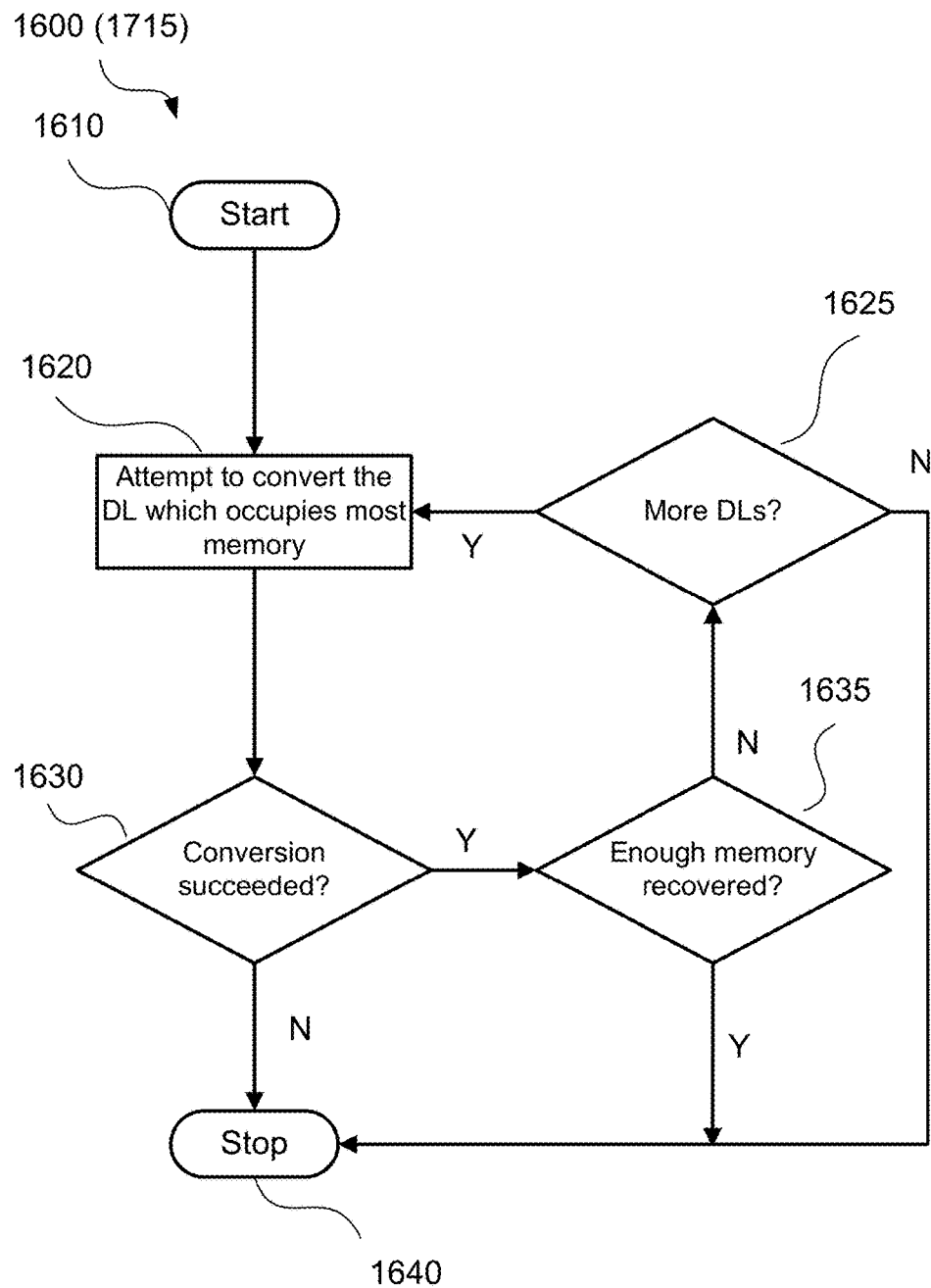
FIG. 16 shows a schematic flow diagram of a method for converting y-band display lists to fillmaps to reduce memory usage.
Figure 17:
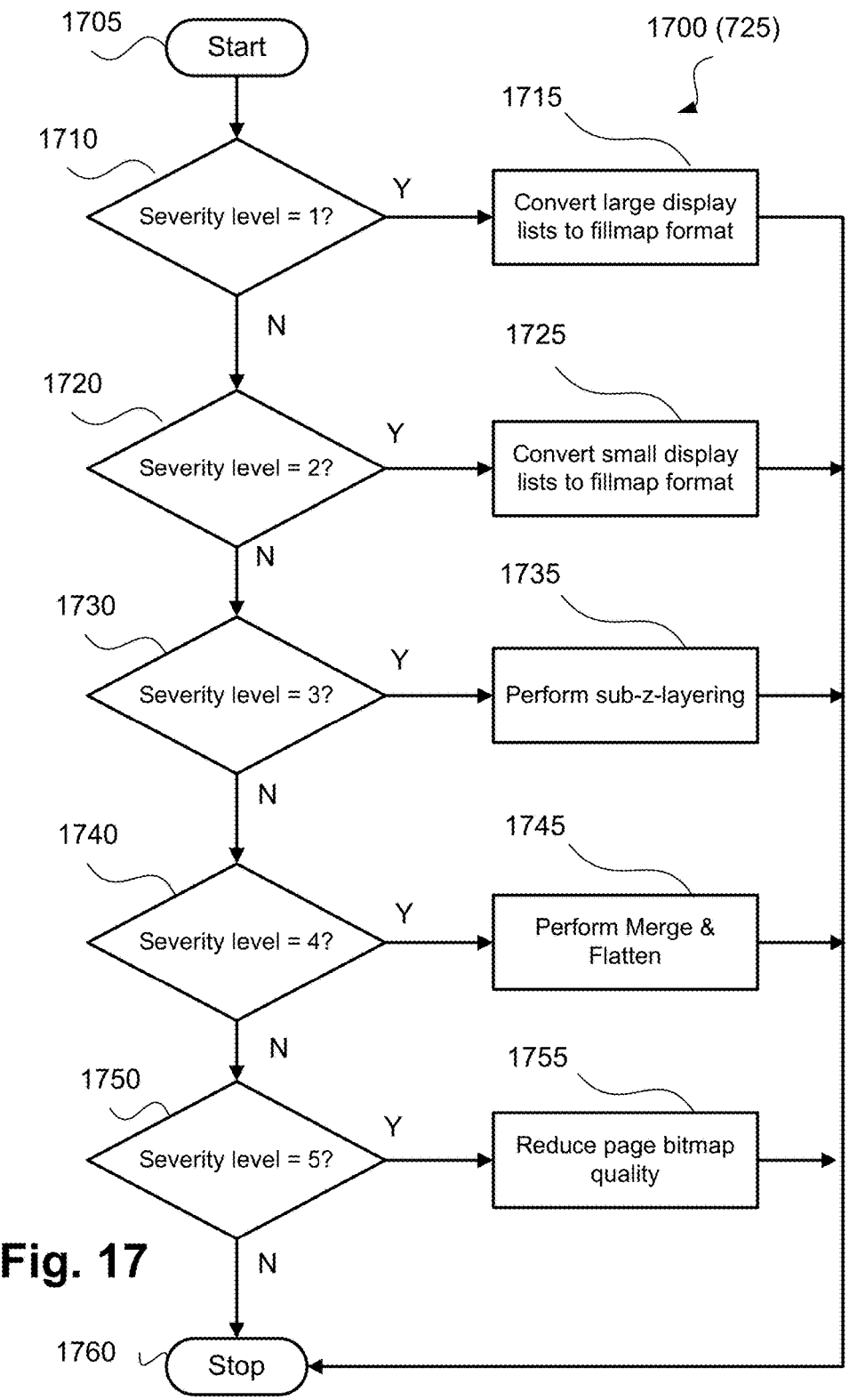
FIG. 17 shows a schematic flow diagram of a method for mapping memory recovery severity levels to specific memory recovery strategies.

FIG. 17 shows a method 1700 of mapping memory recovery severity levels to specific memory recovery strategies. The method 1700 starts at step 1705 and moves to a check step 1710. A check is made to determine if the severity level is 1 at step 1710. If the check is affirmative ("Y" at step 1710), the method 1700 moves to a converting step 1715. At step 1715, relatively large display lists are converted to fillmap format. The display lists are formed based on the first complexity threshold, which determines the maximum size of y-band display lists during the performance efficient mode of operation. In some arrangements, a display list which has a higher complexity is selected. In other arrangements, determination of relatively large display lists reflects the memory occupied by the display list as opposed to complexity. Step 1715 is described in more detail in relation to FIG. 16. The method 1700 then completes at step 1760.

If the result of step 1710 is negative ("N" at step 1710), the method 1700 moves to a check step 1720. At step 1720, a check is made to determine if the severity level is 2. If the check is affirmative ("Y" at step 1720), the method 1700 moves to a converting step 1725. At step 1725, display lists smaller than the second complexity threshold are converted to fillmap format at step 1725 in some arrangements.

Step 1725 relates to determining a second complexity threshold based on the identifying a memory shortage condition and selecting a layer (y-band) different to the layer that caused the memory shortage condition. The second complexity threshold is lower than the first complexity threshold. The second complexity threshold can relate to converting smaller display lists at step 1725. For example, the second complexity threshold may relate to a predetermined threshold such as a fixed proportion (e.g., 75%) of the first complexity threshold. Alternatively, the second complexity threshold can relate to a next lowest complexity of the y-bands, In another arrangement, the second complexity threshold may relate to the y-band with the lowest complexity. In other arrangements, determination of small display lists relates to selecting the y-band which requires smaller amount of working memory needed by Fillmap Generator 340. Step 1725 is described in more detail in relation to FIG. 18. The method 1700 then completes at step 1760.

If the result of step 1720 is negative ("N" at 1720), the method 1700 moves to a check step 1730. At step 1730, a check is made to determine if the severity level is 3. If the check is affirmative ("Y" at step 1730), the method 1700 moves to a performing step 1735. At step 1735, a chosen display list is converted to fillmap format using sub-z-layering at step 1735. Step 1735 is described in more detail in FIG. 19 and FIG. 13. In some arrangements, the display list chosen for conversion may reflect the last display list attempted for conversion in step 1725. In other arrangements, the display list chosen for conversion may reflect the display list with the lowest complexity. Similarly to step 1725, step 1735 represents determining a second complexity threshold based on an identified memory shortage condition and identifying a layer (being a z-layer of a y-band) different to the layer that caused the memory shortage condition.

In some implementations, the controlling program 240 continues to select another layer of the page based on the second complexity threshold. In such implementations, the controlling program 240 effectively continues to convert the rest of the page using the lower threshold in an effort to prevent occurrence of further memory shortage conditions.

If the result of step 1730 is negative ("N" at step 1730), the method 1700 moves to a check step 1740. At step 1740, a check is made to determine if the severity level is 4. If the check is affirmative ("Y" at step 1740), the method 1700 moves to a performing step 1745. At step 1745, all z-layer fillmaps for each y-band are merged, and if necessary flattened to pixels and compressed at step 1745. Step 1745 is described in more detail below. The method 1700 then completes at step 1760. In utilising staged memory recovery severity levels at steps 1710, 1720, 1730, 1740 and 1750, the method 1700 operates to control release of memory in stages.

If the result of step 1740 is negative ("N" at step 1740), the method 1700 moves to a check step 1750. At step 1750, a check is made to determine if the severity level is 5. If the check is affirmative ("Y" at step 1750), the method 1700 moves to a reducing step 1755. At step 1755 the page bitmap is further compressed. Step 1755 is described in more detail below. If the result of step 1750 is negative ("N" at step 1750, the method 1700 completes at step 1760. Steps 1745 and 1755 represent actions taken when a predetermined staged memory recovery severity level has been identified.

Step 1715 (converting large display lists) is now described in detail using FIG. 16. FIG. 16 shows a method 1600 of converting display lists to fillmaps.

The method 1600 starts at step 1610 and moves to step 1620. The step 1620 attempts to convert the y-band display list which occupies the largest amount of memory to fillmap format. If the conversion succeeds, the largest amount of memory is freed or released. The method 1600 then moves to step 1630. At step 1630, a check is made to determine whether the conversion succeeded. If the check returns affirmative ("Y" at step 1630), the method 1600 moves to step 1635. Another check is made as to whether enough memory has been freed at step 1635. As described above, the check is achieved by calling a function supplied by the memory allocator. If the check returns affirmative ("Y" at step 1635), the method 1600 concludes at step 1640 with success being returned.

If step 1635 returns negative ("N" at step 1635), the method 1600 moves to a check step 1625. A check is made to determine whether there are more display lists that can be converted. If the check returns affirmative ("Y" at step 1625), the method 1600 moves back to 1620. The next biggest display list is converted at step 1620. If the check at 1625 returns negative ("N" at step 1625), then the method 1600 concludes at step 1640 with failure being returned.

Figure 18:
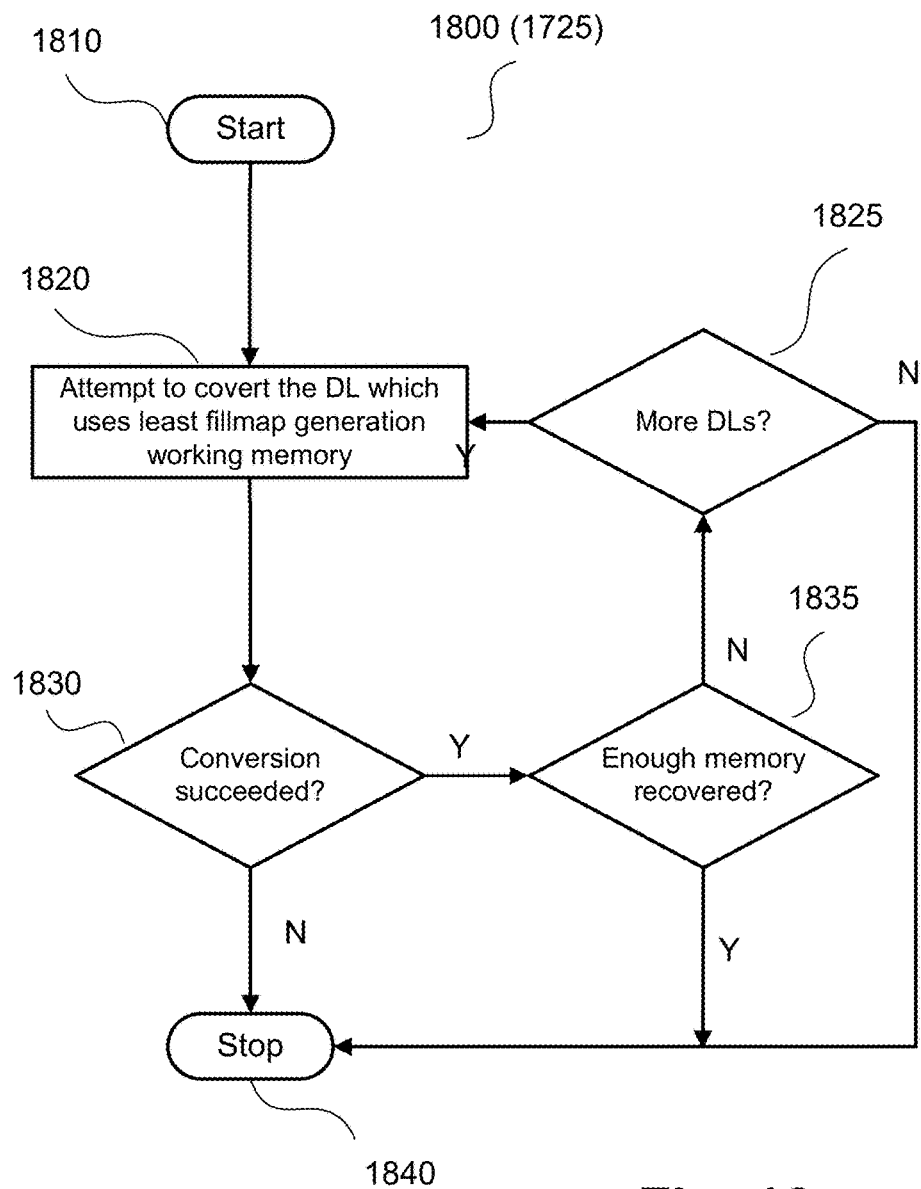
FIG. 18 shows a schematic flow diagram of a method for converting y-band display lists to fillmaps to reduce memory.

Step 1725 (processing of small display lists) is now be described in detail using FIG. 18. FIG. 18 shows a method 1800 of converting y-band display lists to fillmaps. The method 1800 starts at 1810 and moves to a step 1820. The callback function attempts to convert the y-band display list that is expected to require the least amount of working memory during fillmap generation. The method 1800 then moves to a check step 1830. A check is made to determine whether the conversion succeeded. If the check returns affirmative ("Y at step 1830), the method 1800 moves to check step 1835. Another check is made to determine whether enough memory has been freed at step 1835. If the check returns affirmative ("Y" at step 1835), the method concludes at step 1840 with success being returned.

If the check at step 1835 returns negative ("N" at step 1835), the method 1800 moves to check step 1825. At step 1825, a check is made to determine whether there are more display lists that can be converted. If the check returns affirmative (Y at step 1825), the method 1800 moves back to step 1820 and the next display list which is expected to require the least amount of fillmap generation working memory is converted. If the check at 1825 returns negative ("N" at step 1825), then method 1800 concludes at step 1840 with failure being returned.

Step 1735 (sub-z-layering) is now described in further detail. Sub-z-layering divides the z-layer for a chosen y-band into two sub-z-layers of equal complexity where each sub-z-layer is converted separately to fillmap format. The chosen y-band is typically the y-band for which conversion failed in step 1725.

The z-layer for the failed y-band conversion is divided into two sub-z-layers of equal complexity. For example, objects 1410 and 1411 in y-band 1 in FIG. 14 may be in sub-z-layer 0, and objects 1413 and 1414 may be in sub-z-layer 1.

Each sub-z-layer display list is separately converted to fillmap format. If a conversion fails, then the failed sub-z-layer is further divided into two smaller z-layer display lists, where each divided z-layer display list is converted to fillmap format separately. The sub-division continues until all z-layer display lists for a y-band are successfully converted to fillmap format, or the remaining z-layers represents one PDL object, and further sub-division is not possible. If this occurs, the page containing the object will fail to print.

Figure 13:
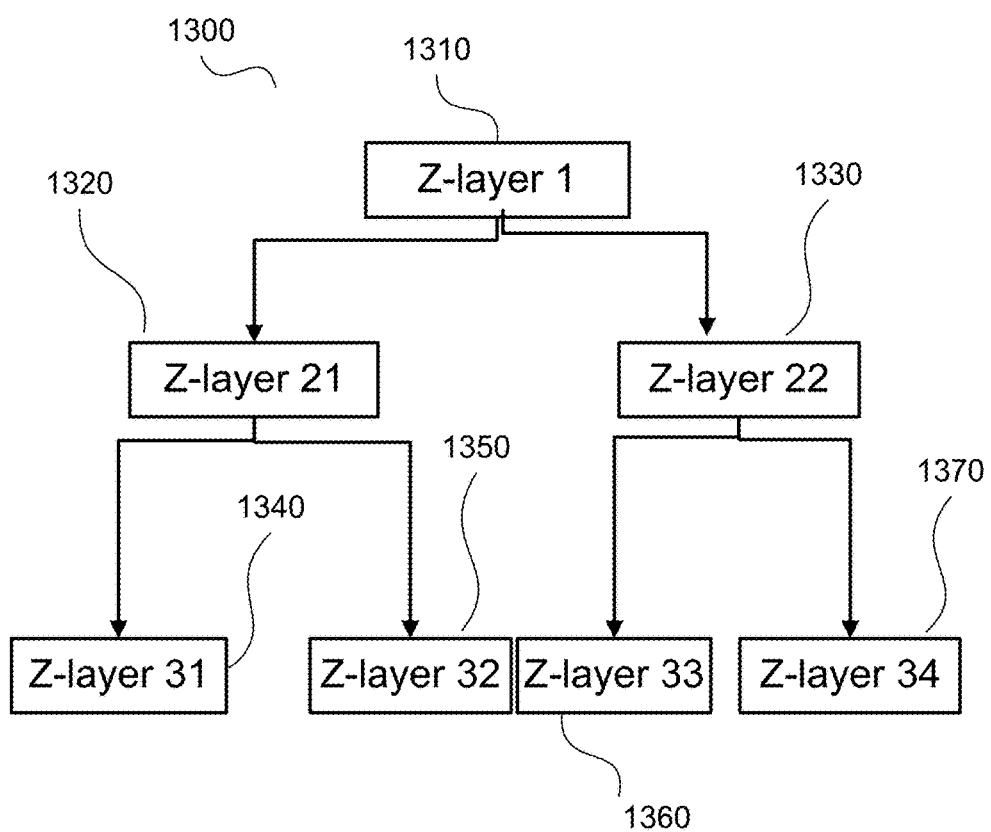
FIG. 13 shows an example z-layer tree produced by a z-layering method.
Figure 19:
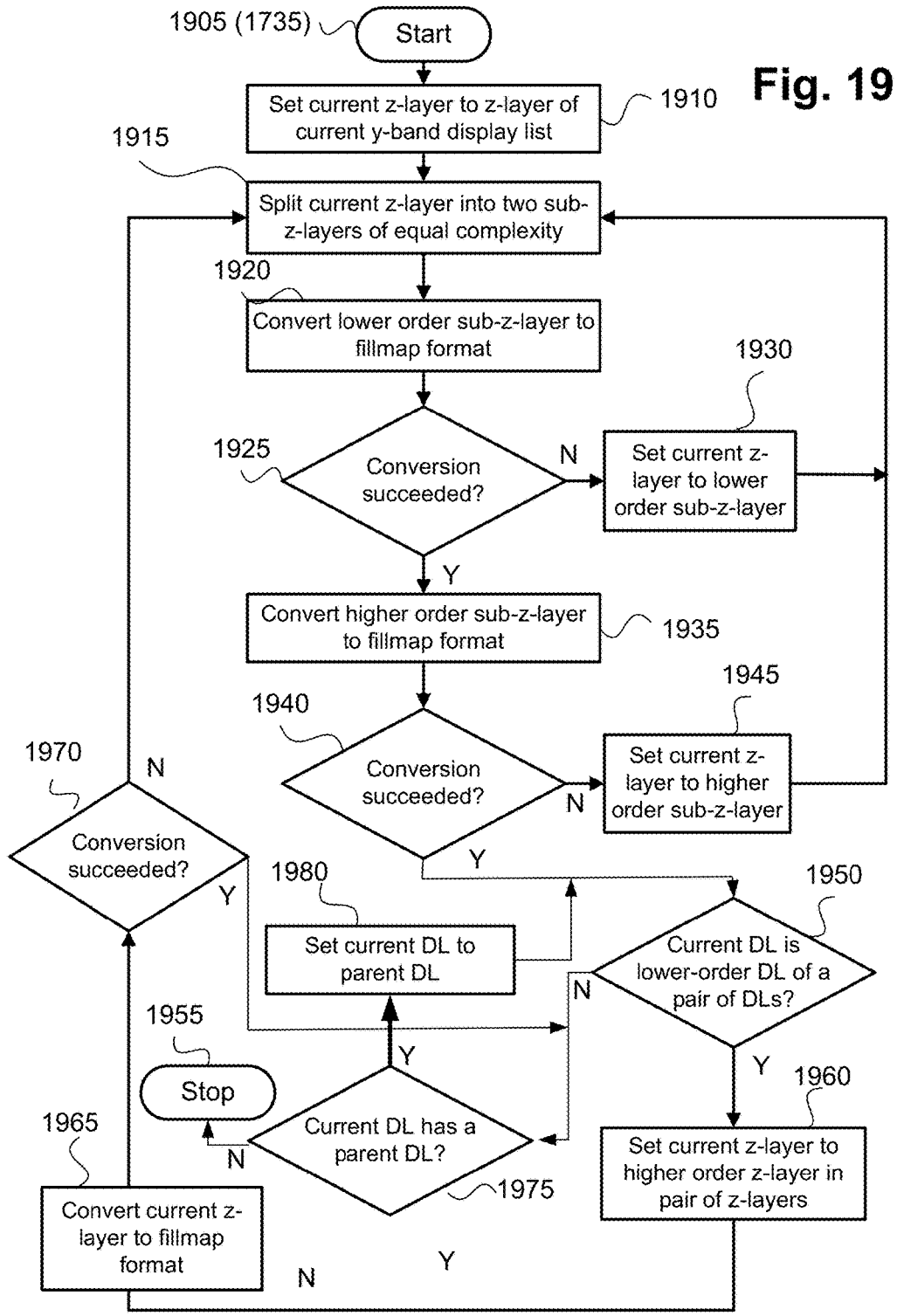
FIG. 19 shows a schematic flow diagram of a method for z-layering in conversion of y-banded display lists.

Sub-z-layering is now described using FIG. 19 and FIG. 13. Referring to FIG. 13, in an example 1300 of sub-z-layering, conversion of a Z-layer 1310 to fillmap format has failed. The Z-layer 1310 has been divided into Z-layer 1320 and Z-layer 1330. Conversion of each of Z-layer 1320 and Z-layer 1330 has also failed. The Z-layer 1320 has been divided in Z-layer 1340 and Z-layer 1350. Z-layer 1330 has been divided into Z-layer 1360 and Z-layer 1370. In the example of FIG. 13, conversion of Z-layer 1340, Z-layer 1350, Z-layer 1360 and Z-layer 1370 to fillmap format all succeed.

Referring to FIG. 19, a method 1900 of converting z-layers is shown. The method 1900 starts at 1905, and moves to a setting step 1910. At step 1910, the current z-layer is set to the z-layer chosen for sub-z-layering. The current z-layer is typically set to the z-layer for the y-band that failed in step 1725, in the example of FIG. 13, Z-layer 1310. The method 1900 then moves to a splitting step 1915. The Z-layer 1310 is divided or split into two sub-z-layers at step 1915—Z-layer 1320 and Z-layer 1330. In the implementation described, the two sub-z-layers contain equal numbers of objects or levels, regardless of the graphics complexity of those objects within the y-band. The implementation described will sometimes produce z-layer trees which are unbalanced. In an alternative embodiment, the two sub-z-layers contain objects with equal graphics complexity. The implementation described tends to produce a z-layer tree which is more balanced. A balanced tree may require fewer sub-divisions and hence be marginally more efficient. Alternative implementations may require more computation.

The method 1900 then moves to a converting step 1920. The lower order Z-layer 1320 is converted to fillmap format at step 1920. The method 1900 then moves to a check step 1925. A check is made to determine whether the conversion succeeded at step 1925. In the example of FIG. 13, the check is answered in the negative ("N" at step 1925), so method 1900 moves to a setting step 1930. The current z-layer is set to Z-layer 1320 at step 1930. The method 1900 then moves back to step 1915 where Z-layer 1320 is divided into Z-layer 1340 and Z-layer 1350.

At step 1920, the Z-layer 1340 is successfully converted to fillmap format, so the check at step 1925 succeeds ("Y" at step 1925), and the method 1900 moves to a converting step 1935. At step 1935, the higher order sub-z-layer Z-layer 1350 is converted to fillmap format. The method 1900 then moves to check step 1940. A check is made as to whether the conversion succeeded at step 1940. In the example of FIG. 13, the check is answered in the affirmative ("Y" at step 1940), and the method 1900 moves to check step 1950. Step 1950 determines of the current display list is a lower-order display list. The current z-layer Z-layer 1320 is the lower order z-layer of a pair of z-layers, the higher order z-layer being Z-layer 1330. Accordingly, step 1950 returns "Y" and the method 1900 moves to step 1960. The current z-layer is set to Z-layer 1330 at step 1960. The method 1900 then moves to converting step 1965. The current z-layer (Z-layer 1330) is converted to fillmap format at step 1965. The method 1900 then moves to check step 1970. A check is made as to whether the conversion succeeded at step 1970. In the example of FIG. 13, the conversion of Z-layer 1330 fails, so the check 1970 is answered in the negative, and the method 1900 moves back to step 1915.

In step 1915, the Z-layer 1330 is split into two sub-z-layers, Z-layer 1360 and Z-layer 1370. The method 1900 then moves to step 1920 and the lower order Z-layer 1360 is converted to Fillmap format. The method 1900 then moves to step 1925. A check is made as to whether the conversion succeeded. In the example of FIG. 13, the check is answered in the affirmative ("Y" at step 1925), so the method 1900 moves to step 1935. The higher order sub-z-layer Z-layer 1370 is converted to fillmap format. The conversion is determined to be successful at step 1940, so the method 1900 moves to step 1950. The check at step 1950 is answered in the negative, since the current z-layer—Z-layer 1330 is not the lower order z-layer in a pair of z-layers. The method 1900 then moves to step 1975, where a check is made as to whether Z-layer 1330 has a parent z-layer. This check is answered in the affirmative ("Y" at step 1975), as Z-layer 1310 is the parent z-layer of Z-layer 1330. The method 1900 then moves to step 1980. The check at step 1950 is answered in the negative since Z-layer 1310 is not part of a pair of z-layers. The check at step 1975 is answered in the negative ("N" at step 1975) as Z-layer 1310 has no parent, so the method 1900 completes at step 1955.

In the example given, the tree of sub-z-layers is balanced, but in general, the sub-z-layer trees may not be balanced. The conversion of a sub-z-layer tree is implemented as a recursive tree-traversal algorithm in the example described above.

The step of merge and flatten (step 1745 in FIG. 17) is now be described in further detail. Referring to FIG. 11, the Fillmap Generator 340 of the controlling program 240 can generate more than one z-layer fillmap for one of more y-bands where a page has moderate to high complexity. In the optimised mode of operation of the controlling program 240, if a y-band is sufficiently complex, the y-band will be converted to fillmap format in two or more z-layers of a complexity that optimises processing. In the most memory efficient mode of operation of the controlling program 240, a y-band display list may be converted to fillmap in multiple z-layers of a lower level of complexity in order to minimise working memory usage. In either scenario, there may be more than one z-layer fillmap in the Fillmap Store 350 for some y-bands that need to be merged when generating the Page Fillmap. In the optimised mode of operation, the requirement to merge z-bands typically occurs when a predefined number of z-layer fillmaps are accumulated, in order to optimise the efficiency of Fillmap Merger 360. Merged z-layer fillmaps are stored in the Page Fillmap Store 370. The controlling program 240 reserves working memory in order to ensure that the merging can be implemented. However, since the reservation is based on an estimate, a memory shortage can still occur during the merging of z-layer Fillmaps by Fillmap Merger 360. If a memory shortage occurs, then the z-layer Fillmaps in Fillmap Store 350 from the bottom layer upwards for that y-band are rendered to pixels, composited and the resulting pixels compressed. The technique of rendering, compositing and compressing pixels is referred to as merge and flatten. The flattened y-band pixel bitmap is written back into the Fillmap Store 350. Any subsequent z-layer fillmaps for that y-band will use the pixel bitmap as a background layer.

Once all PDL objects for the page have been added to the relevant y-band display lists, all y-band display lists have been converted to z-layer fillmaps, and all z-layer fillmaps for each y-band have been merged, the final set of y-band fillmaps for the page are written to the Page Fillmap Store 370.

The arrangements described are developed to allow all upstream PDL object graphics to be successfully converted to the Page Fillmap, (stored in page Fillmap Store 370), even in conditions of low memory. The fillmap format is used by controlling program 240 because the fillmap format is lossless and very memory-efficient compared to the equivalent compressed pixel bitmap. Using the fillmap format allows the controlling program 240 to achieve superior output quality and performance in memory constrained systems compared to previously known systems which rely heavily on rendered pixel bitmaps to manage graphics complexity.

Hence when the controlling program 240 is required to revert to a memory efficient mode of operation, typically the Display List Store 330 may contain some accumulated y-band display lists, and the Fillmap Store 350 may contain un-merged z-layer fillmaps for a number of y-bands. The strategy of the methods described is to convert all the graphics to fillmap format and to merge these fillmap graphics into the Page Fillmap Store 370. From merging the fillmap graphics onwards, whilst available memory is low, the modules in controlling program 240 are configured to operate in reduced memory. The amount of working memory required by modules in controlling program 240 (1155, 1160, 1105, 1110, 1150, 1145) is reduced by processing data in smaller pieces. The amount of intermediate data held in the Display List Store 330, Fillmap Store 350 is reduced by limiting the z-layer complexity level for y-bands before z-layers are passed to Fillmap Generator 340. Z-layer fillmaps in fillmap store 350 are also merged immediately.

Although the fillmap format is highly compact, when processing very complex pages in constrained memory, controlling program 240 will be ultimately be limited by the memory required by the Page Fillmap Store 370. In normal operation, controlling program 240 will accumulate all graphics on the current page in this Page Fillmap Store 370 before passing that page onto a later module for rendering to pixels. However, if the Page Fillmap Store 370 grows to an unacceptable size, the Page Fillmap cannot be reduced in size by reducing quality. The solution is to render the Page Fillmap to a pixel bitmap using Fillmap Flattener 1140, and then compress this bitmap using a Bitmap Compression 1135, which maintains as much quality as possible given the target compressed size. The RIP Output Compression (ROC) compression algorithm is preferably used by Bitmap Compression 1135 in the controlling program 240 allows the size of the compressed background bitmap to be progressively reduced by progressively and evenly reducing quality across the page. In other arrangements, other known compression algorithms can be used. Flattening the page fillmap 370 to compressed pixels is intended and expected to occur only in the most extreme circumstances.

Figure 12:
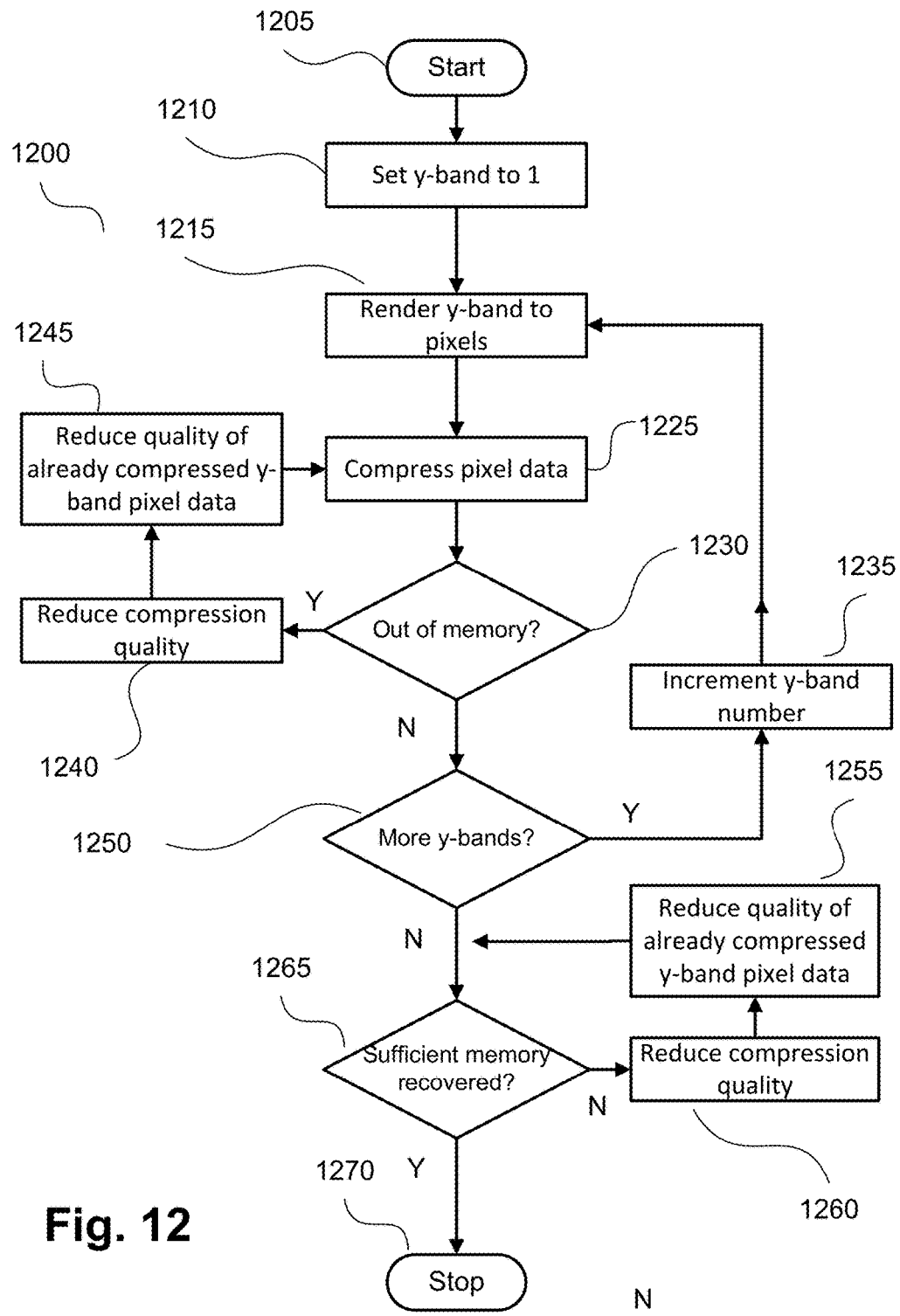
FIG. 12 shows a schematic flow diagram for a method of rendering fillmaps to pixels.

The rendering the background y-banded fillmap is now described using FIG. 12. FIG. 12 shows a method 1200 rendering the background y-banded fillmap. The method 1200 starts at a step 1205, before moving to a setting step 1210. At step 1210, where the y-band fillmap number is set to 1. The method 1200 moves to a rendering step 1215. The current y-band z-layer is rendered to pixels at step 1215. The method 1200 moves to a compressing step 1225. At step 1225, the z-layer pixel bitmap is compressed. The method 1200 then moves to step 1230. At step 1230, a check is made as to whether memory has been exhausted by the rendering and compression of the z-layer. If the check is affirmative ("Y" at step 1230), the memory to hold the compressed pixel data could not be allocated in step 1225, and the compression failed. If the compression failed, the method 1200 moves to step 1240. At step 1240, the current compression quality is reduced. The method 1200 then moves to step 1245.

In step 1245, the quality of all existing compressed pixel data for the current page is reduced to the new quality level. Step 1245 applies not only to the just rendered z-layer, but also all z-layers for y-bands previously rendered and compressed. The reduction in quality is achieved without decompressing pixel data using Bitmap Compressor 1135. The method 1200 then moves back to step 1225 and the failed y-band compression is retried. The method 1200 will continue reducing the quality of the background pixel data until there is sufficient memory to store the compressed pixel data for the z-layer for the new y-band. Using the method 1200 ensures that all compressed pixel data in the background bitmap is of even quality, and that quality is only reduced enough to free the required memory.

If the answer from step 1230 is negative ("N" at step 1230), then the compression in step 1225 succeeded, and the method 1200 moves to step 1250. At step 1250 a check is made as to whether there are any more y-bands to render and compress. If the check at step 1250 is affirmative ("Y" at step 1250), then the method 1200 moves to step 1235. The number of the y-band being processed is increased by 1 at step 1235. The method 1200 then moves to step 1215. If the answer to step 1250 is negative ("N" at step 1250), then the method 1200 moves to check step 1265. At step 1265, where the controlling program 240 checks if sufficient memory has been freed by rendering and compressing the Page Fillmap to a compressed bitmap. Since page graphics represented as a fillmap are typically more compact than when represented as compressed pixels at default quality, the answer at step 1265 will typically be initially negative, requiring the quality of the compressed pixel data to be reduced, often substantially. An advantage of the arrangements described is in greatly delaying the need to render the page to pixels and compressing the pixels. The arrangements described allow the controlling program 240 to achieve higher output quality and higher performance in restricted memory environments than is attainable in previously known systems. Whilst RIP System 240 in some instances eventually must revert to prior art techniques, and reduce both output quality and performance, the graphics complexity at which this occurs is typically higher than in known systems.

A memory allocation error may occur in Fillmap Generator 340 or Fillmap Merger 360, despite RIP System 240 reserving memory to ensure that such memory errors do not occur. Memory estimation for fillmap generation or fillmap merging is not exact, and can be under-estimated in certain situations. If a memory allocation error occurs in Fillmap Merger 360, then Fillmap Merger 360 discards any partially merged Fillmaps and returns an error to Fillmap Generator 340. The z-layer Fillmaps being merged are kept. If the memory error occurred in Fillmap Generator 340, any partially generated z-layer fillmap is discarded from Fillmap Store 350. The input y-band display list stored in Display List Store 330 is kept.

Referring to FIG. 11, a memory error will be passed up the render pipeline to Display List Generator 320. Display List Generator 320 will manually invoke Staged Memory Recovery as described in Table 1: Staged Memory Recovery Actions—PDL Interpreter and Table 2: Staged Memory Recovery Actions—Fillmap Generator. Since fillmap generation and fillmap merging are not active, Staged Memory Recovery is now able to utilise all memory recovery techniques described earlier, including Sub-z-layering, Merge and Flatten and Page Fillmap Flattening and Compression.

The controlling program 240 in some arrangements attempts to allow for working memory for Fillmap Flattener 1140 (1150) and Bitmap Compressor 1135 (1145) but again this is an estimate. If the working memory for either module cannot be allocated, an error is returned to the Fillmap Merger 360, and ultimately to the Display List Generator 320. In these cases, Stage Memory Recovery will not be attempted by Display List Generator 320, and printing the page will fail.

Once the controlling program 240 enters the memory efficient mode of operation, the controlling program 240 remains in the memory efficient mode, for example using the second complexity threshold, for the remainder of the current page being processed. At the start of the next page, controlling program 240 reverts to the optimised mode of operation.

If conversion of a portion (e.g. y-band or z-layer) of the page to the intermediate format representation is successful and the controlling program determines that the released memory satisfies a memory allocation request (for example at step 640), the controlling program 240 converts a layer that triggered the condition to the intermediate format representation When processing pages which are extremely complex, the Page Fillmap may be completely rendered to pixels, as described above. However, the controlling program 240 may need to continue processing incoming PDL graphics, resulting in further memory shortages. If further memory shortage occurs, the controlling program 240 utilises Bitmap Compressor 1135 to further compress the Page Bitmap, reducing memory usage, at the expense of further quality reduction (step 1755 in FIG. 17). The Page Bitmap continues to be further compressed as needed to allow for memory to process the incoming PDL graphics. Further compressing the Page Bitmap is referred to as squashing the Page Bitmap, and is considered a last resort to be used only in extreme circumstances.

As it was previously described above, a size of a single z-layer, i.e. a number of objects in the z-layer, is important for achieving high performance of pixel sequential rendering systems. Ideally, an optimal layer size should be computed so that nearly all working memory or fast cache memory (e.g. 80-90%) is effectively utilised for conversion of an input object layer into a resulting layer of an intermediate format representation, such as a fillmap or a planar map. If the layer size is not computed accurately, the pixel sequential renderer may underutilise the available memory and perform too much merging. On the other hand, if the layer size it too large, the pixel sequential renderer may fail to rasterize the job if the required working memory is not available. Therefore, an accurate conversion working memory estimate is needed for suitable layer sizes.

However, as discussed above, it is not always possible or very costly to estimate the amount of working memory that would be needed for converting a display list representation to a partially rasterized or an intermediate format representation. Some embodiments of the present invention are directed towards solving the problems associated with limited memory available for converting a display list representation to the intermediate format representation. Particularly, in accordance with the present disclosure, a layer of a graphical representation, can be split, in z or drawing order, into a plurality of sub-layers if a memory allocation request fails during rasterization of that layer thereby to reduce a number of objects on a scanline to be processed at a time and facilitate completion of the partial rasterization of each of the sub-layers within the allocated memory. Some embodiments of the present invention may be implemented in a single-threaded or multi-threaded RIP, and more specifically within a builder module that constructs a final print job of each page. An overview of a raster image processor will be provided below with references to FIG. 21.

For example, a graphical representation may be arranged in layers, i.e. comprise multiple display lists, one display list for each layer, based on an estimated amount of working memory required for conversion to an intermediate format representation. The amount of working memory required for conversion to an intermediate format representation may be estimated using simple techniques, for example, by limiting the number of objects in each layer to a predetermined threshold, which may be 1000 or 5000 objects.

Each display list needs to be converted to an intermediate format representation by partially rasterizing the display list to a printable format. Partial rasterization includes decomposing objects into sets of edges, then sorting the sets of edges in order to scan-convert the edges in pixel-sequential order. As was described above, during partial rasterization of a display list for a layer more memory than available or was previously estimated may be required to complete partial rasterization. This can happen due to complex object shapes resulting in large amount of edge data in sets of edges and large amount of scanline crossings by the edges. In such a case, in accordance with the present disclosure, the display list for that layer is split into a plurality of sub-layers or sub-display lists to facilitate successful conversion of the display list to the intermediate format representation. For each of the sub-display lists an intermediate format representation is generated. The generated intermediate format representations for the sub-layers are then merged to form a final intermediate format representation for the graphical representation. Further implementation details will be described below with references to FIGS. 23-33.

Such an approach is particularly advantageous since it does not require conversion to pixels prematurely, i.e. the costly procedure of generating a bitmap representation for a single layer to reduce total memory usage is avoided. Thus, in the majority of cases, only the final intermediate format representation would be converted to pixels while all layers will be stored in a lossless format. As such, embodiments of the current invention provide higher output quality than systems which reduce total memory usage by converting a current layer to a bitmap. Further, no large frame store memory is required in the RIP arrangements described, while the amount of working memory can be reduced if required. A simple technique estimating an input job complexity can be used to split the input job into display lists, i.e. display lists are large enough so that the working memories of the display list conversion tasks are effectively utilised. The display lists are split into smaller sub-display lists only if required to limit working memory amount in case the amount of required working memory for the display list conversion tasks was under-estimated. Therefore, the raster image processor (RIP) in accordance with the present disclosure can process both simple and complex graphics jobs in a limited amount of working memory, utilising the working memory efficiently, without the necessity of implementing complex memory estimation techniques. Such an approach facilitates successful processing of majority of print jobs in a very small working memory environment, as well as improves the overall processing performance in a large working memory environment when display list conversion can be effectively constrained to use fast local cache memory only.

Figure 20:
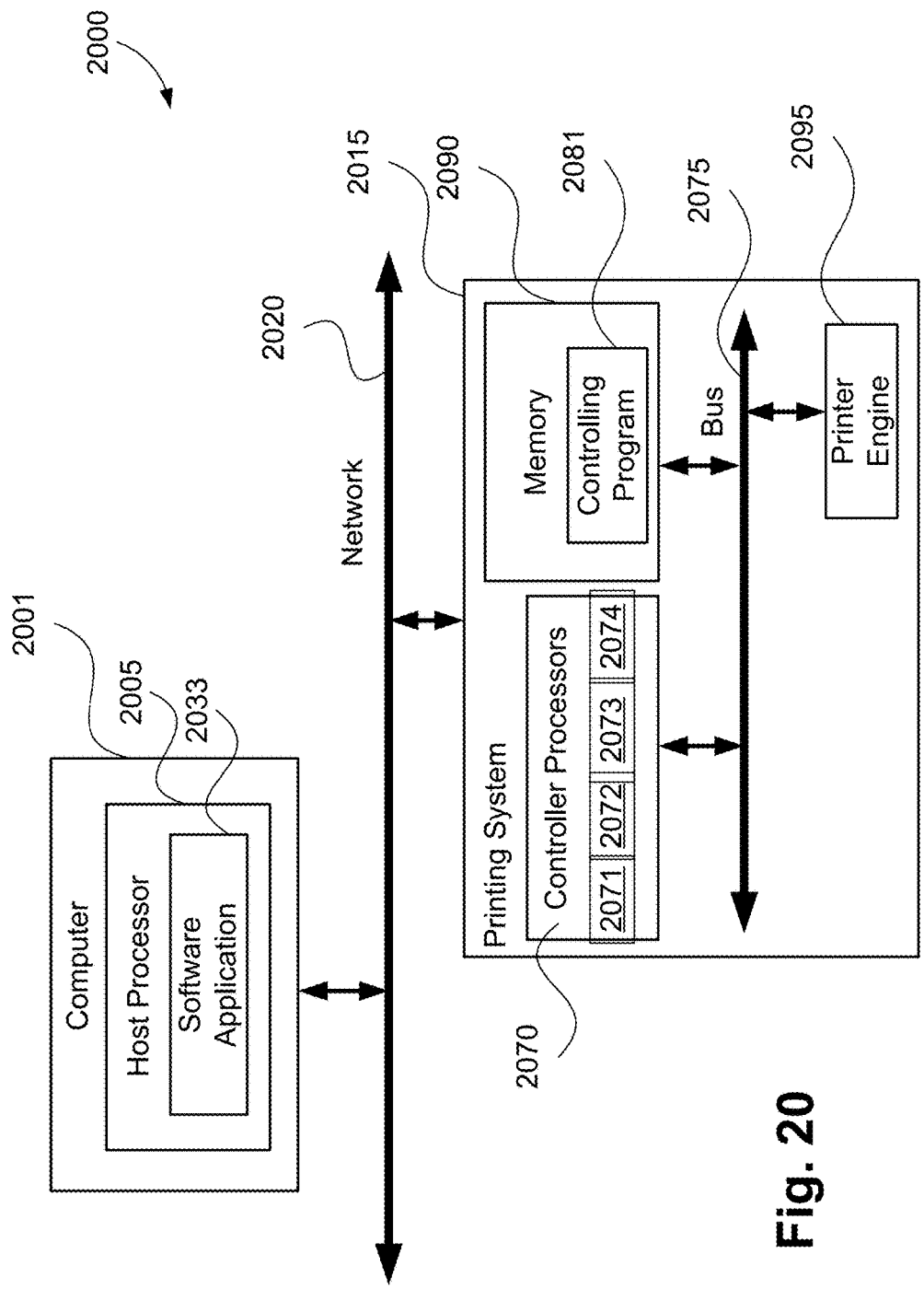
FIG. 20 is a schematic block diagram of a multi-processor printing system for rendering a document in which the invention in accordance with the present disclosure can be implemented.

FIG. 20 shows a schematic block diagram of a pixel rendering system 2000 for rendering graphic objects, where the arrangements in accordance with the present disclosure can be practiced. The pixel rendering system 2000 includes a computer module 2001 connected to a printer system 2015 through a communications network 2020. The network 2020 may be a wide-area network (WAN), such as the Internet, a cellular telecommunications network, or a private WAN. The network 2020 may comprise multiple computers. Alternatively, the network 2020 may be a single computer module 2001 and a printing system (e.g., 2015). Alternatively, the computer 2001 and printing system 2015 may be connected by a cable used to communicate between devices via ports, such as a USB, serial, parallel or FireWire ports.

The computer module 2001 comprises at least one host processor 2005 for executing a software application 2033, such as a word processor or graphical software application. The processor 2005 operates in a similar manner to the processor 220.

The printing system 2005 relates to a graphics processing system and operates in a similar manner to the computer module 2001. The printing system 2015 comprises plurality of controller processors 2017. As shown in FIG. 20, the controller processors 2070 comprise four processors 2071, 2072, 2073 and 2074, for executing one or more software code modules forming a controlling program 2081 which is stored in a memory 2090. Alternatively, the controller processors 2070 may comprise processors that take the form of single-core CPUs, GPUs, or any other form of computer processor such as field-programmable gate arrays (FPGAs). In another alternative, the controller processors 2070 may comprise a mixture of the various kinds of processors described above.

The printing system 2015 also has a printer engine 2095 coupled to the controller processors 2070, via an interconnected bus 2075. The printer engine 2095 operates in a similar manner to the printer engine 295. The controlling program 2081 accepts a printable document 2101 (FIG. 21) produced by a software application 2033 and produces pixel data values for printing. The pixel data values may then be stored in memory 2090 and reproduced as pixels by the printer engine 2095, for example. The controlling program 2081 may be executed by the controller processors 2070 in one or more threads of execution. A thread consists of a number of instructions or steps that are executed in sequence by one of the processors 2071-2071. The controlling program 2081 will be further described in detail below with reference to FIG. 21.

Figure 22:
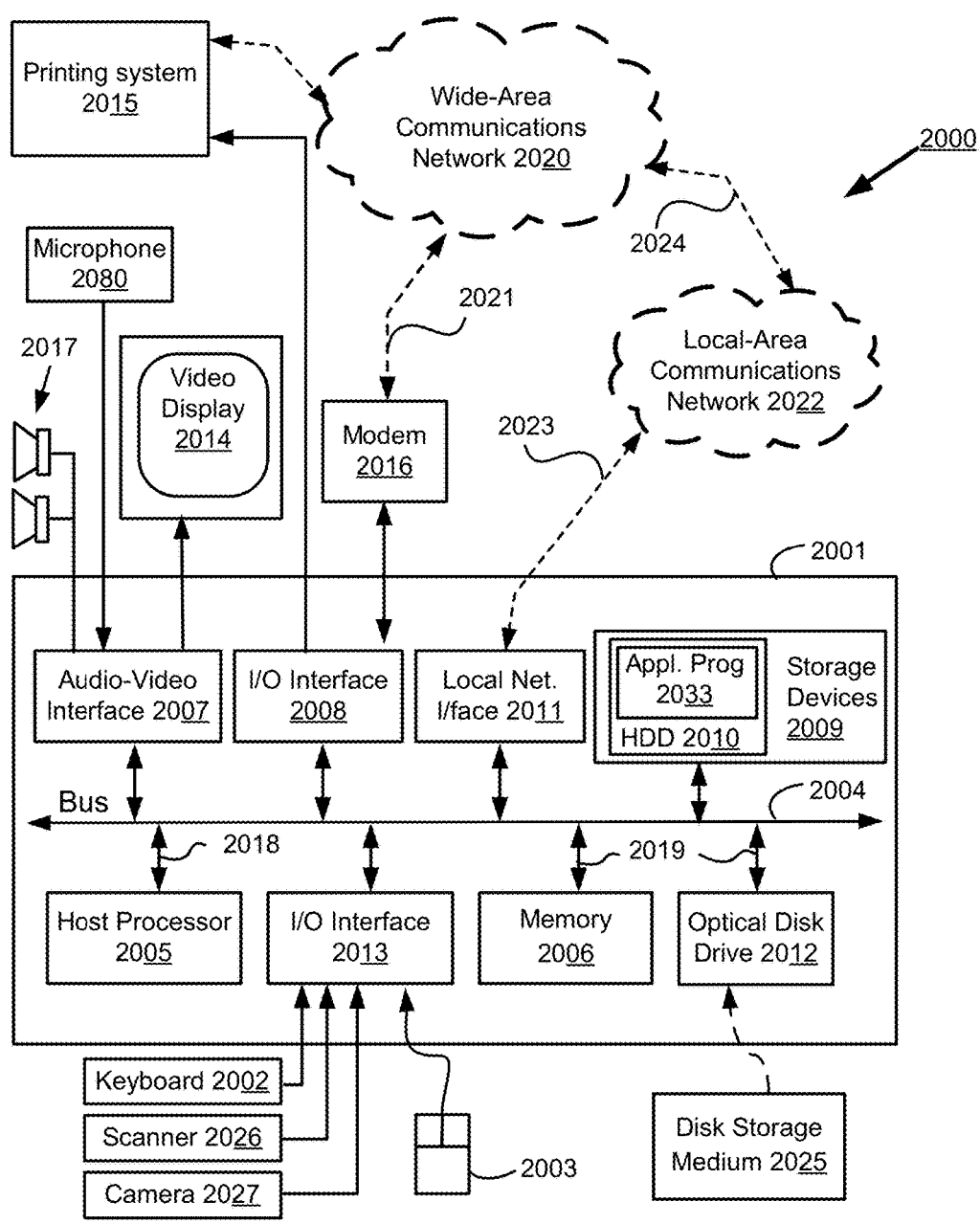
FIGS. 22 and 24 collectively form a schematic block diagram of a general purpose computer system in more detail.

As seen in more detail in FIG. 22, the pixel rendering system 2000 includes: the computer module 2001; input devices such as a keyboard 2002, a mouse pointer device 2003, a scanner 2026, a camera 2027, and a microphone 2080; and output devices including the printing system 2015, a display device 2014 and loudspeakers 2017. An external Modulator-Demodulator (Modem) transceiver device 2016 may be used by the computer module 2001 for communicating to and from the communications network 2020 via a connection 2021. The communications network 2020 may be a wide-area network (WAN), such as the Internet, a cellular telecommunications network, or a private WAN. Where the connection 2021 is a telephone line, the modem 2016 may be a traditional "dial-up" modem. Alternatively, where the connection 2021 is a high capacity (e.g., cable) connection, the modem 116 may be a broadband modem. A wireless modem may also be used for wireless connection to the communications network 2020.

The computer module 2001 typically includes the at least one processor unit 2005, and a memory unit 2006. For example, the memory unit 2006 may have semiconductor random access memory (RAM) and semiconductor read only memory (ROM). The computer module 2001 also includes a number of input/output (I/O) interfaces including: an audio-video interface 2007 that couples to the video display 2014, loudspeakers 2017 and microphone 2080; an I/O interface 2013 that couples to the keyboard 2002, mouse 2003, scanner 2026, camera 2027 and optionally a joystick or other human interface device (not illustrated); and an interface 2008 for the external modem 2016 and the printing system 2015. In some implementations, the modem 2016 may be incorporated within the computer module 2001, for example within the interface 2008. The computer module 2001 also has a local network interface 2011, which permits coupling of the computer module 2001 via a connection 2023 to a local-area communications network 2022, known as a Local Area Network (LAN). As illustrated in FIG. 22, the local communications network 2022 may also couple to the wide network 2020 via a connection 2024, which would typically include a so-called "firewall" device or device of similar functionality. The local network interface 2011 may comprise an Ethernet™ circuit card, a Bluetooth™ wireless arrangement or an IEEE 802.11 wireless arrangement; however, numerous other types of interfaces may be practiced for the interface 2011.

The I/O interfaces 2008 and 2013 may afford either or both of serial and parallel connectivity, the former typically being implemented according to the Universal Serial Bus (USB) standards and having corresponding USB connectors (not illustrated). Storage devices 2009 are provided and typically include a hard disk drive (HDD) 2010. Other storage devices such as a solid state drive, a floppy disk drive and a magnetic tape drive (not illustrated) may also be used. An optical disk drive 2012 is typically provided to act as a non-volatile source of data. Portable memory devices, such optical disks (e.g., CD-ROM, DVD, Blue ray Disc™), USB-RAM, portable, external hard drives, and floppy disks, for example, may be used as appropriate sources of data to the system 2000.

The components 2005 to 2013 of the computer module 2001 typically communicate via an interconnected bus 2004 and in a manner that results in a conventional mode of operation of the computer system 2000 known to those in the relevant art. For example, the processor 2005 is coupled to the system bus 2004 using a connection 2018. Likewise, the memory 2006 and optical disk drive 2012 are coupled to the system bus 2004 by connections 2019. Examples of computers on which the described arrangements can be practised include IBM-PC's and compatibles, Sun Sparcstations, Apple Mac™ or alike computer systems.

Methods described below may be implemented using the system 2000 wherein one or more steps of the processes of FIGS. 21 and 23 and 25 to 31, to be described, may be implemented as one or more code modules of the software application program 2033 executable within the system 2000. One or more of the steps of the described methods may be effected by instructions 2031 (see FIG. 24) in the software 2033 that are carried out within the system 2000.

Alternatively or additionally, one or more steps of the processes of FIGS. 21 and 23 and 25 to 31, to be described, may be implemented as one or more of the code modules forming the controlling program 2081 executable within the printing system 2015. Again, one or more of the steps of the described methods may be effected by instructions, similar to the instructions 2031 in the software 2033.

The software instructions 2031 implementing the software 2033 may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 2033 is typically stored in the HDD 2010 or the memory 2006. The software is loaded into the system 2000 from the computer readable medium, and then executed by the system 2000. A computer readable medium having such software or computer program recorded on the computer readable medium is a computer program product. The use of the computer program product in the system 2000 preferably effects an advantageous apparatus for implementing the described methods.

In some instances, the application programs 2033 may be supplied to the user encoded on one or more CD-ROMs 2025 and read via the corresponding drive 2012, or alternatively may be read by the user from the networks 2020 or 2022. Still further, the software can also be loaded into the system 2000 from other computer readable media. Computer readable storage media refers to any non-transitory tangible storage medium that provides recorded instructions and/or data to the system 2000 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 2001. Examples of transitory or non-tangible computer readable transmission media that may also participate in the provision of software, application programs, instructions and/or data to the computer module 2001 include radio or infra-red transmission channels as well as a network connection to another computer or networked device, and the Internet or Intranets including e-mail transmissions and information recorded on Websites and the like.

The second part of the application program 2033 and the corresponding code modules mentioned above may be executed to implement one or more graphical user interfaces (GUIs) to be rendered or otherwise represented upon the display 2014. Through manipulation of typically the keyboard 2002 and the mouse 2003, a user of the system 2000 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 2017 and user voice commands input via the microphone 2080.

Figure 24:
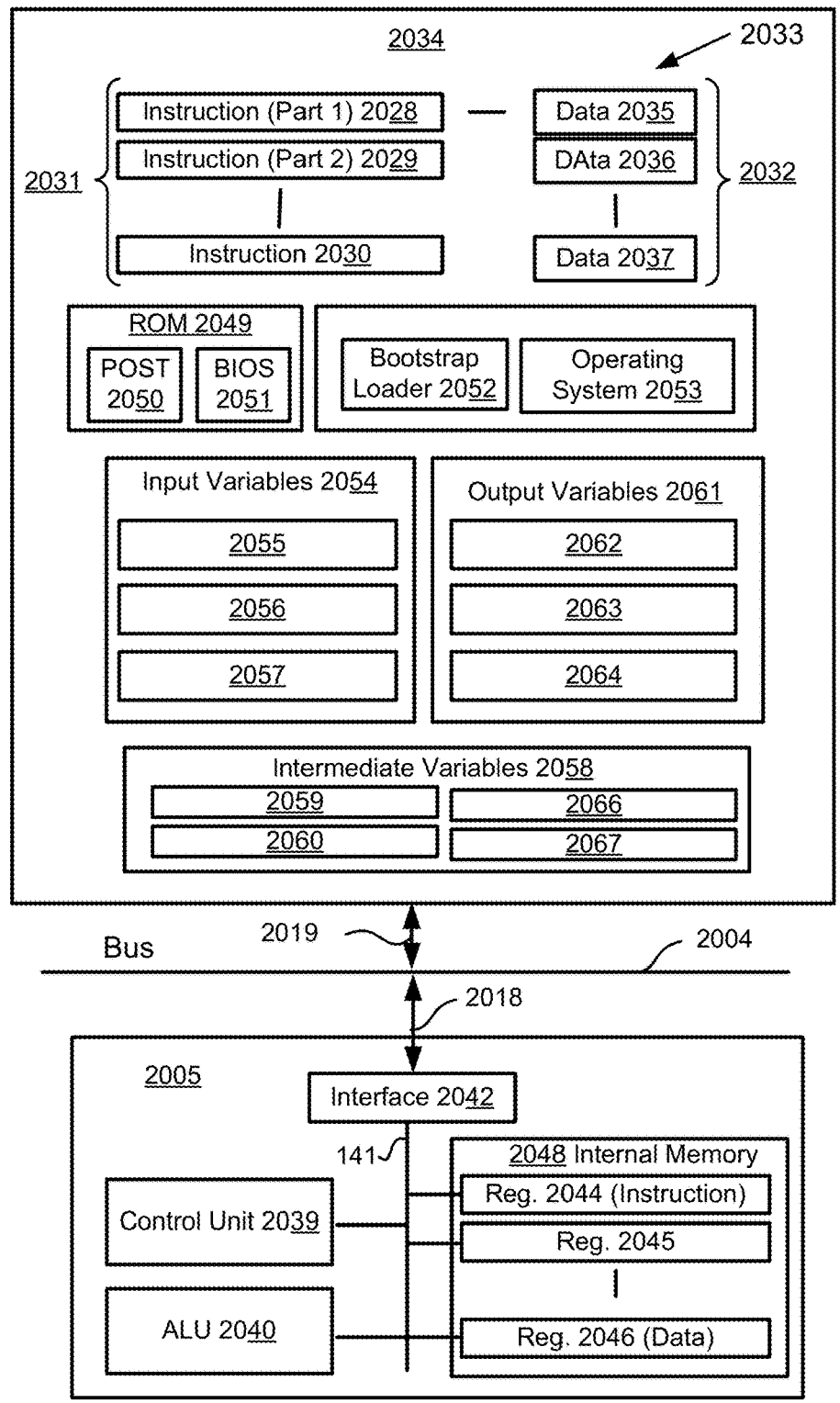

FIG. 24 is a detailed schematic block diagram of the processor 2005 and a "memory" 2034. The memory 2034 represents a logical aggregation of all the memory modules (including the HDD 2009 and semiconductor memory 2006) that can be accessed by the computer module 2001 in FIG. 22.

When the computer module 2001 is initially powered up, a power-on self-test (POST) program 2050 executes. The POST program 2050 is typically stored in a ROM 2049 of the semiconductor memory 2006 of FIG. 22. A hardware device such as the ROM 2049 storing software is sometimes referred to as firmware. The POST program 2050 examines hardware within the computer module 2001 to ensure proper functioning and typically checks the processor 2005, the memory 2034 (2009, 2006), and a basic input-output systems software (BIOS) module 2051, also typically stored in the ROM 2049, for correct operation. Once the POST program 2050 has run successfully, the BIOS 2051 activates the hard disk drive 2010 of FIG. 22. Activation of the hard disk drive 2010 causes a bootstrap loader program 2052 that is resident on the hard disk drive 2010 to execute via the processor 2005. This loads an operating system 2053 into the RAM memory 2006, upon which the operating system 2053 commences operation. The operating system 2053 is a system level application, executable by the processor 2005, to fulfil various high level functions, including processor management, memory management, device management, storage management, software application interface, and generic user interface.

The operating system 2053 manages the memory 2034 (2009, 2006) to ensure that each process or application running on the computer module 2001 has sufficient memory in which to execute without colliding with memory allocated to another process. Furthermore, the different types of memory available in the system 2000 of FIG. 22 need to be used properly so that each process can run effectively. Accordingly, the aggregated memory 2034 is not intended to illustrate how particular segments of memory are allocated (unless otherwise stated), but rather to provide a general view of the memory accessible by the system 2000 and how such is used.

As shown in FIG. 24, the processor 2005 includes a number of functional modules including a control unit 2039, an arithmetic logic unit (ALU) 2040, and a local or internal memory 2048. The local internal memory includes a cache memory. Cache memory is a memory that CPU can access more quickly than it can access regular memory such as memory 2090 or memory 2034. Cache memory stores the instruction and data that are frequently referenced by program 2033. The local internal memory 2048 also includes a number of storage registers 2044-2046 in a register section. One or more internal busses 2041 functionally interconnect these functional modules. The processor 2005 typically also has one or more interfaces 2042 for communicating with external devices via the system bus 2004, using a connection 2018. The memory 2034 is coupled to the bus 2004 using a connection 2019.

The application program 2033 includes a sequence of instructions 2031 that may include conditional branch and loop instructions. The program 2033 may also include data 2032 which is used in execution of the program 2033. The instructions 2031 and the data 2032 are stored in memory locations 2028, 2029, 2030 and 2035, 2036, 2037, respectively. Depending upon the relative size of the instructions 2031 and the memory locations 2028-2030, a particular instruction may be stored in a single memory location as depicted by the instruction shown in the memory location 2030. Alternately, an instruction may be segmented into a number of parts each of which is stored in a separate memory location, as depicted by the instruction segments shown in the memory locations 2028 and 2029.

In general, the processor 2005 is given a set of instructions which are executed therein. The processor 2005 waits for a subsequent input, to which the processor 2005 reacts to by executing another set of instructions. Each input may be provided from one or more of a number of sources, including data generated by one or more of the input devices 2002, 2003, data received from an external source across one of the networks 2020, 2002, data retrieved from one of the storage devices 2006, 2009 or data retrieved from a storage medium 2024 inserted into the corresponding reader 2012, all depicted in FIG. 22. The execution of a set of the instructions may in some cases result in output of data. Execution may also involve storing data or variables to the memory 2034.

The methods described below may use input variables 2054, which are stored in the memory 2034 in corresponding memory locations 2055, 2056, 2057. The disclosed methods produce output variables 2061, which are stored in the memory 2034 in corresponding memory locations 2062, 2063, 2064. Intermediate variables 2058 may be stored in memory locations 2059, 2060, 2066 and 2067.

Referring to the processor 2005 of FIG. 24, the registers 2044, 2045, 2046, the arithmetic logic unit (ALU) 2040, and the control unit 2039 work together to perform sequences of micro-operations needed to perform "fetch, decode, and execute" cycles for every instruction in the instruction set making up the program 2033. Each fetch, decode, and execute cycle comprises:

(a) a fetch operation, which fetches or reads an instruction 2034 from a memory location 2028, 2029, 2030;

(b) a decode operation in which the control unit 2039 determines which instruction has been fetched; and (c) an execute operation in which the control unit 2039 and/or the ALU 2040 execute the instruction.

Thereafter, a further fetch, decode, and execute cycle for the next instruction may be executed. Similarly, a store cycle may be performed by which the control unit 2039 stores or writes a value to a memory location 2032.

One or more steps or sub-processes in the processes of FIGS. 21, 25, 27, 30 and 31 may be associated with one or more segments of the program 2033 and is performed by the register section 2044, 2045, 2047, the ALU 2040, and the control unit 2039 in the processor 2005 working together to perform the fetch, decode, and execute cycles for every instruction in the instruction set for the noted segments of the program 2033.

Alternatively or additionally, one or more steps of the processes of FIGS. 21, 25, 27, 30 and 31, to be described, may be implemented as one or more code modules of the controlling program 2081 executable within the printing system 2015. The code modules forming the controlling program 2081 are typically stored in the memory 2090. The code modules forming the controlling program 2081 may be loaded into the printing system 2015 from the computer readable medium, and then executed by the printing system 2015. A computer readable medium having such software or computer program recorded on the computer readable medium is a computer program product. The use of the computer program product in the printing system 2015 preferably effects an advantageous apparatus for implementing one or more steps of the described methods.

In some instances, the controlling program 2081 may be supplied to the user encoded on one or more CD-ROMs, similar to the CD-ROMs 2025, or alternatively may be read by the user from the networks 2020 or 2022. Still further, software code modules for the controlling program 2081 may also be loaded into the system 2000 from other computer readable media.

The code modules implementing the controlling program 2081 may be executed by the controller processors 2070 in a similar manner to the code modules implementing the software application program 2033 as described above. Similarly, the code modules implementing the controlling program 240 of FIG. 2 may be executed by the controller processor 270 in a similar manner to the code modules implementing the software application program 2033 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 21:
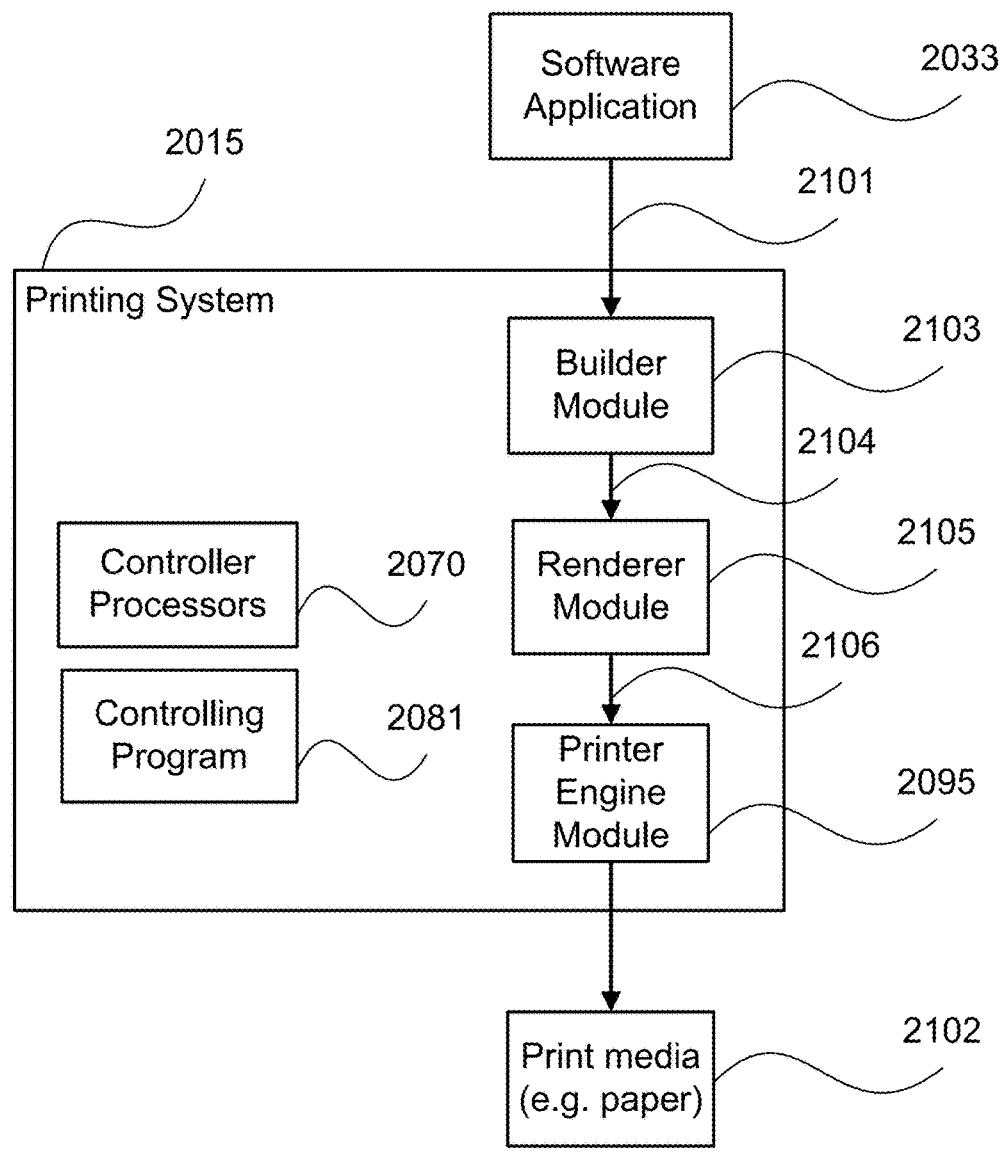
FIG. 21 is a software architecture for a printing system of FIG. 20.

FIG. 21 shows a software architecture for printing a printable document 21011 using the printing system 2015. Each of the modules 2103 and 2105 described below may be formed by one or more of the code modules of the controlling program 2081.

The software application 2033, for example, executing on the computer module 2001, provides the printable document 2101 to the printing system 2015 for printing to a print medium 2102, such as a paper sheet. The printable document 2101 is typically provided in the form of a description of the printable document 2101, the description being specified using a Page Description Language (PDL), such as Adobe® PDF or Hewlett-Packard® PCL. The PDL provides descriptions of graphic objects on each page to be rendered onto the print medium 2102 in a rendering (or z) order, as opposed to a raster image (i.e., a bitmap of pixel values) of each page to be printed.

A builder module 2103 receives a page of the printable document 2101 in PDL form and generates an intermediate format representation known as a final print job 2104 of the page under execution of one or more of the controller processors 2070. The term "intermediate format representation" refers to a data format which is intermediate between pixel data and a display list representation of the printable document 2101 being printed. Instructions from the page description language representation can be pre-processed into basic commands, which a printer can handle. For example, such basic commands may be generated by decomposing objects into sets of pixel aligned edges and colour data in the form of fills or compositing sequences. In the example described, the sets of pixel aligned edges and colour data in the form of fills or compositing sequences constitute the final y-banded print job 2104. One example of such intermediate representations known in the art is fillmap, which will be described in detail later, with reference to FIGS. 5A and 5B. The compact intermediate printable data representation such as fillmap, reduces the size of a final print job 2104, thus reducing the bandwidth requirements between builder module 2103 and renderer module 2105. Further, in case an input job is split into several layers, compact intermediate format representation of each layer reduces the working memory requirements for the builder module 2103 where merging of multiple intermediate format representations takes place to produce final print job 2104. Compact intermediate printable data representations such as fillmap, usually require much less memory than pixel frame stores.

The final print job 2104 is printable data that can be divided into y-bands which can be further divided into strips. Y-bands are horizontal sets of consecutive scanlines of a page ordered according to their y-coordinate on the page, the position on the page henceforth referred to as y-order. Similarly, strips are horizontal sets of consecutive scanlines of a y-band, ordered according to their y-order. Y-bands or strips are numbered according to their y-order, from 0 to n, where the first y-band or strip (at the top of the page or the y-band) is numbered 0 while last y-band (at the bottom of the page or the y-band) is numbered n. The y-band and strip sizes are arbitrary chosen and can vary from job to job.

The printing system 2015 then uses a renderer module 2105 to render the final y-banded print job 2104 to pixel data values 2106. The pixel data values 2106 are printed onto a print medium 2102, such as paper, using a printer engine module 2095. The printer engine module 2095 may, for example, be an electro-photographic engine.

A y-band size may be determined as an initial granularity of page division in the process of building the fillmap representation. The process of building the fillmap representation will be described in detail below. While the y-band size is the initial size of the entire fillmap to be built, the process of building the fillmap representation comprises a series of steps, each step producing a single strip of fillmap.

A strip size is determined as the minimum granularity of a page division, i.e. the fillmap builder module 2103 cannot output consistent amount of fillmap data that is less than one strip. As will be described later with reference to FIGS. 23-31, a single strip fillmap is output by a single step of the fillmap building process to a z-layered fillmap store as soon as generated. The fillmap builder module 2103 processes the set of strips sequentially in y-order. Working data, including state variables, of the fillmap builder module 2103 is reused from one strip to another. By contrast, y-bands can be processed by the fillmap builder module 2103 independently since there is no sharing of working data or state variables between y-bands. Multiple y-band fillmaps can be built in parallel on high performance system.

Each y-band is preferably self-contained and independent from other y-bands. Thus, objects that intersect two y-bands are included in a display list for each of the y-bands sharing that object, preferably, by the way of referencing object data stored in a shared memory. Objects which entirely fall within a single y-band are preferably stored in a local display list store for the y-band.

Strips, however, are not self-contained. For each strip a list of objects which start on that strip is built, i.e. a list of display list entries. As such, objects may intersect multiple strips, however, only one display list element will be created for these objects, in a single y-band. Strips within a single y-band are processed sequentially. In one implementation display list elements, once processed within a strip, are moved to the next strip, as will be described later.

The builder module 2103, renderer module 2105 and print engine module 2095 may be implemented as one or more code modules of the controlling program 2081 which is executed by the controller processors 2070 within the printing system 2015. The builder module 2103 will be described in more detail later with reference to FIGS. 23-31.

Operation of the printing system 2015 is similar to that of the computer module 2001 in terms of storage and execution of the controlling program 2081 by the memory 2090 and the controller processors 2070, respectively. However, the controlling program 2081 is typically multi-threaded with distinct program threads executing on corresponding ones of the multiple processors 2071-2074 making up the controller processors 2070. As such, the foregoing description of the computer module 2001 is generally applicable to the printing system 2015. Specifically, the controlling program 2081 is typically stored on a memory drive (not illustrated) which may be a hard disk drive or semiconductor hard drive. Further, the controlling program 2081 may be loaded via an interface connection (e.g., a USB port) or via the network 2020.

Returning to FIG. 20, in the pixel rendering system 2000, the software application 2033 creates printable documents for printing, such as printable document 2101. The printable document 2101 often contains graphic objects such as text, lines, fill regions, and image data. The software application 2033 sends a high-level description of the printable document (e.g., a PDL file) via the network 2020 to the controlling program 2081 that is executed by the controller processors 2070 of the printing system 2015. The printable document 2101 contains all information required by the printing system 2015 to render and print each page of the document.

In alternative arrangements, the printing system 2015, the controller processors 2070 and controlling program 2081, may be resident in separate servers connected to the network 2020. In still another alternative arrangement, the printing system 2015, the controller processors 2070 and controlling program 2081 may be resident in a distributed network of servers. In such systems, the raster image representation produced by the controlling program 2081 is sent to the printer engine module 2095 via a network rather than the bus 2075.

The described methods may also be implemented as part of other graphics rendering systems in which an intermediate representation is rendered (e.g., for displaying PDF documents on an LCD display). As such, the described methods are not limited to printing systems.

Figure 23:
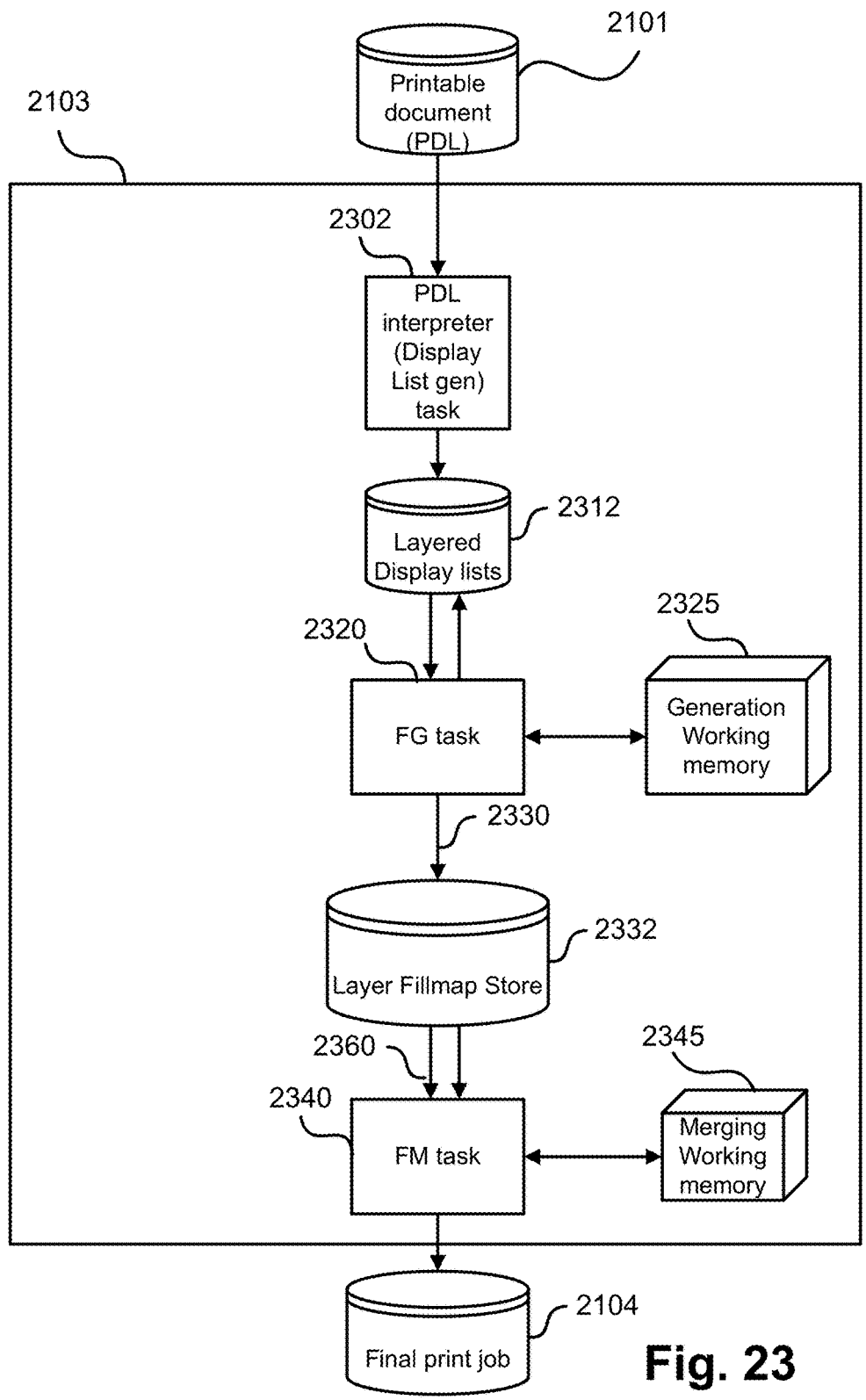
FIG. 23 is a schematic block diagram representation of components of the builder module of FIG. 21.

The builder module 2103 will now be described in more detail with reference to FIG. 23. The purpose of the builder module 2103 is to create (build) the final print job 2104 which is an intermediate format representation of a page of the printable document 2101 being printed.

The data from the PDL document 2101 is interpreted by a PDL interpreter 2302 to generate one or more display lists. The PDL interpreter 2302 produces a sequence of graphic objects in z-order under execution of the controller processors 2070. The number of graphical objects on the document page as well as other information, such as bounding boxes for the graphical objects, can be determined from the PDL input. The graphic objects produced by the PDL interpreter 2302 are grouped into z-ordered batches. The z-ordered batches are called z-layers or simply layers.

Then, the PDL interpreter 2302 converts each layer to a display list or a layered display list. The batch sizes for the lists are established by estimating the resulting display list cumulative complexity so that partial rasterization of each layer is estimated to succeed within an allocated memory. The details of cumulative complexity estimation will be described later with references to FIG. 28. Once a cumulative complexity in current layer reaches the predetermined threshold, the current layer forms a display list and a new layer with zero cumulative complexity is created.

Each display list contains a sequence of graphic objects or references to graphical objects, preferably sorted by the first scan lines on which the graphic objects appear within the y-band. The formed display lists are stored in a layered display list store 2312 configured within the memory 2090 or cache memory of the internal memory 2048. The layered display list store 2312 comprises the graphic objects produced by the PDL interpreter 2302. The layered display list store 2312 comprises a set of display lists, one or more display list per each y-band. The details of the PDL interpreter 2302 will be described later with reference to FIG. 27.

For each display list in the layered display list store 2312, a corresponding fillmap generation task, or FG task (i.e., task 2320) is created. Each FG task 2320 receives a display list and converts that display list to an intermediate fillmap layer under execution of the controller processors 2070. The intermediate fillmap layer is an intermediate format representation for the display list. The process of converting to an intermediate fillmap layer involves decomposition of object shapes in a display list into simpler entities such as monotonic edges and vectors and tracking of vectors to establish regions of pixels covered by fill compositing sequences. The FG task 2320 under execution of the controller processors 2070 uses a generation working memory 2325 to store working data and state information used for or during generating an intermediate format representation, e.g. a fillmap. For example, the generation working memory 2325 may store vectorization information for each object edge, edge tracking information and object arrangement tracking information for generating a fillmap. The generation working memory 2325 can be configured within the memory 2090. Alternatively, the generation working memory 2325 can be part of cache memory of the internal memory 2048 of the controller processors 2070.

The exact amount of generation working memory required to transform a given display list layer to a fillmap is unknown a priori, but usually is a function of a display list complexity. Given the display list complexity, the amount of the generation working memory can be estimated by any method known in the art. For example, the amount of the generation working memory may be estimated from the display list complexity by determining the number of data structures to be held simultaneously in the generation working memory 2325 and multiplying the determined number by a size of each data structure. The determined number of data structures varies depending on the memory management algorithm used, but usually is proportional to the display list complexity. For pixel sequential rendering methods, the number of data structures to be held simultaneously in the generation working memory 2325 is proportional to the maximum number monotonic edges crossing or intersecting any scanline.

The accuracy of the estimation of the generation working memory is limited. Moreover, a given real world method cannot spend too much time generating a precise estimate, therefore some input data can result in a significant difference between estimation and actual memory usage. As such, in some cases a FG task 2320 may require more memory than initially estimated. If memory is not available for the FG task 2320, the FG task 2320 would be unable to complete conversion of a given display list layer to an intermediate format representation, such as an intermediate fillmap layer.

In case FG task 2320 is unable to convert a given display list layer into an intermediate fillmap layer due to insufficient amount of the generation working memory 2325 allocated, a display list is divided into at least two sub-layers, also referred as sub-layer display lists or sub-display lists. The display list dividing process re-organises the structure of the display list layer in the layered display list store 2312. The sub-layers or sub-layer display lists may be stored in the layered display list store 2312. The generated sub-layers are then input into subsequent FG tasks 2320. Given that the display list was split in z-order, the sub-layer display lists do not share fill objects, while may share clip objects. The maximum number monotonic edges crossing any scanline for a sub-layer display list, i.e. the cumulative complexity measure used by pixel sequential algorithm, is likely to be lower than that of the original display list layer since each sub-layer contains fewer objects than the original layer contained. Consequently, the amount of the generation working memory 2325 required by each subsequent FG task is likely to be reduced given that the cumulative complexity measure of a layer or a sub-layer determines the amount of the generation working memory 2325 needed. Therefore, both subsequent FG tasks have a higher chance of succeeding in converting respective sub-layers to intermediate fillmap layers within the generation working memory 2325 allocated for the original FG task. If some or both FG tasks fail to convert their respective sub-layers after subdivision, the failed sublayers can be further divided into more sub-layers until their conversions succeed.

It should be noted that splitting a display list in z-order may not always guarantee successful conversion of the sub-layers of the display list to an intermediate format representation. For example, to convert a graphical object having thousands of edge crossings per a scanline to a set of pixel aligned monotonic edges may require more memory than available no matter how a display list is split. However, in the majority of cases, the embodiments of the arrangements described would increase likelihood of successful conversion of a display list to a fillmap without requiring complex memory estimation techniques.

Figure 25:
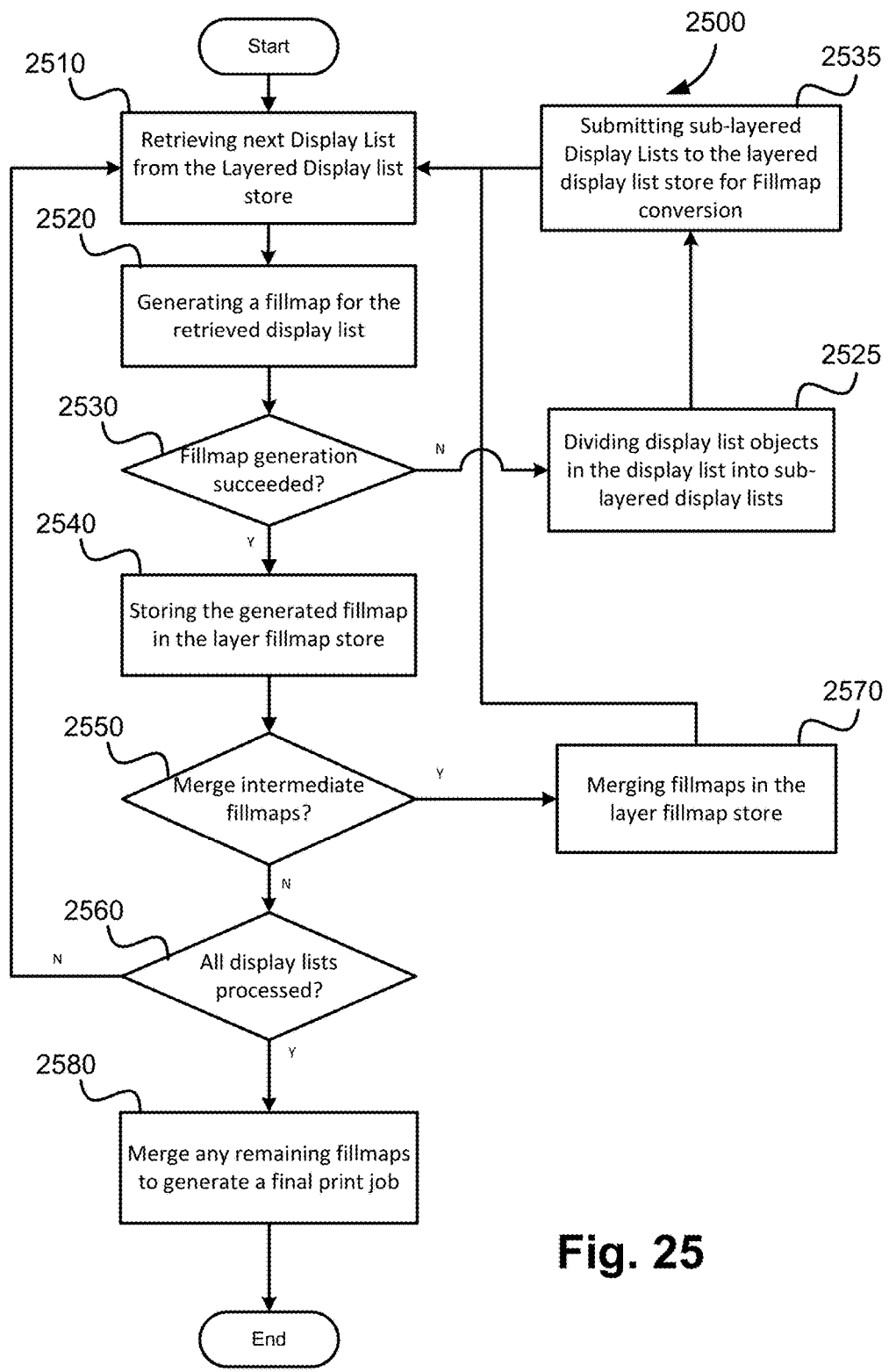
FIG. 25 is a schematic flow diagram illustrating a method of building a final print job from a plurality of display lists.

The details of the fillmap generation task workflow performed by the builder module 2103, will be described in more detail below with reference to FIG. 25.

In a sequential implementation of the builder module 2103, only a single FG Task 2320 is created at a time, and the layered display list store 2312 holds just one display list, i.e. the display list being converted to a fillmap. In a parallel implementation of the builder module 2103, any number of FG tasks, such as task 2320, can be created at a time, each task with its own generation working memory 2325. The FG tasks 2320 are simultaneously reading multiple display lists stored in the layered display list store 2312 and converting the display lists into intermediate, i.e. not final, fillmap layers.

Intermediate fillmap layers are collected into a set of layered fillmaps in a layered fillmap store 2332 configured, for example, within the memory 2090. The layered fillmaps are temporarily stored in the layered fillmap store 2332 as depicted in FIG. 23.

Intermediate fillmap layers 2332 represent graphical data in the y-bands in an intermediate format, a format intermediate between a display list format and rendered pixels or a bitmap. Suitable representations include run-based representations and region-based representations. With a run-based representation, the geometric area of the y-band is divided into scan lines, and each scan line into segments, also known as runs. With a region-based representation, the geometric area of the y-band is divided into two-dimensional portions known as regions. The lengths and positions of the runs, or the shapes of the regions, are derived from the outlines of the graphic objects received from the PDL interpreter 2302. Planar maps and trapezoidal decomposition are examples of region-based representation. Alternatively, representations using pixel-accurate rasterized edges have also been used in the art. One of such representations is a fillmap, which will be described in detail in FIGS. 5A and 5B. Preferably, a format for intermediate fillmap layers supports merging of y-banded layers while correctly preserving compositing operations.

In the preferred implementation, each run or region is stored with an associated sequence of one or more operations that describe how to render the run or region, that is, how to generate the values of the rendered pixels. For example, a region or a set of runs representing an object of uniform colour will be associated with an instruction to paint that colour. A region or set of runs representing the area of overlap of two composited objects will be associated with a set of instructions comprising an instruction to paint the first colour of the first object and an instruction to composite the colour of the second object with the painted first colour.

Producing a run-based or pixel-accurate region-based representation of a y-band layer by y-band fillmap generation task 2320 can be performed by scan converting the outlines of the objects in the display list. Rather than rasterizing fully into rendered pixel values, only intersections of object outlines with scan lines and associated rendering instructions can be stored. A region-based approach also involves tracking edges from one scan line to the next and storing the sequence of scan-line intersection points for a region boundary. As each run or region is formed, the set of instructions that would be used to render the run or region is collected and represented as a sequence of operations associated with the run or region.

Merging intermediate format representations of two (or more) y-band layers is performed by a fillmap merging (FM) task 2340 under execution of the controller processors 2070. The fillmap merging task involves forming an intersection of the runs or regions of one layer with the runs or regions of the other layer. In general, in each area of intersection, the compositing operations of the two layers are concatenated in accordance with z-order to form a sequence of operations for the merged layer. However, where a run or region in the layer with higher z-order is opaque, that is, the result of merging depends on the upper layer only, the run intersection and compositing operation concatenation is preferably avoided in order to eliminate unnecessary spatial fragmentation and to optimize memory usage and performance. In this case, the corresponding run or region in the merged result will only contain the data from the opaque run or region in the layer with higher z-order.

In order to produce the final y-banded print job 2104 that represents an intermediate representation of the entire page of the printable document 2101, one or more FM tasks, such as the task 2340, may be required. Each FM task typically receives two or more y-banded intermediate fillmap layers from the layered fillmap store 2332 and merges them into a single y-banded representation, which is another y-banded intermediate layer (e.g., 2360). Fillmap merging process combines two or more overlapping intermediate fillmap layers onto a single layer within the same y-band as shown on an example in FIG. 33. This merged y-banded intermediate layer is then stored back in the layered fillmap store 2332, as depicted in FIG. 23, in anticipation of additional merging. If there are no more y-banded intermediate fillmap layers left to merge in the layered fillmap store 2332, the final merge produces the final y-banded print job 2104 of a page of the printable document 2101 which, as depicted in FIG. 23, may also be stored in the layered fillmap store 2332.

When fillmap layers are spatially disjoint, e.g. occupying disjoint sets of y-bands or disjoint sets of strips within y-band, then obtaining the final y-banded print job 2104 from such fillmap layers involves a process of concatenating the fillmaps in y order, no fillmap merging in z-order is needed in this case.

The process of merging uses merging working memory 2345 configured, for example, in the memory 2091 or alternatively in cache memory 2048. The Merging Working Memory 2345 stores working data and state information for the FM task 2340. Such working data and state information includes fillmap edges decompressed to the format suitable for merging, fillmap edge tracking information, etc.

The exact amount of merging working memory 2345 required to merge a given amount of intermediate fillmaps is unknown a priori. However, the required merging working memory is usually smaller than the amount of fillmap generation working memory 2325. Further, the merging working memory 2345 can have an upper bound by restricting the size of region, therefore the amount of pixels merged at a time. The fillmap generation working memory 2325 allocated for the FG Task 2320 cannot be restricted in the same way because the number of vector edges in a given layer of objects, intersecting a given region of pixels can be unlimited.

The final merged representation in the intermediate format 2104 is sent to the renderer module 2105. The format of the final merged representation can be essentially the same as the format of fillmap layers. The renderer module 2105 can produce rendered pixels by taking each run or region and performing the associated sequence of operations to generate pixel values.

Often, the renderer module 2105 produces an output in a raster order. In that case, to render a region-based representation, the renderer module 2150 may need to maintain a sequence of active regions for a current output scan line as rendering progresses from one scan line to the next.

As discussed above, the fillmap is an example of an intermediate print format representation known in the art. The fillmap stores regions of a page in a format intermediate between a display list format and a bitmap format. The fillmap maps a portion or a fillmap region of pixels within the page to a fill sequence which will be composited to generate the colour data for each pixel within that fillmap region. Multiple fillmap regions within a fillmap can map to the same fill sequence. Fillmap regions within the fillmap do not overlap (i.e. they are non-overlapping fillmap regions) and hence each pixel in the rendered page can only belong to a single fillmap region. Each fillmap region within the fillmap is defined by a set of pixel-aligned fillmap edges which activate the fill sequence associated with that fillmap region. The pixel-aligned fillmap edges:

(i) are monotonically increasing in the y-direction of the page;

(ii) do not intersect;

(iii) are aligned with pixel boundaries, meaning that each pixel-aligned fillmap edge consists of a sequence of segments, each of which follows a boundary between two contiguous pixels;

(iv) contain a reference field referring to the index of the fill sequence, within the table of fill sequences, required to be composited to render the fillmap region, to which the pixel-aligned fillmap edge belongs, to pixels; and (v) activate pixels within a single fillmap region.

On any given scanline (i.e. y being constant), starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated.

Within a fillmap, the fill sequence active within each fillmap region of pixels is stored in the table of fill sequences. A fill sequence is a sequence of z-ordered levels, where each level contains attributes such as a fill, the opacity of the level, a compositing operator which determines how to mix the colour data of this level with other overlapping levels, and the priority, or z-order, of the level. A fill sequence contains references to all the levels which may contribute colour to the pixels within a fillmap region. The table of fill sequences contains all of the fill sequences required to render the portions of the page to pixels. The table of fill sequences does not contain duplicate instances of identical fill sequences. Hence, multiple fillmap regions within a fillmap which map to the same fill sequence, map to the same instance of the fill sequence within the table of fill sequences.

A method 2500 of building a final print job 2104 from the set of display lists stored in the layered display list store 2312, using the builder module 2103, will now be described with reference to FIG. 25. The method 2500 is controlled by execution of the processor 2070. The method 2500 relates to execution of the tasks 2320 and 2340 of FIG. 23.

The method 2500 begins at a retrieving step 2510, where a display list is retrieved from the Layered Display List store 2312. In some arrangements, the fillmaps are generated serially to facilitate the generating of the intermediate format representations within the allocated memory. The display list retrieved from the layered display list store 2312 is then partially rasterized at step 2520 to generate an intermediate format representation, such as a fillmap, by the builder module 2103 under execution of one or more controller processors 2070. The generating step 2520 uses the generation working memory 2325.

Then, at step 2530 the builder module 2103, under execution of one or more controller processors 2070, determines if fillmap generation was successful. If affirmative, the control moves to a storing step 2540 where the generated fillmap is stored in the layered fillmap store 2332. As discussed above, the generating step 2520 may need more memory to convert the retrieved display list to a fillmap than available in the generation working memory 2325 or initially estimated by the PDL interpreter 2302. For example, this may be detected in response to failing to allocate requested memory. If the generating step 2520 requires more working memory than available in the generation working memory 2325, then the decision step 2530 returns negative. Detecting a failure to allocate requested memory while partially rasterizing objects of the display list at step 2520 effectively determines whether more than the currently allocated memory is required to complete generation of the fillmap.

Once the generated fillmap is stored in the layer fillmap store 2332, the builder module 2103, under execution of one or more controller processors 2070, determines at a decision step 2550 if enough fillmaps have been produced and stored in the layered fillmap store 2332 to warrant the start of fillmap merging. For example, merging can commence if the fillmaps stored in the layered fillmap store 2332 reach or exceed a predetermined limit, such as number of fillmap layers or estimated amount of the merging working memory 2345 required for merging. If the decision step 2550 returns affirmative, the Merge Fillmap task 2340 is created at step 2570, that reads any number of fillmap layers from the layered fillmap store 2332 and merges the fillmap layers, as described in FIG. 33. The merged fillmap layer is then stored in the Layered fillmap store 2332. The control then moves to the retrieving step 2510. If the decision step 2530 returns negative, i.e. the step 2520 was not able to convert the retrieved display list to a fillmap within the generation working memory 2325, the builder module 2103 may discard any partial fillmap stored in the layered fillmap store 2332 by step 2520 since in some implementations the content of the layered fillmap store 2332 cannot be left in an unknown state. The step 2520 may fail, for example, because, while generating the intermediate format representation for the selected layer, more than the allocated memory is required to complete the generating. In an alternative implementation, the fillmap generation step 2520 may retains any partial fillmap generated in the layered fillmap store 2332 as will be described later.

Then the builder module 2103, under execution of one or more controller processors 2070, moves to a dividing step 2525 that divides or splits the display list retrieved by the retrieving step 2510 in z-order into at least two sub-layered display lists to facilitate rasterization of the selected layer within the allocated memory. Further details of the dividing step 2525 will be described below with reference to FIG. 29B.

When the partial fillmap is retained in the Layered fillmap store 2332 before the failure to complete fillmap generation within the generation working memory 2325, the division step 2525 can form sub-layered display lists as will be described in FIG. 32B. Then control moves to submitting step 2535, which adds the two sub-layered display lists into the Layered Display List store 2312. Preferably, in a low memory system, the sub-layered display lists are rasterized sequentially to ensure that the generating of a fillmap succeeds within the allocated memory, e.g. the generation working memory 2325. Particularly, rasterization of a second sub-layered display list is started in response to completing generation of fillmap for a first sub-layer. In high-end systems, the sub-layered display lists may be rasterized in parallel using memory other than the cache memory of the internal memory 2048. Then control loops back to the retrieving step 2510.

If the decision step 2550 returns negative, then the builder module 2103 tests at decision step 2560 whether all display lists in the layered display list store 2312 have been processed, i.e. if the Layered Display List Store 2312 is empty. If the decision step 2560 returns negative, the control loops back to the retrieving step 2510.

Finally, if the decision step 2560 returns affirmative, the builder module 2103 proceeds to merging step 2580 where any remaining fillmap layers in the layered fillmap store 2332, including those generated from sub-layer display lists, are merged by the builder module 2103 under execution of one or more controller processors 2070 to facilitate rasterization of the selected layer within the allocated memory. Merging in the merging step 2580 is similar to the merge fillmaps task 2340. However, the output of the merging step 2580 is the final print job 2104. Upon producing the final print job 2104, the fillmap building process concludes. Upon completion of the method 2500, the renderer module 2105 renders the final print job 2104 to pixels. As such, the renderer module 2105 renders a graphical representation of the input 2101 by generating the intermediate format representation for the merged sub-layers. Generating the intermediate format representation for the merged sub-layers facilitates rasterization of the selected layer within the allocated memory.

Figure 26A:
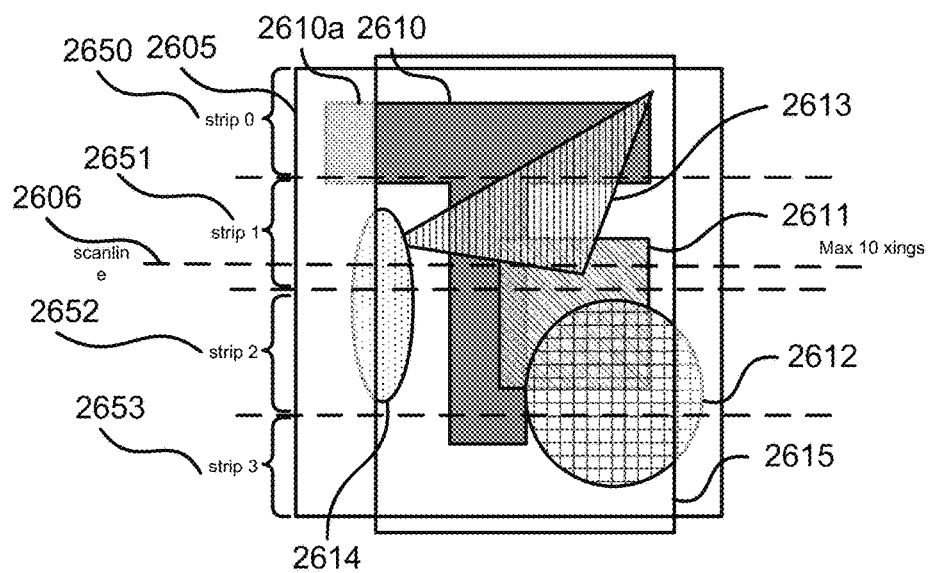
FIG. 26A shows an example of a page with a layer of graphic objects, divided into four horizontal strips.

FIG. 26A shows an example page 2605 with a layer of six graphic objects, 2610-2615. In this example, a y-band size is equal to the page size, i.e. there is only one y-band per page. In general, a page can have more than one y-band, each y-band processed separately. In such a case, a page 2605 could be considered as one of many y-bands forming a larger page (not shown), without change of the rest of the description related to the FIG. 26A.

The graphic object 2610 with the smallest z-order, is an opaque "T" shaped object with a grey fill. The object 2610 is followed by the graphic object 2611 which has the next higher z-order, is a semi-transparent square with a left hatched fill. The object 2611 is followed by the graphic object 2612, a semi-transparent circle with a checkered fill. The object 2612 is followed by the graphic object 2613, a semi-transparent triangle with a hatched fill. The object 2613 is followed by the graphic object 2614, an opaque oval with a dotted fill. The object 2614 is followed by the graphic object 2615, a rectangular clip, which has the highest z-order of all graphic objects 2610-2615.

The objects 2610-2614 are fill objects, which means objects 2610-2614 are painted on the page using the fill information stored in the fill table (not shown). The last object 2615 is a clip object, which means the object 2615 does not contribute any painting operation but clips the range of other objects. The clip range of a clip object is defined as the range of z-orders Zmin to Zmax, i.e. all fill objects having z-orders between Zmin to Zmax inclusive, are not painted outside the path of the clip object. The clip range of the object 2615 spans all z-orders within the layer on FIG. 26A, i.e. the objects 2610-2614 are clipped. Therefore, parts of objects 2610-2614 outside of object 2615 path are not painted. For example part 2610a of object 2610 is shown as greyed, because part 2610a is outside of object 2615 path, therefore not painted. Clip objects do not have their fill information stored in the Fill Level Table, because they do not contribute to painting of any fill. The clip objects, however, reference the range of fill level table entries associated with the fill objects, according to the clip range.

The page 2605 is split into four strips 2650 to 2653, numbered according to their y-order on the page. First strip 2650 is numbered strip 0, the next strip 2651 is numbered strip 1, the next strip 2652 is numbered strip 2, and the next strip, which happens to be the last strip 2653, is numbered strip 3.

A measure of object layer complexity on page 2605 can be a number of edge crossings by object paths on any given scanline. The maximum of the edge crossings across the page can determine the overall layer complexity. As described above, the display list layer complexity can be used to estimate the working memory required to convert a display list layer into a fillmap. In general, as objects are added to a given display list layer, the number of edge crossings grows so does the complexity of the display list layer. The actual complexity depends on the shape of the objects and their relative arrangements.

For example, on page 2605, a scanline 2606 within strip 1, crosses 5 objects 2614, 2610, 2611, 2613 and 2615. Each object outline is crossed twice. Therefore, the scanline 2606 crosses 10 object outlines in total. Scanline 2606 happens to cross the maximum number of object outlines in the display list layer shown on FIG. 26A.

In order to reduce the maximum number of object outline crossings, the display list layer on FIG. 26A is split into two or more sub-layers in response to failing to allocate more memory for fillmap generation in step 2520.

Figure 26B:
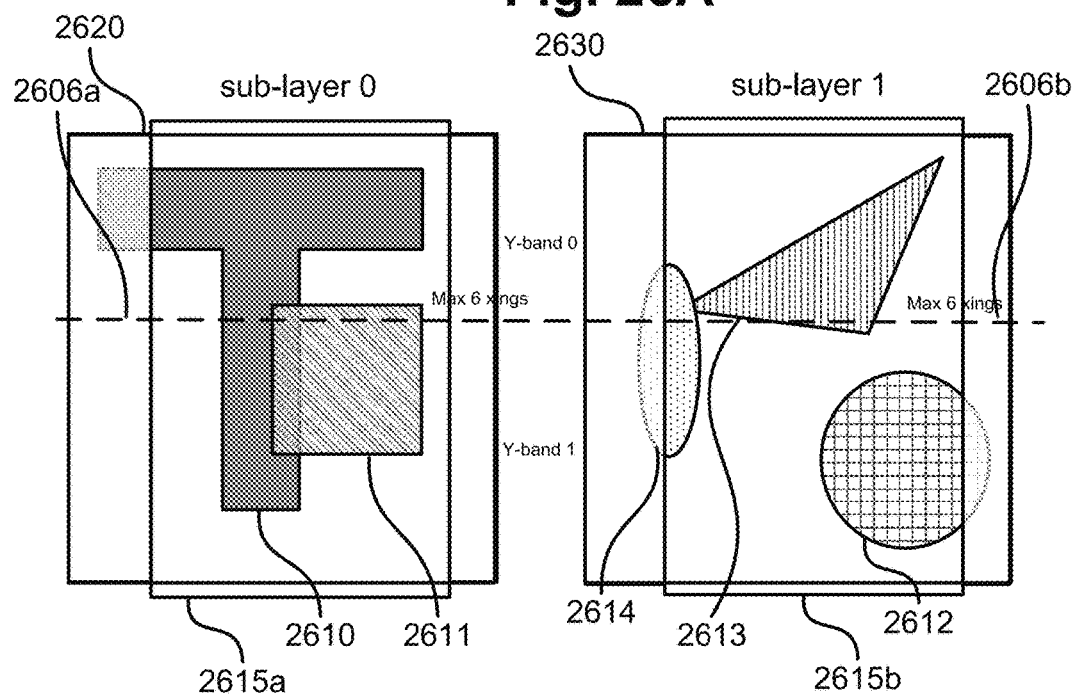
FIG. 26B shows the layer of objects of FIG. 26A divided into two sub-layers.

The fill objects 2610-2614 are split into two sub-layers 2620 and 2630 as shown in FIG. 26B. The sub-layer 2620 contains two fill objects with smallest z-order, being the objects 2610 and 2611. The sub-layer 2630 contains three fill objects with largest z-order, being the objects 2612, 2613 and 2614. Sub-layers are also numbered according to the z-order of their objects on the page. The bottommost sub-layer 2620 is numbered sub-layer 0, while the next sub-layer, which happens to be the topmost sub-layer 2630, is numbered sub-layer 1. The clip range of the clip object 2615 references the objects that end up in both sub-layers 2620 and 2630. Therefore the clip object 2615 is added to both sub-layers 2620 and 2630. The first copy 2615a of the clip object 2615 in the sub-layer 2620 clips the range of objects 2610 to 2611. The second copy 2615b of the clip object 2615 in the sub-layer 2630 clips the range of objects 2612 to 2614.

The scanline 2606a in the sub-layer 2620, which corresponds to the scanline 2606 in FIG. 26A, now intersects 3 objects, i.e. 6 object outlines in total. Likewise, scanline 2606b in sub-layer 2630, which corresponds to the scanline 2606 in FIG. 26A, now intersects 3 objects, i.e. 6 object outlines in total. Scanlines 2606a and 2606b, cross the maximum number of object outlines in their respective sub-layers, therefore the complexity measure of each of sub-layers 2620 and 2630 (estimated from 6 object outline crossings each) is smaller than the complexity measure of the original layer of page 2605 (estimated from 10 object outline crossings). Such complexity measure is directly proportional to a working memory for scan-converting layers of objects in a pixel-sequential manner.

Pixel-sequential algorithms hold state information, including vectorization information and edge tracking information, for each edge crossing on a given scanline. The maximum of edge crossings across a range of scanlines determine the maximum working memory requirements of a pixel-sequential algorithm. Thus, state information of only 6 crossings is stored in the working memory of a pixel-sequential algorithm converting each of sub-layers 2620 and 2630 to an intermediate format representation. If sub-layers 2620 and 2630 are processed sequentially, the maximum working memory requirements do not exceed the state information of 6 edge crossings, which is proportionally less than during processing of the original layer with 10 edge crossings.

Figure 27:
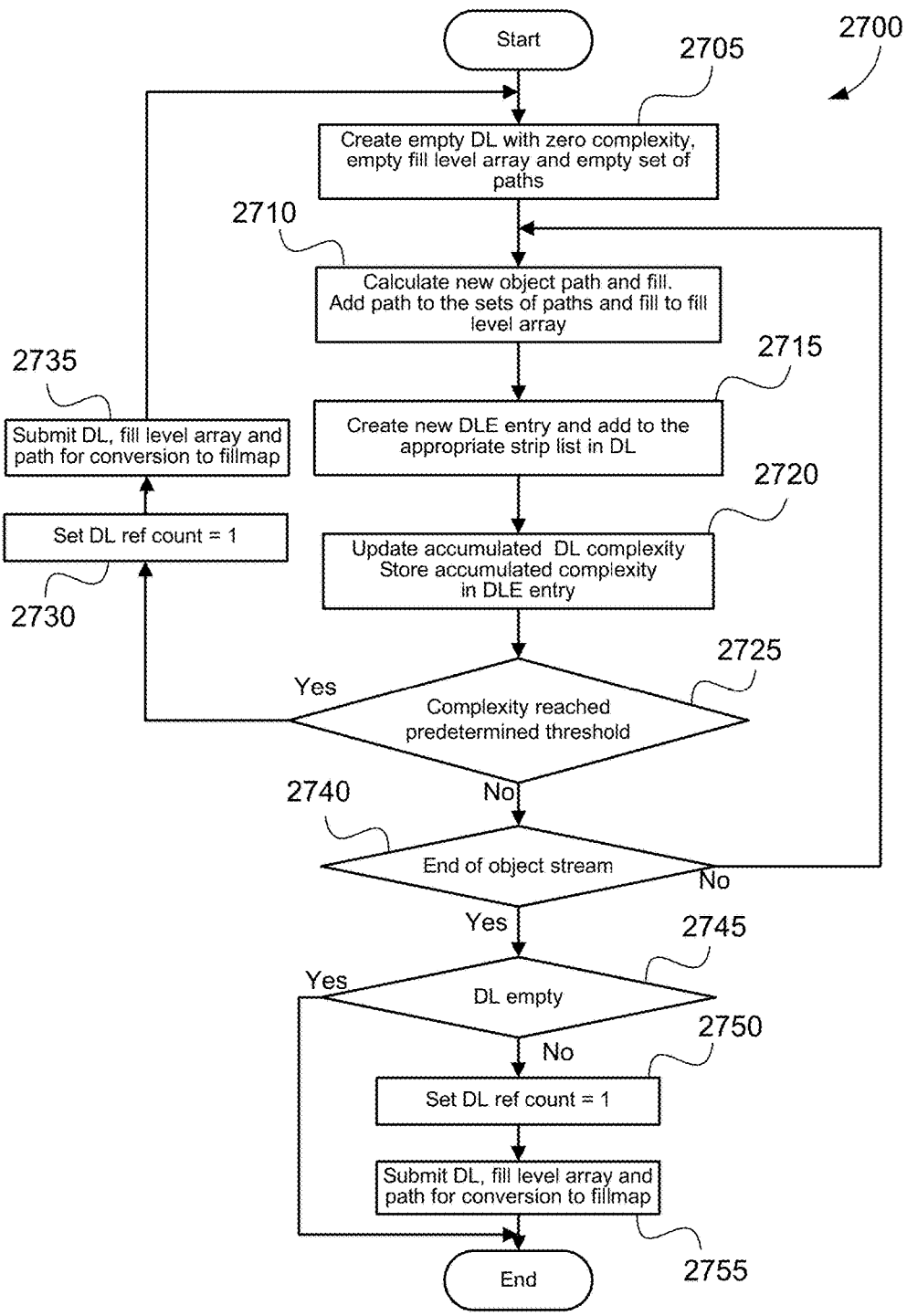
FIG. 27 is a schematic flow diagram illustrating a method of interpreting a PDL document using a PDL interpreter of FIG. 23.

A method 2700 of interpreting the printable document 2101, using the PDL interpreter 2302 of the builder module 2103, will now be described with reference to the flowchart of FIG. 27. The method 2700 generates layered display lists by the PDLi interpreter 2302 and is controlled by execution of the processors 2070. The PDL interpreter 2302 stores the generated layered display lists in the layered display list store 2312 configured, for example, within the memory 2090.

The method 2700 starts with an initialising step 2705. At the initialising step 2705, the PDL interpreter 2302, under execution of one or more controller processors 2070, creates an empty display list with zero complexity, which is the cumulative complexity described in more detail in FIG. 28. The empty display list is in the form shown in FIG. 29A, except all layer strip lists are empty and a fill level table is also empty. The layer strip lists and the fill level table can be stored, for example, within the layered display list store 2312.

Then control moves to a calculating step 2710 where a new object path and a fill are calculated, under execution of one or more of the controller processors 2070, from input PDL stream of the printable object 2101. If the calculated path is a fill path, then the entry is added to the fill level table. Then control moves to a step 2715 where a new Display List Element (DLE) is created with a reference to the calculated path. The DLE is then added to a layer strip list selected based on the strip where the path starts. If the path is a fill path, then a fill entry is added to the fill level table. A reference is created to the added fill entry from the DLE. If the path is a clip path with a defined clip range of previously created fill paths, the DLE is assigned the defined clip range.

Then the PDL interpreter 2302 moves, under execution of one or more controller processors 2070, to an updating step 2720 where an accumulated complexity of the display list constructed so far by the steps 2710 to 2720 is updated, as will be described in FIG. 28. The updated accumulated complexity measure determined at step 2720 can be stored in the corresponding DLE entry just created, indicating how complex the generated fillmap would be if the DLE is included to previously created lower z-order DLEs. The accumulated complexity also provides an indicative measure of how much memory is likely to be required to convert the DLEs created so far to a fillmap.

Then control moves to a decision step 2725 where the PDL interpreter 2302 tests, under execution of one or more controller processors 2070, if the accumulated complexity updated by the step 2720 has reached or exceeded a predetermined threshold. The predetermined threshold is chosen based on the amount of the working memory available for the builder module 2103 in the system or in the fast memory cache, for example, the amount of generation working memory 2325.

Additionally, or alternatively, the threshold used at step 2725 is chosen to balance between the amount of working memory required to convert the layered display list to a fillmap and an expected execution time. For example, the more layered display lists are created, the more merging is done, which is likely to result in longer execution time. In some systems, the threshold at which the generation working memory 2325 for conversion of the layered display list to a fillmap is equal to the memory cache size, provides a good balance. In other systems, the threshold is determined by the amount of computation required by fillmap merging tasks. The smaller the threshold size, the more layers are generated that require more merging tasks to execute. If the proportion overall rasterization of time taken by increasing merging tasks becomes significant and offsets the decrease in overall fillmap generation time due to lower memory use, the optimal threshold has been determined.

If the decision step 2725 determines that the predetermined threshold has been reached, the layered display list generated so far is treated as big enough for the fillmap generation task 2320 to run efficiently and suitable for processing within the generation working memory 2325. Effectively, the PDL interpreter 2302 at the step 2725 identifies when the generated display list is mature to be converted to a fillmap and the conversion is likely to succeed within the available working memory, for example, in the generation working memory 2325.

If the decision step 2725 returns affirmative, then the PDL interpreter 2302 at step 2730 sets a reference count to 1 for the currently accumulated display list. The reference count is used by the fillmap generation task 2320 to decide when to release the display list as will be described in detail below with reference to FIG. 30. Then control moves to step 2735 where the PDL interpreter 2302, under execution of one or more controller processors 2070, submits the accumulated display list to the layered display list store 2312, for later retrieval by the fillmap generation task 2320 of the builder module 2103. Then control loops back to the starting step 2705.

If the PDL interpreter 2302, under execution of one or more controller processors 2070, determines at the decision step 2725 that the predetermined threshold has not been reached, then control moves to another decision step 2740, where it is tested if the PDL object stream has finished. If negative, the control loops back to the calculating step 2710. Otherwise, the control moves to another decision step 2745.

The PDL interpreter, at the decision step 2745, determines if the currently accumulated display list is empty, i.e. if all objects accumulated by steps 2710 and 2715 have been submitted to Layered Display List Store 2312. If affirmative, the PDL interpreter 2302 concludes. If negative, the PDL interpreter 2302 submits, at step 2755, the accumulated DLEs as the last display list to the layered display list store 2312 using the steps 2750 and 2755. The procedures carried out for the steps 2750 and 2755 are similar to those described for the respective steps 2730 and 2735. Once the last display list is submitted to the layered display list store 2312 for conversion, the PDL interpreter 2302 concludes.

FIG. 28 shows how the complexity of the layer of objects of FIG. 26A can be calculated. A table 2800 lists all objects used in the layer of objects of FIG. 26A, one row per object, ordered by their respective z-orders in the first column 2801. The table 2800 can be stored in the layered display list store 2313 in association with a corresponding generated or currently being generated layered display list.

The second column 2802 shows the object shapes to remind the reader which object from FIG. 26A, a given row represents. It should be noted that the object shapes are given for illustrative purposes only. In practice, the second column 2802 can be omitted or can be populated with references to the DLEs corresponding to z-order in the first column 2801.

The third column 2803 shows the measure of object's complexity, which is an integer value. The larger the value in the column 2803, the more complex the object is. An example of an object complexity measure can be a number of edges forming an outline of an object. Another example can be the estimated number of monotonic edges that the object outline will decompose into, during a scan conversion in pixel sequential direction. In the table 2800, just exemplary values have been assigned. Methods of decomposing objects into edges are known in the art. Other complexity measures can be used, which are indicative of the working memory requirements for decomposing objects of a layered display list to a planar intermediate format representation, such as a fillmap or a planar map.

The fourth column 2804 shows the cumulative complexity, which is the sum of all complexities in the column 2803 of objects with z-order less than and including the object in the current row. For example, the cumulative complexity 2810 in the third row is 10 corresponding to the sum of complexity 2811 (2) of the object in the third row having z-order 2 and the preceding cumulative complexity 2812 (8) corresponding to the sum of complexities of all objects preceding in z-order. The cumulative complexity of the last object in the table 2800, is the complexity of the layer of objects of FIG. 26A, 2813 (18).

Figure 29A:
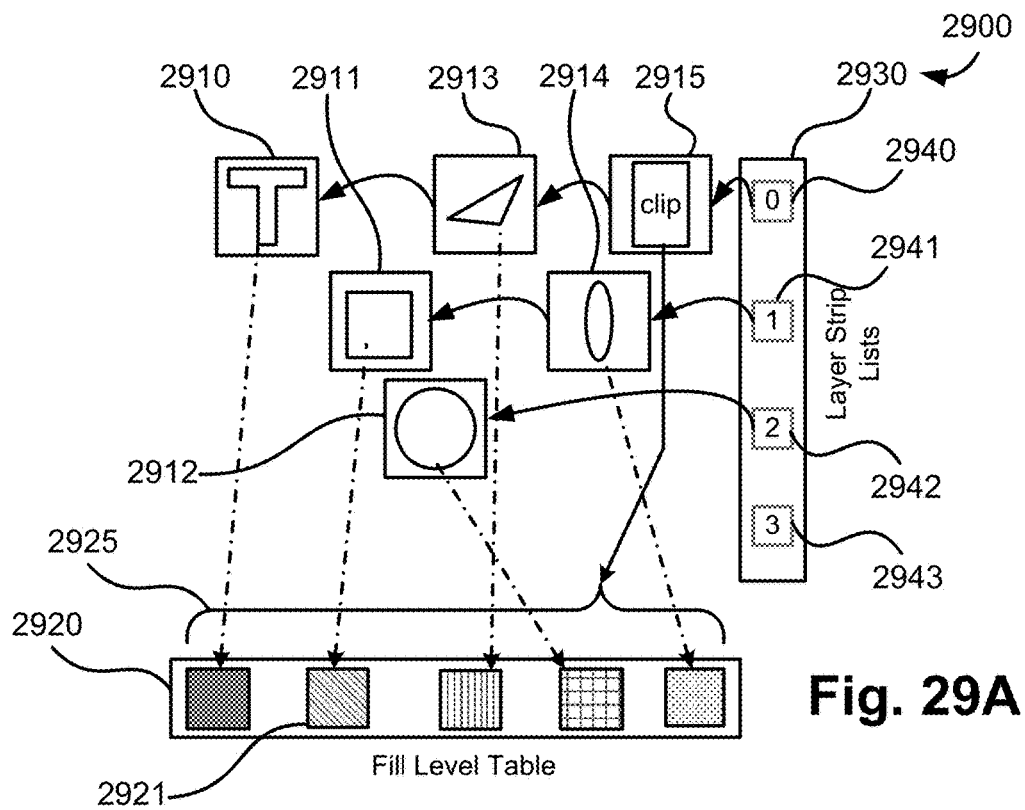
FIG. 29A shows a display list and a fill level table representation of FIG. 26A.

FIG. 29A schematically shows data structures of a display list formed by the PDL interpreter 2302 and stored in the layered display list store 2312. The data structures shown in FIG. 29A correspond to the display list representation 2900 of the objects of the page 2605 shown in FIG. 26A. The display list 2900 shown on FIG. 29A comprises:
(a) layer strip lists 2930, and
(b) a Fill Level Table 2920.

The layer strip lists 2930 correspond to a set of linked lists, numbered according to respective y-order. Only four linked lists are shown on FIG. 29A, numbered 0 through 3, one list per strip. However, it is possible to have more than one linked list per strip, up to having a linked list per each scanline.

The fill level table 2920 is an array of object fill information as described previously with reference to FIGS. 5A and 5B. Entries in Fill Level Table 2930 are referred to by entries in the layer strip lists.

The elements in a given linked list in layer strip lists 2930 represent the objects in the layer that start at a given strip or a given scanline to which the linked list belongs. For example, a linked list 2940, represents objects starting in the strip 0 on FIG. 26A. Since objects 2610, 2613 and 2615 start at strip 0, the linked list 2940 contains three elements 2910, 2913 and 2915 representing objects 2610, 2613 and 2615 respectively. Then, a linked list 2941, represents objects starting at the strip 1 in FIG. 26A. Particularly, the linked list 2941 contains two elements 2911 and 2914 representing objects 2611 and 2614 respectively which start at strip 1. Finally, a linked list 2942 represents objects starting at the strip 2 in FIG. 26A. As such, the linked list 2941 contains one element 2912 representing object 2612, because object 2612 starts at strip 2. A linked list 2943, represents objects starting at the strip 3 in FIG. 26A, and is empty, because no objects start at strip 3 in FIG. 26A.

Elements in the layer strip lists 2930 representing fill objects are called fill object entries. Fill object entries reference their object fill data element in the fill level table 2920. For example, an element 2911, representing fill object 2611 with left hatched fill, references an entry 2921 in the fill level table 2920. Elements in the layer strip lists 2930 representing clip objects are called clip object entries. Clip object entries do not reference any fill data, but they have a clip range. The clip range signifies a range of z-orders that the corresponding clip object clips. For example, as shown in FIG. 29A, an element 2915, representing the clip object 2615 associated with a range 2925 of indices in the fill level table 2920. Among other information, a fill object entry stores a reference or a pointer to corresponding object fill data, whereas a clip object entry stores a tuple of numbers (z-min, z-max) that defines a range of z-orders of objects clipped by the clip object.

The fill entries in the fill level table 2920 are sorted according to the z-order of their referencing objects, as can be confirmed by looking at FIG. 28. For example, the object 2611 has z-order 1 and occupies second row in table 2800, therefore the corresponding fill entry 2921 is in the second position in the fill level table 2920. The clip object 2615 has z-order 5, therefore occupying the sixth row in the table 2800. However, clip levels are not included in the fill level table 2920, thus the fill level table 2920 has five entries only.

The fill object entries of each linked lists of the layer strip lists 2930, such as the linked list 2940, are also sorted in increasing z-order of the objects they represent, from the list end to the list start. For example, the elements of the linked list 2940 are, starting from the list end, in order 2910, then 2913, because they represent objects 2910 and 2913, of z-order 0 and z-order 2, respectively. The order of entries in the layer strip lists 2930, as well as in the fill level table 2920, permits a simple process of dividing a layer display list into sub-layer display lists as will be shown below, in FIG. 29B.

The clip object entries in the layer strip lists 2930 do not need to be ordered in accordance with z-order. In the preferred arrangement, the clip object entries are kept separated from the fill object entries, for example at the start of each of the strip lists 2930. Such arrangement results in a simple process of splitting the layer strip lists 2930 into sub-layer strip lists 2930a and 2930b as shown below in FIG. 29B. Therefore, the entry 2915, representing the clip object 2615 in the strip 0 list 2940, is kept at the start of list 2940, separate from the rest of entries.

Figure 30:
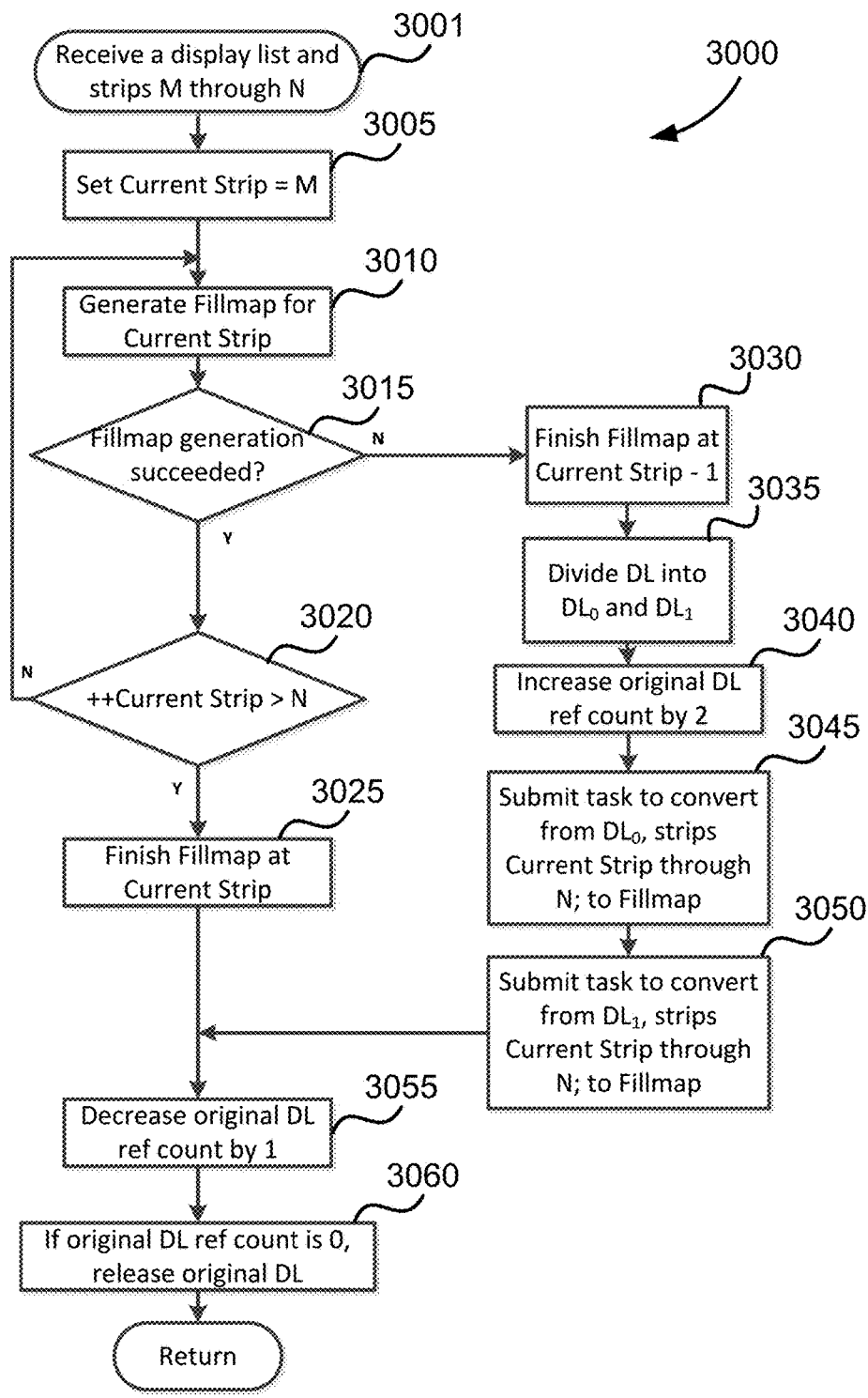
FIG. 30 is a schematic flow diagram illustrating in more detail a method of generating a fillmap representation from an input display list.

FIG. 30 shows a method 3000 of generating a fillmap from an input layered display list in accordance with the present disclosure. The method 3000 is implemented within the builder module 2103 being executed by one or more controller processors 2070. The method 3000 uses the generation working memory 2325 to generate a fillmap for data obtained from the layered display list store 2312. The method 3000 stores the generated fillmap in the layered fillmap store 232.

The method 3000 receives at step 3001 the input display list (DL) from the Layered Display List Store 2312 and a range of strips for which the fillmap needs to be generated, from M through to N. Values M through N are stored within display list parameters.

Optionally, the method 3000 may further receive a pivot z-order, i.e. the z-order that splits the received layered display list into two subsets of objects of approximately equal complexities. The pivot z-order can be calculated during construction of the display list and stored within the display list parameters. Alternatively, the pivot z-order can be calculated using the table 2800 after the display list is generated. The pivot z-order will be discussed in more detail below with references to FIG. 29B.

For example, a fillmap generation task 2320 converting a display list from FIG. 29A, receives the strip range from 0 through 3 (i.e. M=0 and N=3) within the display list parameters, because the layer strip lists 2930 span strips 0 through 3. Additionally, pivot z-order of 2, calculated during the display list construction as shown in FIG. 28, can be stored within the display list parameters. However, a fillmap generation task converting a display list from FIG. 32B, either the first or the second sub-layer, may receive the strip range from 2 through 3 (i.e. M=2 and N=3) because strip 0 list and strip 1 list in both sub-layers are empty, since Strips 0 and 1 of the layer have already been successfully converted into the fillmap on FIG. 32A. The pivot z-order of a display list may not be known in advance, therefore, a fillmap generation task 2320 may need to determine the pivot z-order.

The method 3000 starts with a setting step 3005, where the builder module 2103 sets the variable Current Strip to M. The value of M is at least 0. The variable Current Strip indicates a strip which is currently being processed. At the setting step 3005, the builder module 2103 opens the layered fillmap store 2332 for the subsequent writing of resulting fillmap data. Additionally, the builder module 2103 allocates the necessary amount of the fillmap generation working memory 2325 based on the cumulative complexity of the received layered display list.

Then the control moves to a generating step 3010, where the builder module generates a fillmap for a currently scan-converted strip. The fillmap is generated as shown in FIGS. 5A and 5B, using the fillmap generation working memory 2325 to allocate structures holding the generation state as appropriate and storing the resulting fillmap strip in the layered fillmap store 2332. Then the control moves to a decision step 3015, where it is determined, under execution of one or more of the controller processors 2070, if the generation step 3010 succeeded.

If decision step 3015 returns affirmative, the control moves to another decision step 3020, which increments the Current Strip variable to the next value and tests if the Current Strip exceeds N, i.e. if all fillmap strips have been generated. If the decision step 3020 returns affirmative, then control moves to the step 3025. The builder module 2103 at the step 3025 finishes the fillmap generation by closing the fillmap in the layered fillmap store 2332 opened at the step 3005, and releases the fillmap generation working memory 2325 allocated at step 3005. Then control moves to step 3055 which will be described later.

If step 3020 returns negative, then control loops back to step 3010 to generate next fillmap strip.

If step 3015 returns negative, then the fillmap has not been successfully generated and control moves to optional step 3030. Negative decision in step 3015 for the Current Strip suggests that at least one fillmap has been generated for K strips from strip M to the Current Strip-1, where K equals (Current Strip—M). In alternative implementation, control can move to step 3035 if the builder module does not allow storing partial fillmaps for a y-band. In such alternative implementation, the layered fillmap store 2332 opened for writing at step 3005 is closed, and all fillmap strips generated by previous executions of step 3010 (partial fillmap data) are discarded. The fillmap generation task 2320 can fail for different reasons, for example, because a dynamic memory allocation command was not able to service a memory allocation request originating from the fillmap generation task 2320. For example, a NULL pointer returned by the dynamic memory allocation command can be used as an indication that the fillmap generation task 2320 requested more working memory for generating the fillmap than available in the working memory 2325 allocated to the fillmap generation task 2320 by the builder module 2103.

The builder module 2103 at step 2930 finishes the fillmap at (Current Strip—1), which is the last strip successfully generated, in a similar manner as described in relation to step 3025. Particularly, at step 3030 the builder module 2103 closes the fillmap in the layered fillmap store 2332 opened in step 3005, ensuring that a partial fillmap consisting of strips M through Current Strip—1 (for K strips in total) is kept in the layered fillmap store 2332 and releases the fillmap generation working memory 2325 allocated in step 3005. Then control moves to dividing step 3035.

Step 3035 divides the input display list in z-order into two sub-lists or sub-layers $DL_0$ and $DL_1$. In alternative implementations, the input display list is divided into more than two sub-lists depending on the amount of memory available in the generation working memory 2325. The display list can be divided or split in accordance with FIG. 29B for generating a fillmap for all strips, i.e. if data successfully generated at step 3015 is discarded. Alternatively, if the builder module allows storing the partial fillmap consisting of strips M through Current Strip—1 successfully generated, the input display list can be divided in accordance with FIG. 13B where a fillmap is generated starting from the Current Strip through N. As such, the fillmap is generated starting from the strip K+1 if at least K strips are generated before the memory allocation request has failed, with K being at least 1. Further details of step 3035 will be described later with reference to FIG. 31.

Once the input display list is split into two sub-lists $DL_0$ and $DL_1$, then control moves to step 3040. Step 3040 increases the reference count for the original display list by 2 thereby indicating a number of sub-layer display lists to be rasterized associated with the original display list. The original $DL$, is the display list that was submitted to conversion by the PDL interpreter 4102 at step 2755 or step 2735, with reference count of 1 set by step 2750 or step 2735, respectively. A sub-layer DL that is the result of dividing step 3035 is not an original display list. The original display list of a sub-layer DL is a DL originally constructed by the PDL interpreter 2302 (and not the result of previous DL sub-division process).

Once the reference count for the original display list is increased by 2, control moves to submitting steps 3045 and 3050. Steps 3045 and 3050 recursively submit two fillmap generation tasks with two sub-lists $DL_0$ and $DL_1$ used as an input, respectively. The steps can submit the tasks for scheduled execution on an asynchronous thread or can be executed synchronously. Preferably, the steps 3045 and 3050 are executed synchronously on systems with limited memory, to ensure that the process in FIG. 30, generating an intermediate format representation for the original display list, succeeds within the generation working memory 2325. However, on a system where large amount of memory is available and the generation working memory 2325 size have been limited to the memory cache size to improve the system performance, steps 3045 and 3050 can be executed asynchronously. Then control moves to step 3055. Steps 3045 and 3050 submit the fillmap generation tasks with strips from Current Strip through N. In the alternative implementation, when the builder module does not allow storing partial fillmaps for a y-band, steps 3045 and 3050 submit the fillmap generation tasks with strips from M through N.

Step 3055 decreases the original DL reference count by 1 in response to completion of steps 3001 through 3050 thereby to indicate the number of to be rasterized sub-layer display lists associated with the original display list. Then the decreased reference count value is passed to the following step 3060. Step 3060 tests if the reference count value passed from step 3055 is zero. If so, the original DL from step 3055 can be released because all fillmap generation tasks working on the original layered display list and its sub-layered display lists have been completed. Upon completion of step 3060, execution of the method 3000 concludes if the DL was the original display list. If the processed display list was a sub-layered display list, the execution returns to step 3050 or step 6055 respectively and, subject to the recursive invocation of FIG. 30 flow chart from step 3045 or 3050. Given that FIG. 30 is recursively invoked, the original DL reference count is decremented in response to generating a fillmap representation (rasterizing) a sub-display list associated with the original display list.

Figure 31:
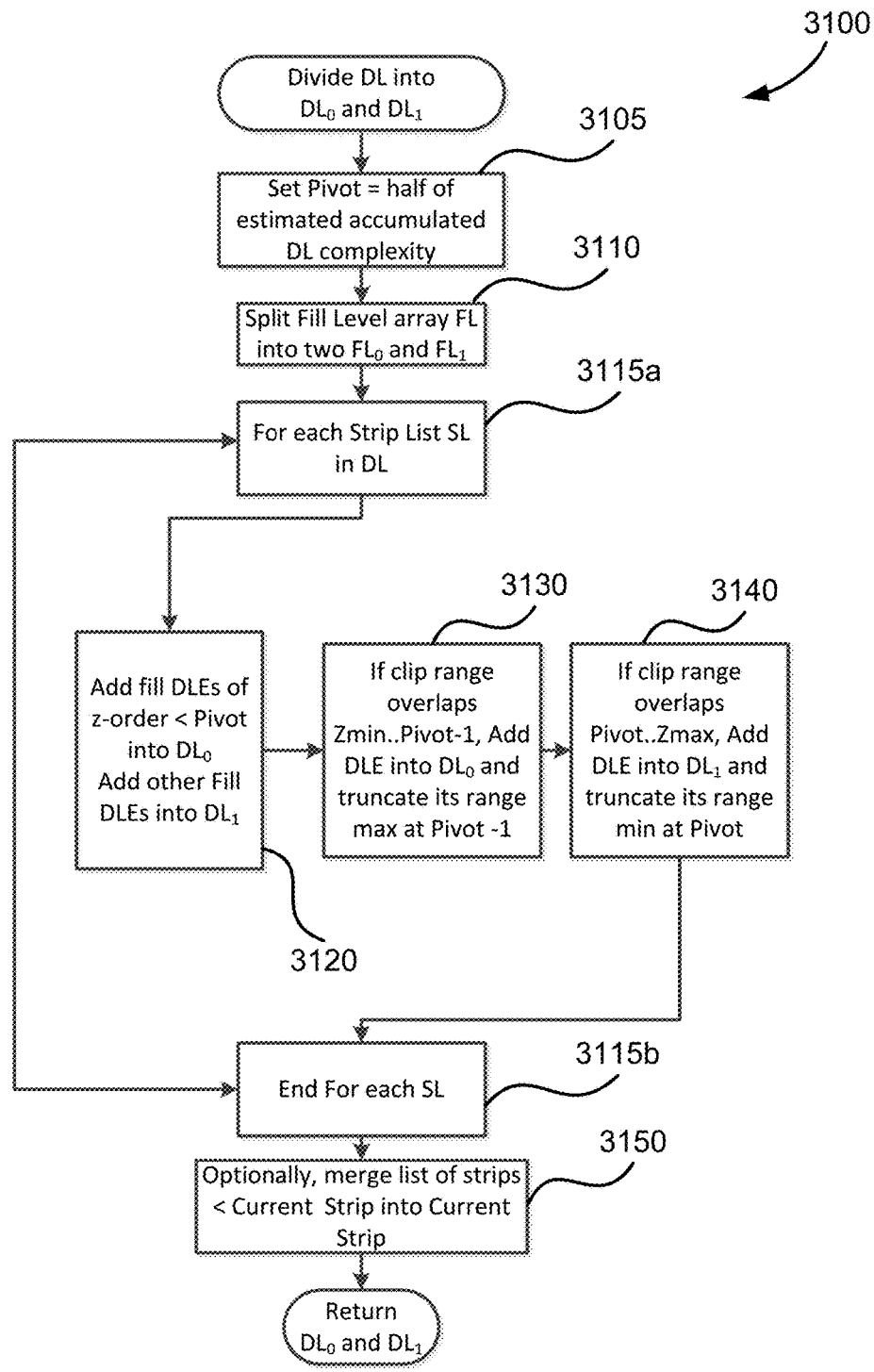
FIG. 31 is a schematic flow diagram illustrating a method of dividing a display list into two sub-display list as used in the method of FIG. 30.

A method 3100 of dividing in z-order a layered display list into two sub-layers, will now be described in more detail with reference to the flowchart of FIG. 31. The method 3100 is executed by the builder module at step 3035 of FIG. 30 or at step 2525 of FIG. 25, which divides a layered display list into two sub-layers.

The method 3100 receives a layered display list to be divided, and returns the two sub-layered display lists $DL_0$ and $DL_1$ as the result of division. The input layered display list contains objects of z-orders from Zmin to Zmax.

The method 3100 starts with setting step 3105 where the builder module 2103 finds the pivot value, which is about half of the accumulated complexity of the received display list. Then, the pivot z-order is set to a variable Pivot. The value of Pivot variable is between Zmin and Zmax. For example, from FIG. 28, where Zmin is 0 and Zmax is 5, the accumulated complexity is 18, so the half value is 9, therefore the pivot z-order is 2.

Upon determining the pivot z-order, control moves to splitting step 3110. At step 3110, the builder module 2103 splits the fill level table (FL) of the display list (DL) into two parts $FL_0$ (comprising fills of objects from Zmin to Pivot-1) and $FL_1$ (comprising fills of objects from Pivot to Zmax or the end of the table). The process of splitting the fill level table will be described below with reference to FIG. 29B.

Then control moves to the loop 3115*a*-3115*b*, which executes steps 3120 through 3140 for each layer strip list within the display list. Inside the loop 3115*a*-3115*b*, the first step is step 3120. Step 3120 looks for all fill DLEs in the layer strip list. The layer strip list is split into two sub-lists of display list elements. A first sub-list comprises elements having z-order less than the pivot z-order and a second sub-list comprises elements of z-order equal to or more than the pivot z-order. Given that the elements were added to the layered display list in their z-orders, such split is simple and computationally inexpensive procedure. Then the first sub-list is added to $DL_0$ and the second sub-list is added to $DL_1$. Then control moves to steps 3130 and 3140.

Steps 3130 and 3140 process clip DLEs in the layer strip list. Depending on the clip range of the clip DLE being processed, it needs to be included in the first, second or both sub-layered display lists $DL_0$ and $DL_1$. If the clip range of a given clip DLE overlaps values from Zmin to Pivot-1, the clip is added by the builder module 2103 to DL0 at step 3130. Next, if clip range of a given clip DLE overlaps values from Pivot to Zmax, the clip DLE is added to $DL_1$ at step 3140 by the builder module 2103. Both steps 3130 and 3140 also truncate the clip range of the resulting clip DLEs to the range in their respective sub-layered display lists as described below with reference to FIG. 29B. Step 3140 concludes the execution of the loop 3115*a*-3115*b* iteration on a given layer strip list. After the loop 3115*a*-3115*b* is executed for all layer strip lists, control moves to optional merging step 3150.

Step 3150 is executed in an alternative implementation when a partial fillmap is retained in the layered fillmap store 2332 and the sub-layered display lists are formed as will be described in FIG. 32B. In such a case, the DLEs from the starting strip M to Curent_Strip-1, that are still active in the current strip Current_Strip, are moved and merged with DLEs on the Current_Strip. The DLEs that terminate before the current strip Current_Strip are not included in the resulting sub-layered display lists. This is seen in FIG. 32B where DLE 2913 terminates in strip1 on FIG. 29B, therefore is not included in the resulting display list shown in FIG. 32B. Step 3150 concludes the method 3100 of dividing a layered display list into two sub-layers and the control returns to step 3031 of FIG. 30.

Figure 29B:
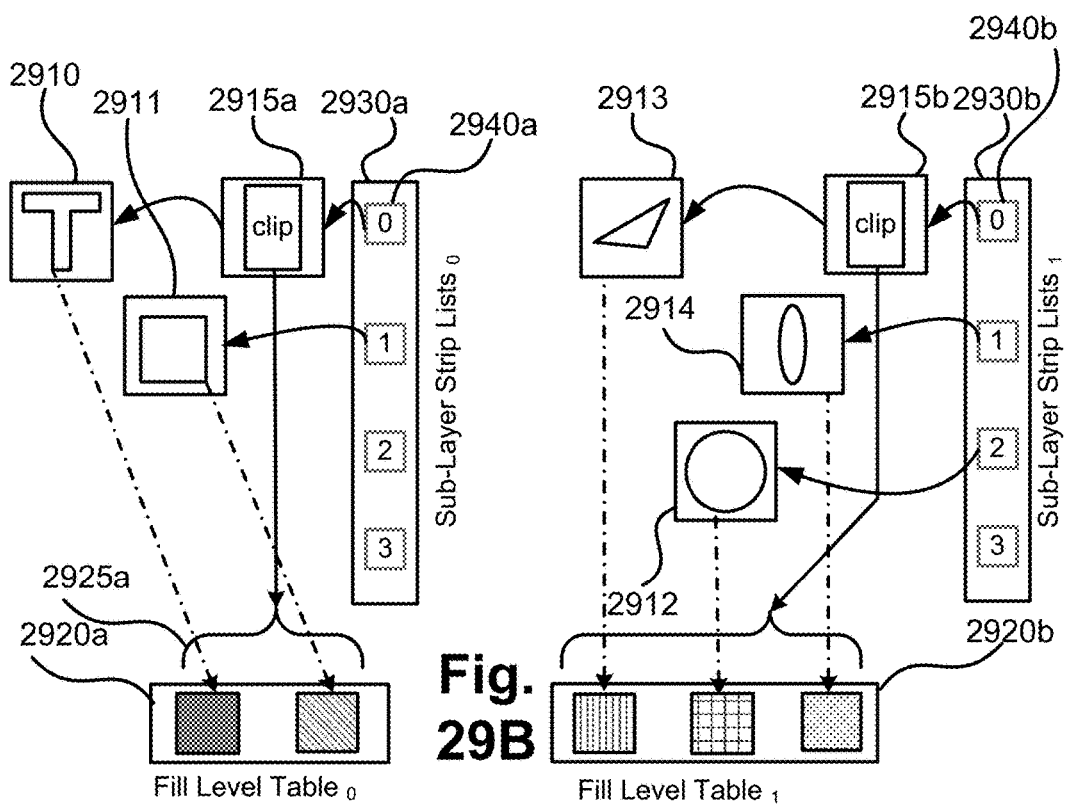
FIG. 29B shows division of the display list and the fill level table representation from FIG. 29A into two sub-display lists.

FIG. 29B shows the result of dividing the layered display list of FIG. 29A into two sub-layered display lists, according sub-layers as shown on FIG. 26B.

As described above, the dividing process consists of steps:
(a) find the pivot accumulated complexity value and the pivot z-order that splits the set of objects into two subsets of approximately equal complexities;
(b) divide the fill level table at the pivot z-order into two sub-tables;
(c) create empty sub-layer strip lists, for both sub-layers;
(d) find a split point within each of the lists based on the pivot z-order, and divide each list into two sub-lists using the found split point, assign the sub-lists to each corresponding sub-layer strip list;
(e) for all entries in the lists representing clip objects assign the entries to the appropriate sub-layer strip lists. If an entry references the range that spans the pivot z-order, then the entry is duplicated and added to both sub-layer strip lists, with their ranges adjusted to the z-orders within their respective sub-tables.

Particularly, FIG. 29B shows that cumulative complexity of the entire layer, as seen in table 2800 is 18. It could have been the result that the complexity threshold did not allow to grow cumulative complexity of the display list above 20. The pivot cumulative complexity value is therefore 10, half of the predetermined threshold of 20 in this case. Thus, the pivot z-order, as seen in the Table 2800 is 2. The pivot z-order can be determined, for example, using binary search in the Table 2800. However, other techniques known in the art can also be used. Therefore, objects of z-order less than the pivot z-order (z-order 0 & 1) are included in the first sub-layer, while objects of z-order greater or equal to the pivot z-order (z-order 2 to 4) are included in the second sub-layer.

Additionally, the pivot z-order can be determined by further relying on relationship between objects within one or more display list layer. For example, the PDL interpreter 2302 may identify objects falling in the same transparency group. Consequently, the pivot point may be determined such that the transparency group entirely falls within a single sub-layer display list. As such, the pivot cumulative complexity may be determined to be close to 50% of the predetermined threshold used by the PDL interpreter while keeping the transparency group entirely within a single sub-layer display list.

The pivot cumulative complexity may be known a-priori during the original display list construction. Alternatively, pivot z-order can be calculated while constructing the original display list, in which case finding pivot z-order does not require binary search in table 2800.

Pivot z-order is 2. Therefore the fill level table 2920 is also divided in place into two fill level tables 2920a and 2920b using the determined pivot z-order. The process of dividing the fill level table is not computationally intensive since fills in the fill level tables are sorted in z-order. The fill level table 2920a consists of elements with z-order from 0 to 1, and the fill level table 2920b, consisting of elements with z-order from 2 to 4.

Additionally, two layer strip lists are created: sub-layer strip lists 2930a and sub-layer strip lists 2930b. The sub-layer strip lists 2930a hold fill objects of z-orders below the pivot z-order, i.e. z-orders 0 through 1, and the sub-layer strip lists 2930b hold fill objects of z-orders equal or above the pivot z-order, i.e. z-orders 2 through 4. The process of splitting the layer strip lists is not computationally intensive since objects in the layer strip lists are sorted in z-order.

The split point of the strip list 2940 is found to be between elements 2910 (representing object 2610 of z-order 0), and 2913 (representing object 2613 of z-order 2). All fill DLEs to the left and including 2910, form a list 2940a in a first sub-layer. All fill object elements from 2913 and to the right form a list 2940b in a second sub-Layer. Alternatively, the split point of the list 2940, can be established while constructing the original display list (at the time pivot z-order was calculated) in which case no search would be required in the list 2940.

Element 2915 represents the clip object 2615 having the clip range 2925 from z-order 0 to 4, including the pivot z-order of 2. Therefore, element 2915 is duplicated into elements 2915a and 2915b and included in both sub-layer strip lists. The clip range of element 2915a within the first sub-layer list 2940a becomes 2925a from z-order 0 through 1. The clip range of element 2915b within the second sub-layer list 2940b becomes 2925b, from z-order 2 through 4.

Other strip layer lists, strips 1 to 3, are divided similarly to strip 0.

The dividing process is performed mostly in place, meaning resulting two sub-layered display lists on FIG. 29B occupy the same memory that the display list of FIG. 29A occupies. No additional data structures are created, except extra sub-layer strip lists and except an extra clip object. Therefore the dividing process does not use significantly more memory in the layered display list store 2312. The resulting sub-layered display lists, such as display lists in FIG. 29B, are contained by the original display list, such as in FIG. 29A.

The process of dividing a layered display list into sub-layers is triggered by an unsuccessful fillmap generation task, as was described above. In one implementation, the results of the unsuccessful fillmap generation task are discarded, the layered display list divided into two sub-layers, and two fillmap generation tasks are launched with the respective sub-layer obtained from the dividing step. In such implementation, the input display list cannot be modified, as the fillmap generation task progresses with the display list decomposition and fillmap generation because all object information is needed to generate fillmaps for the sub-layers.

In the alternative implementation, a partial result of the unsuccessful fillmap generation task can be retained. In such implementation, the input display list does not need to be kept Read Only. In this case, the list elements can be discarded if the corresponding objects have been completely rasterized and their data is stored in the raster format in the layered fillmap store 2332. The list elements that continue into next strips can be moved to the next strip in the layer strip list 2930, once a given strip has been successfully converted into a fillmap representation. The result of layered display list dividing process in the alternative implementation is shown on FIG. 32B.

Figure 32A:
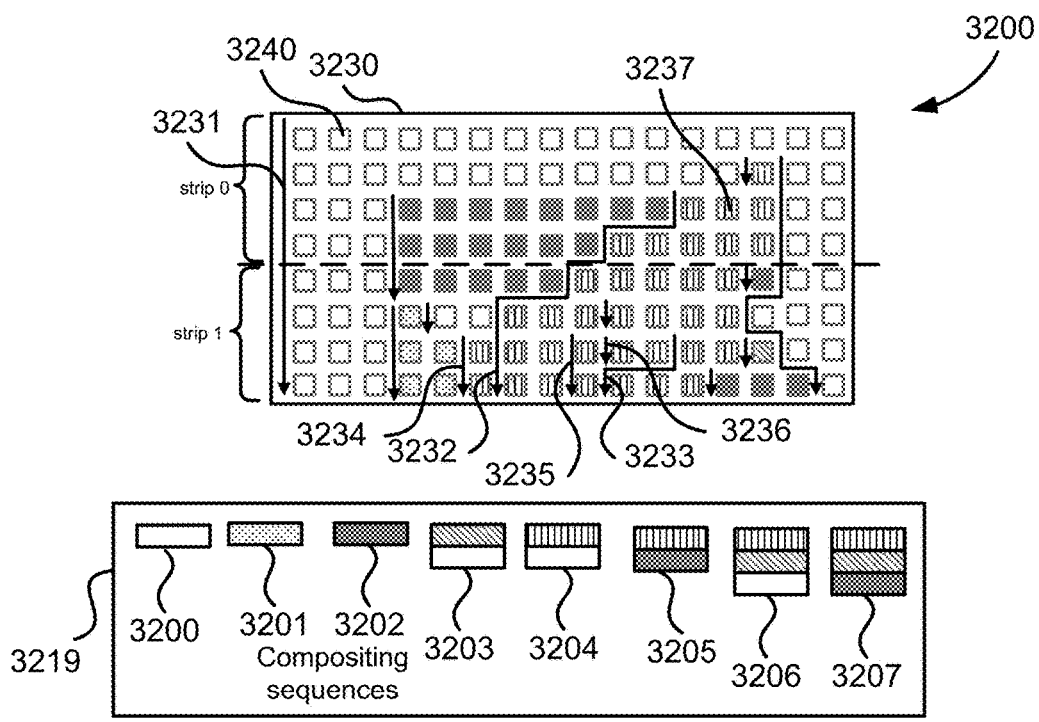
FIG. 32A shows the result of transforming first two strips of the display list shown in FIG. 29A into a fillmap representation.

FIG. 32A represents a situation when the fillmap generation task failed during conversion of strip 2 of the original display list in FIG. 29A. FIG. 32A shows a partial fillmap 3200 generated prior to the failure. The partial fillmap 3200 includes strip0 and strip1 of pixel aligned edge data 2330, and a fill compositing sequence table 3219. The fill compositing sequence table 3219 contains all combination of compositing sequences 3201 through 3207, and background compositing sequence 3200, that contribute to the pixels of strips 0 and 1 of the fillmap 3200. Each of the edges 3231 through 3237 of the fillmap 3200, references one of the compositing sequences from the fill compositing sequence table 3219. For example, edge 3231, immediately left to the region of background pixels 3240, references background compositing sequence 3200.

The partial fillmap 3200 from FIG. 32A is saved in the layered fillmap store 2332 with an indication of z-order and a spatial position of the partial fillmap 3200 on a page, such as y-band number and a range of strips represented by the partial fillmap 3200. The original display list from FIG. 29A covers strips 0 through 3, or its y-dimensions are 0 through 3. However, the partial fillmap from FIG. 32A covers strips 0 and 1 only. Therefore, the altered y-dimensions of 0 through 1 are saved in layered fillmap store 2332.

Figure 32B:
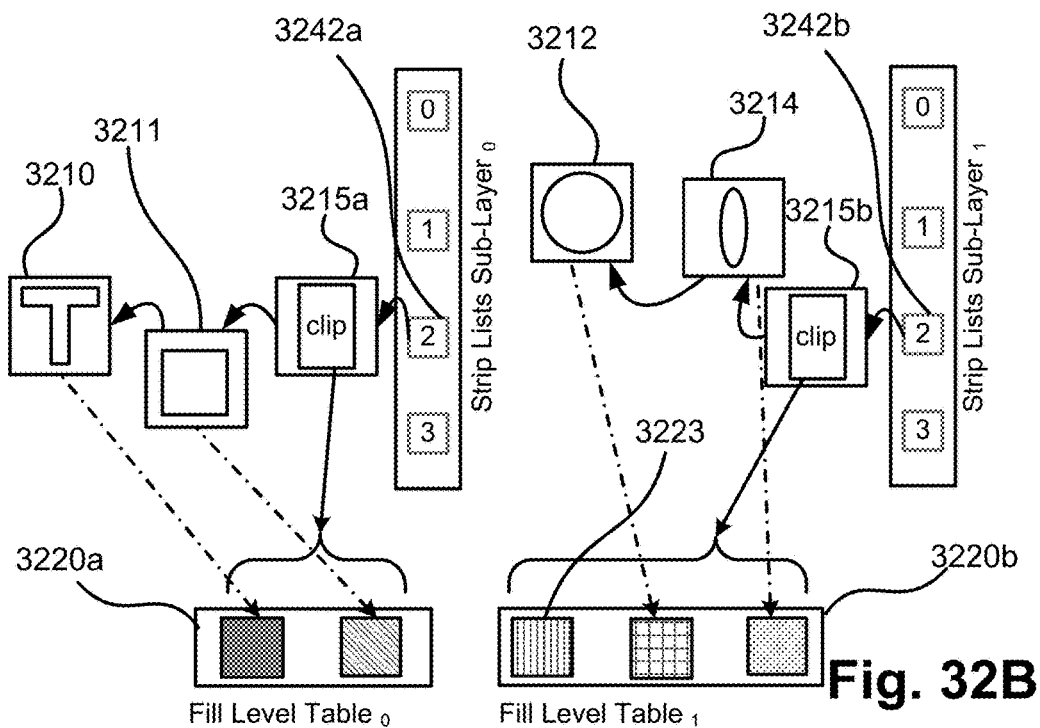
FIG. 32B shows the last two strips of divided display list of FIG. 29B.

FIG. 32B shows the result of dividing the display list from FIG. 29A into two sub-layer display lists. The process of dividing the fill level table is identical as in the implementation described above. Therefore, splitting of table 2920 resulted in tables 3220a and 3220b, identical to tables 2920a and 2920b respectively. However, strip list entries from successfully generated strips 0 and 1 that contribute to strip 2 are moved to strip 2. Therefore, strip 2 contained all objects spawned at strip 0, 1 and 2, which continue to strip 2. As a result, after the division of the layer strip list of strip 2, the strip 2 of the first sub-layer 3242a, contains the list of following entries with z-order less than the pivot z-order of 2:

3210, representing object 2610, that was originally in strip 0, however moved to strip 2 during fillmap generation;
  3211, representing object 2611, that was originally in strip 1, however moved to strip 2 during fillmap generation;
  3215a, representing clip object 2615 in sub-Layer$_0$, which was originally in strip 0, however moved to strip 2 during fillmap generation.

Likewise, the second sub-layer 3242b, contains the list of following entries with z-order more or equal to the pivot z-order of 2:

3212, representing object 2612, that was originally in strip 2;
  3214, representing object 2614, that was originally in strip 1, however it moved to strip 2 during fillmap generation;
  3215b, representing clip object 2614 in sub-Layer$_1$, that was originally in strip 0, however it moved to strip 2 during fillmap generation.

The object 2613 has been released from the original display list after the strip 1 of the fillmap in FIG. 32A was successfully generated, because the object 2613 does not intersect strips 2 and 3. Memory occupied by the object 2613 can, after its release, be used to other fillmap generation task working data. Therefore, there is no element representing object 2613 in second sub-layer display list of FIG. 32B. As such, the fill element 3223 in the fill level table 3220*b*, originally referenced by 2613 in the table 2920*b*, remains unreferenced.

Strips 0 and 1 in both sub-layer display lists are empty, because the fillmap generation process will start at strip 2 in both sub-layer display lists. Strips 3 in both sub-layer display lists 3242*a* and 3242*b* are empty, because no object starts at this strip, identical to strips 3 on FIG. 29B.

Figure 33:
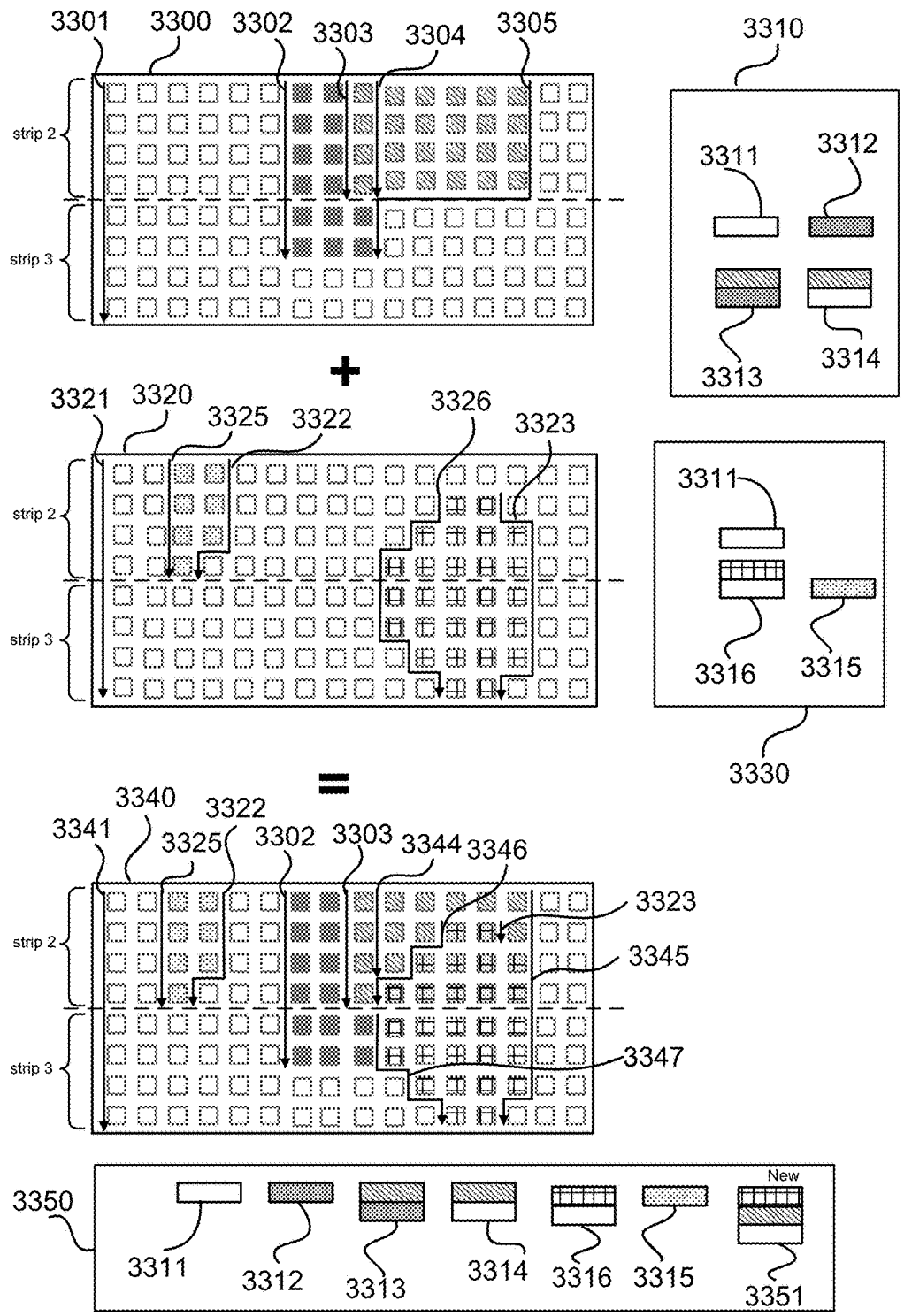
FIG. 33 shows merging of the last two strips of fillmap representations obtained from display lists of FIG. 23B.

Merging of the fillmap representations obtained from the two sub-layers of FIG. 32B is shown with reference to FIG. 33. The fillmap representation 3300 and the compositing sequence table 3310 of the first sub-layer comprises four pixel-aligned fillmap edges 3301, 3302, 3303, 3304, referencing compositing sequences 3311, 3312, 3313, 3314, respectively. The fifth edge 3302 of said fillmap, also references the compositing sequence 3311. The fillmap representation 3320 and the compositing sequence table 3330 of the second sub-layer comprises three pixel-aligned fillmap edges 3321, 3325, 3326, referencing compositing sequences 3311, 3315, 3315, respectively. The fourth and fifth edge 3322, 3323 of the fillmap 3320, also reference the compositing sequence 3311. The fillmaps 3300 and 3320 cover strip 2 and strip 3 of the original page only, because the first two strips have been generated as a single fillmap seen on FIG. 32A. The partial fillmap for strips 0 to 1 can be merged in y-order with the fillmaps 3300 and 3320 since the partial fillmap 3200 does not overlap the fillmaps 3300 and 3320.

The result of merging the fillmaps 3300 and 3320 is the fillmap 3340 and the compositing sequence table 3350. Merging is essentially combining, in z-order, the source edges and compositing sequences into the resulting edges and compositing sequences. Some edges may be simply copied to the destination fillmap, some edges may be combined, and some edges may be altered when they are covered or intersected by other edges. For example, edges 3301 and 3321 are combined into edge 3341, all referencing composting sequence 3311. Edges 3325, 3322, 3302 and 3303 are copied to the resulting fillmap. Edge 3326 is split into two edges 3346 and 3347, because new region referencing a new compositing sequence 3351 has been established. Edge 3304 is partially covered by the region of edge 3326, therefore it is altered (shortened) and becomes edge 3344 in the resulting fillmap. Parts of edges 3302 and 3323 are combined and form edge 3345 in the resulting fillmap. The set of compositing sequences 3310 and 3330 have been combined, and the combined compositing sequence set 3350 contains all source compositing sequences. It can be appreciated that certain source compositing sequences can be removed from the combined compositing set, for example when some regions are completely covered by opaque regions of the fillmap of higher z-order. However, that is not the case in the example of FIG. 33. Also, new compositing sequences can be created when a higher z-order fillmap has transparent fills regions and the regions of background fillmap show through. An example on FIG. 33 is the compositing sequence 3351, formed by combining sequences 3314 and 3316.

INDUSTRIAL APPLICABILITY

The arrangements described are applicable to the computer and data processing industries and particularly for the operation of printer and like devices having a limited amount of memory with which to process image or document data to be reproduced. The arrangements described are applicable to the computer and data processing industries and particularly for the parallelised rendering of images and documents for printing.

The foregoing describes only some embodiments of the present invention, and modifications and/or changes can be made thereto without departing from the scope and spirit of the invention, the embodiments being illustrative and not restrictive. For example, an electronic apparatus, an executable computer program and a computer program product, comprising computer readable medium having a computer program recorded therein, which are configured to perform the proposed method are also within the scope of the invention.

The invention claimed is:

1. A method of controlling memory usage in a graphics rendering system, the method comprising:
converting a plurality of layers of graphical objects to an intermediate format representation, the layers being formed by grouping the graphical objects into a plurality of layers based on a first complexity threshold;
in response to detecting a memory shortage condition in execution of the graphics rendering system, determining a second complexity threshold based on the detected memory shortage condition, the second complexity threshold being lower than the first complexity threshold;
identifying a layer of the plurality of layers based on the second complexity threshold, the identified layer being different to a layer which triggered the memory shortage condition; and
converting the identified layer of graphical objects to the intermediate format representation to release memory occupied by graphical objects of the identified layer.

2. The method according to claim 1, wherein the detected memory shortage condition relates to memory for interpreting a page display language of the graphical objects.

3. The method according to claim 1, wherein the memory shortage condition relates to memory for converting the plurality of layers of graphical objects to the intermediate format representation.

4. The method according to claim 1, wherein identifying the layer comprises selecting a y-band of a page containing the graphical objects based on the second complexity threshold.

5. The method according to claim 1, wherein identifying the layer comprises splitting a z-layer associated with the plurality of layers based on the second complexity threshold.

6. The method according to claim 1, further comprising selecting another layer of the plurality of layers based on the second complexity threshold and converting the selected layer to the intermediate format representation.

7. The method according to claim 1, wherein the memory shortage condition is detected by comparing currently reserved memory with a predetermined threshold.

8. The method according to claim 1, wherein the memory shortage condition is detected when a memory allocation request fails.

9. The method according to claim 1, further comprising determining a state of execution of the graphics rendering system by selecting a state from:
a first state corresponding to the memory shortage; and
a second state corresponding to a state when the system recovered from the memory shortage condition.

10. The method according to claim 1, further comprising:
if converting the identified layer fails to complete within a fixed memory, reclaiming memory from at least one of a print description language interpreter module and a display list generator module.

11. The method according to claim 1, wherein control of the memory is completed in stages according to a severity level of the graphics rendering system.

12. The method according to claim 1, further comprising rendering and compressing pixel data associated with the identified layer if conversion of the identified layer to the intermediate format representation fails and a predetermined severity level is detected.

13. The method according to claim 12, further comprising reducing quality of a bitmap of the graphical objects if a predetermined severity level is detected.

14. A method of controlling memory usage in a graphics rendering system processing graphical objects in independent spatial portions, the method comprising:
converting a plurality of layers of graphical objects to an intermediate format representation, the layers being formed by grouping the graphical objects for each of a plurality of spatial portions into layers based on a first complexity threshold chosen to facilitate throughput of the graphics rendering system;
in response to detecting a memory shortage condition in execution of the graphics rendering system processing graphical objects of a first of the plurality of spatial portions, determining a second layer complexity threshold to address the memory shortage condition, the second layer complexity threshold being lower than the first complexity threshold;
identifying a layer of the graphical objects associated with a second of the plurality of spatial portions using the plurality of layers based on the second layer complexity threshold, the second spatial portion being different to the first spatial portion which triggered the memory shortage condition; and
converting the identified layer of graphical objects to the intermediate format representation to release memory occupied by graphical objects of the identified layer.

15. The method according to claim 14, further comprising:
in response to successful conversion of the identified layer, determining if the released memory satisfies a memory allocation request, and
converting a layer associated with the first spatial portion to the intermediate format if the released memory satisfies the memory allocation request.

16. A non-transitory computer readable medium having a program stored thereon for controlling memory usage in a graphics rendering system, the program comprising:
code for converting a plurality of layers of graphical objects to an intermediate format representation, the layers being formed by grouping the graphical objects into a plurality of layers based on a first complexity threshold;
code for, in response to detecting a memory shortage condition in execution of the graphics rendering system, determining a second complexity threshold based on the detected memory shortage condition, the second complexity threshold being lower than the first complexity threshold;
code for identifying a layer of the plurality of layers based on the second complexity threshold, the identified layer being different to a layer which triggered the memory shortage condition; and
code for converting the identified layer of graphical objects to the intermediate format representation to release memory occupied by graphical objects of the identified layer.

17. Apparatus for controlling memory usage in a graphics rendering system, the apparatus configured to:
convert a plurality of layers of graphical objects to an intermediate format representation, the layers being formed by grouping the graphical objects into a plurality of layers based on a first complexity threshold;
in response to detecting a memory shortage condition in execution of the graphics rendering system, determine a second complexity threshold based on the detected memory shortage condition, the second complexity threshold being lower than the first complexity threshold;
identify a layer of the plurality of layers based on the second complexity threshold, the identified layer being different to a layer which triggered the memory shortage condition; and
convert the identified layer of graphical objects to the intermediate format representation to release memory occupied by graphical objects of the identified layer.

18. A graphic rendering system comprising:
a memory for storing data and a computer readable medium; and
a processor coupled to the memory for executing a computer program, the program having instructions for:
converting a plurality of layers of graphical objects to an intermediate format representation, the layers being formed by grouping the graphical objects into a plurality of layers based on a first complexity threshold;
in response to detecting a memory shortage condition in execution of the graphics rendering system, determining a second complexity threshold based on the detected memory shortage condition, the second complexity threshold being lower than the first complexity threshold;
identifying a layer of the plurality of layers based on the second complexity threshold, the identified layer being different to a layer which triggered the memory shortage condition; and
converting the identified layer of graphical objects to the intermediate format representation to release memory occupied by graphical objects of the identified layer.

* * * * *